US012503719B2

(12) United States Patent
Lewis et al.

(10) Patent No.: US 12,503,719 B2
(45) Date of Patent: Dec. 23, 2025

(54) METABOLOMIC CHARACTERIZATION OF MICROORGANISMS

(71) Applicants: Ian Andrew Lewis, Calgary (CA); Thomas Rydzak, Calgary (CA)

(72) Inventors: Ian Andrew Lewis, Calgary (CA); Thomas Rydzak, Calgary (CA)

(*) Notice: Subject to any disclaimer, the term of this patent is extended or adjusted under 35 U.S.C. 154(b) by 696 days.

(21) Appl. No.: 17/615,256

(22) PCT Filed: Sep. 20, 2019

(86) PCT No.: PCT/CA2019/051351
§ 371 (c)(1),
(2) Date: Nov. 30, 2021

(87) PCT Pub. No.: WO2020/237346
PCT Pub. Date: Dec. 3, 2020

(65) Prior Publication Data
US 2022/0235392 A1 Jul. 28, 2022

Related U.S. Application Data

(60) Provisional application No. 62/855,568, filed on May 31, 2019.

(51) Int. Cl.
| | | |
|---|---|---|
| C12Q 1/04 | (2006.01) | |
| C12N 1/20 | (2006.01) | |
| C12Q 1/10 | (2006.01) | |
| C12Q 1/14 | (2006.01) | |
| C12Q 1/20 | (2006.01) | |

(52) U.S. Cl.
CPC ............... *C12Q 1/045* (2013.01); *C12N 1/20* (2013.01); *C12Q 1/10* (2013.01); *C12Q 1/14* (2013.01); *C12Q 1/20* (2013.01)

(58) Field of Classification Search
CPC . C12Q 1/045; C12Q 1/10; C12Q 1/14; C12Q 1/20; C12N 1/20
See application file for complete search history.

(56) References Cited

U.S. PATENT DOCUMENTS

| 5,336,600 A | 8/1994 | Monget |
| 6,942,793 B2 | 9/2005 | Ito et al. |
| 2016/0333388 A1 | 11/2016 | Kostrzewa et al. |

FOREIGN PATENT DOCUMENTS

| CN | 103245716 A | 8/2013 | |
| ES | 2 373 836 | 5/2010 | |
| JP | 2013255445 | 12/2013 | |
| WO | 1996/14432 | 5/1996 | |
| WO | 2013/130875 A1 | 9/2013 | |
| WO | 2013/163610 A1 | 10/2013 | |
| WO | 2015/107054 | 7/2015 | |
| WO | 2018/165751 | 9/2018 | |
| WO | WO-2018165751 A1 * | 9/2018 | ............ C12M 45/00 |

OTHER PUBLICATIONS

Koser et al. (1947, Available Mar. 10, 1947, Department of Bacteriology and Parasitology, University of Chicago) {herein Koser} (Year: 1947).*
Kohlmeier (2015, Nutrient Metabolism, doi.org/10.1016/B978-0-12-387784-0.00010-9) {herein Kohlmeier) (Year: 2015).*
Sorci, (2010, Chemistry and Biology, doi.org/10.1016/B978-008045382-8.00138-6) {herein Sorci} (Year: 2010).*
Kwon et al. (2007, Available: Apr. 16, 2007, Antimicrobial Agents and Chemotherapy) {herein Kwon} (Year: 2007).*
Morgan (1999, Jun. 11, 1999, Molecular Biotechnology, Doi: 10.1007/BF02788682) {herein Morgan} (Year: 1999).*
Haskell et al. (1970, Methods in Enzymology) {hereinHaskell} (Year: 1970).*
Baquero et al. (2022, Available Mar. 14, 2022, mini review, doi: 10.3389/fmolb.2022.861603) {herein Baquero}. (Year: 2022).*
Degirolami et al.(1983, Journal of Clinical Microbiology) {herein Degirolami} (Year: 1983).*
Hendry et al. (2010, Compendium Continuing Education for Veterinarians) {herein Hendry} (Year: 2010).*
Balibar et al. (Sep. 29, 2008, Journal of Bacteriology) {herein Balibar} (Year: 2008).*
Antti et al. "Metabolic Profiling for Detection of *Staphylococcus aureus* Infection and Antibiotic Resistance", PLoS One, 2013, 8(2), e56971, 1-11.
Palama et al. "Identification of bacterial species by untargeted NMR spectroscopy of the exo-metabolome", Analyst, 2016, 141(15), 4558-61.
The International Search Report (ISR) with Written Opinion for PCT/CA2018/050301 dated Jun. 8, 2018, pp. 1-9.
Satink et al., "Microbial influences on urinary polyamine excretion", Clinica Chimica Acta, 1989, vol. 179, 305-314.
Bower et al., "Polyamine-Mediated Resistance of Uropathogenic *Escherichia coli* to Nitrosative Stress", Journal of Bacteriology, 2006, 188(3), 928-933.
Byun et al., "Analysis of polyamines as carbamoyl derivatives in urine and serum by liquid chromatography-tandem mass spectrometry", Biomedical Chromatography, 2008 (published online Jul. 31, 2007), vol. 22, 73-80.
Gika et al., "Quantitative profiling of polar primary metabolites using hydrophilic interaction ultrahigh performance liquid chromatography-tandem mass spectrometry", Journal of Chromatography A, 2012, vol. 1259, 121-127.
Taibi et al., "Rapid and simultaneous high-performance liquid chromatography assay of polyamines and monoacetylpolyamines in biological specimens", Journal of Chromatography B, 2000, vol. 745, 431-437.

(Continued)

*Primary Examiner* — Manjunath N Rao
*Assistant Examiner* — Erica Nicole Jones-Foster
(74) *Attorney, Agent, or Firm* — McDonnell Boehnen Hulbert & Berghoff LLP

(57) ABSTRACT

Methods and systems are for identifying the cell type of an unknown microorganism. The device includes: an apparatus for culturing unknown organism(s), a diagnostic data acquisition tool and a computer program. The method includes: incubation of the sample with a growth medium (with or without toxins), and an analysis of the metabolites detected in the sample. The computer system compares the results collected from the device to reference metabolite profiles.

8 Claims, 42 Drawing Sheets

(56) References Cited

OTHER PUBLICATIONS

Van Pelt et al, "A Four-Column Parallel Chromatography System for Isocratic or Gradient LC/MS Analyses", Anal. Chem., 2001, 73(3), 582-588.
Abe et al., "Determination of Polyamines in Human Urine by High-Performance Liquid Chromatography with Fluorescence Detection", Jap. J. Clin. Chem., 1985, 14(5), 315-320.
Alteri et al., "Fitness of Escherichia coli during Urinary Tract Infection Requires Gluconeogenesis and the TCA Cycle", PLoS Pathogens, 2009, 5(5), e1000448, 1-13.
The International Search Report (ISR) with Written Opinion for PCT/CA2019/050763 dated May 31, 2019, pp. 1-15.
Allen et al., "High-throughput classification of yeast mutants for functional genomics using metabolic footprinting", Nature Biotechnology 2003, vol. 21(6), pp. 692-696.
Pope et al., "Metabloic footprinting as a tool for discriminating between brewing yeasts", Yeast (2007) vol. 24(8), pp. 667-679.
Honore et al., "Metabolic footprinting for investigation of antifungal properties of Lactobacillus paracasei", Anal Bioanal Chem (2016) vol. 408, pp. 83-96.
Hoerr et al., "Characterization and prediction of the mechanism of action of antibiotics through NMR metabolomics" BMC Microbiology (2016) vol. 16(1), 14 pages.
The partial supplementary European search report for EP Application No. 18767935.2 dated Jan. 18, 2021, pp. 1-18.
Smart et al., "Analytical platform for metabolome analysis of microbial cells using methyl chloroformate derivatization followed by gas chromatography-mass spectrometry." Nature Protocols, vol. 5, No. 10, published online Sep. 30, 2010, p. 1709-1729.
Liebeke et al., "Metabolome Analysis of Gram-Positive Bacteria such as *Staphylococcus aureus* by GC-MS and LC-MS." Methods Mol. Biol., vol. 815, 2012, pp. 377-398.
Lagier et al., "Current and Past Strategies for Bacterial Culture in Clinical Microbiology," Clin. Microbiol. Rev., vol. 28, 2015, pp. 208-236.
"Difco & BBL Manual of Microbiological Cultural Media, Second Edition." Technical Manual [online]. Becton, Dickinson and Company, 2009 [retrieved on Jan. 16, 2020, pp. 4-17.
International Search Report and Written Opinion for International Application No. PCT/CA2019/051351 dated Jan. 29, 2020, 16 pages.
Niemi et al., "Urinary Polyamines as Biomarkers for Ovarian Cancer", International journal of Gynecological Cancer, vol. 27, No. 7, Sep. 1, 2017, pp. 1360-1366.
Pacchiarotta et al., "Fribrinogen alpha chain O-glycopeptides as possible markers of urinary tract infection", Journal of Proteomic, Elsevier, Amsterdam, NL, vol. 74, No. 3, Oct. 23, 2011, pp. 1067-1073.
Hakkinen et al., "Analysis of free, mono- and diacetylated polyamines from human urine by LC-M", Journal of Chromatography B, Elsevier, Amsterdam, NL, vol. 941, Oct. 15, 2013, pp. 81-89.
Extended European Search Report dated Feb. 7, 2022 for European Application No. 19811477.9, 10 pages.
Ammons et al, "Quantitative NMR Metabolite Profiling of Methicillin-Resistant and Methicillin-Susceptible *Staphylococcus aureus* Discriminates between Biofilm and Planktonic Phenotypes", J. Proteome Res., 2014, 13, 2973-2985.
Villas-Boas et al., "Extracellular metabolomics: A metabolic footprinting approach to assess fiber degradation in complex media", Analytical Biochemistry, 349 (2006) 297-305.
Supplementary Partial European Search Report for EP 19 93 0630 dated Jun. 6, 2023, pp. 1-20.
Palama, T. L. et al. "Identification of bacterial species by untargeted NMR spectroscopy of the exo-metabolome", Analyst (2016) vol. 141(15), pp. 4558-4561.
Zhong, Fanyi et al. "A quantitative metabolomics study of bacterial metabolites in different domains", Analytica Chduca Acta (2018) vol. 1037, pp. 237-244.
Mclaren, J. et al. "Pyridine Nucleotide Metabolism in *Escherichia coli* III. Biosynthesis From Alternative Pr.Ecursors in Vivo", TIIB Journal of Biological Chemistry (1973), pp. 5144-5159, XP093051878, Retrieved from the Internet: URL:https://www.sciencedirect.com/science/article/pii/S0021925819436831 [retrieved on Jun. 5, 2023].
Rydzak, Thomas et al. "Metabolic Preference Assay for Rapid Diagnosis of Bloodstream Infections", medRxiv (2021), XP093052210, Doi: 10.1101/2021.04.09.21255220 Retrieved from the Internet: URL:https://www.medrxiv.org/content/10.1101/2021.04.09.21255220v1 [retrieved on Jun. 6, 2023.
Mohammadi, Mehdi et al. "Microbial containment device: A platform for comprehensive analysis of microbial metabolism without sample preparation", Frontiers in Microbiology, (2022) vol. 13, pp. 1-13.
Palama, T. L. et al. Supporting information for: Identificationthemetabolome, (Jun. 16, 2016), XP093052061, Retrieved from the Internet: URL:https://www.rsc.org/suppdata/c6/an/c6a n00393a/c6an00393al.pdf [retrieved on Jun. 6, 2023].

\* cited by examiner

Adapted from Kumar A, D Roberts and KE Wood et al. Crit Care Med 2006;34:1589-1596.

CLINICAL DIAGNOSTIC PIPELINE

A  Existing Workflow (2-4 days)

B  Prototype system (6 hours)

Fig. 18A(ii)
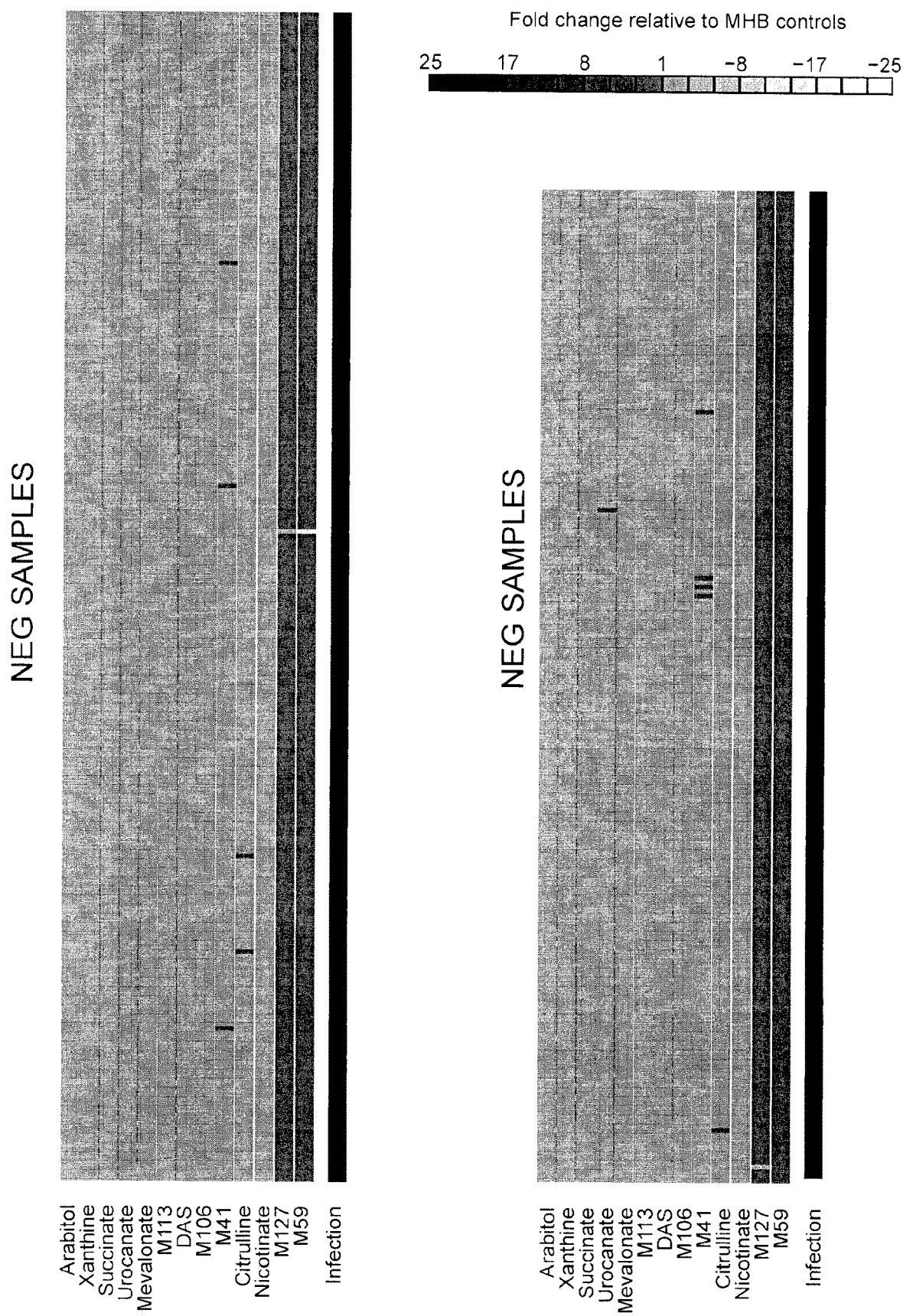

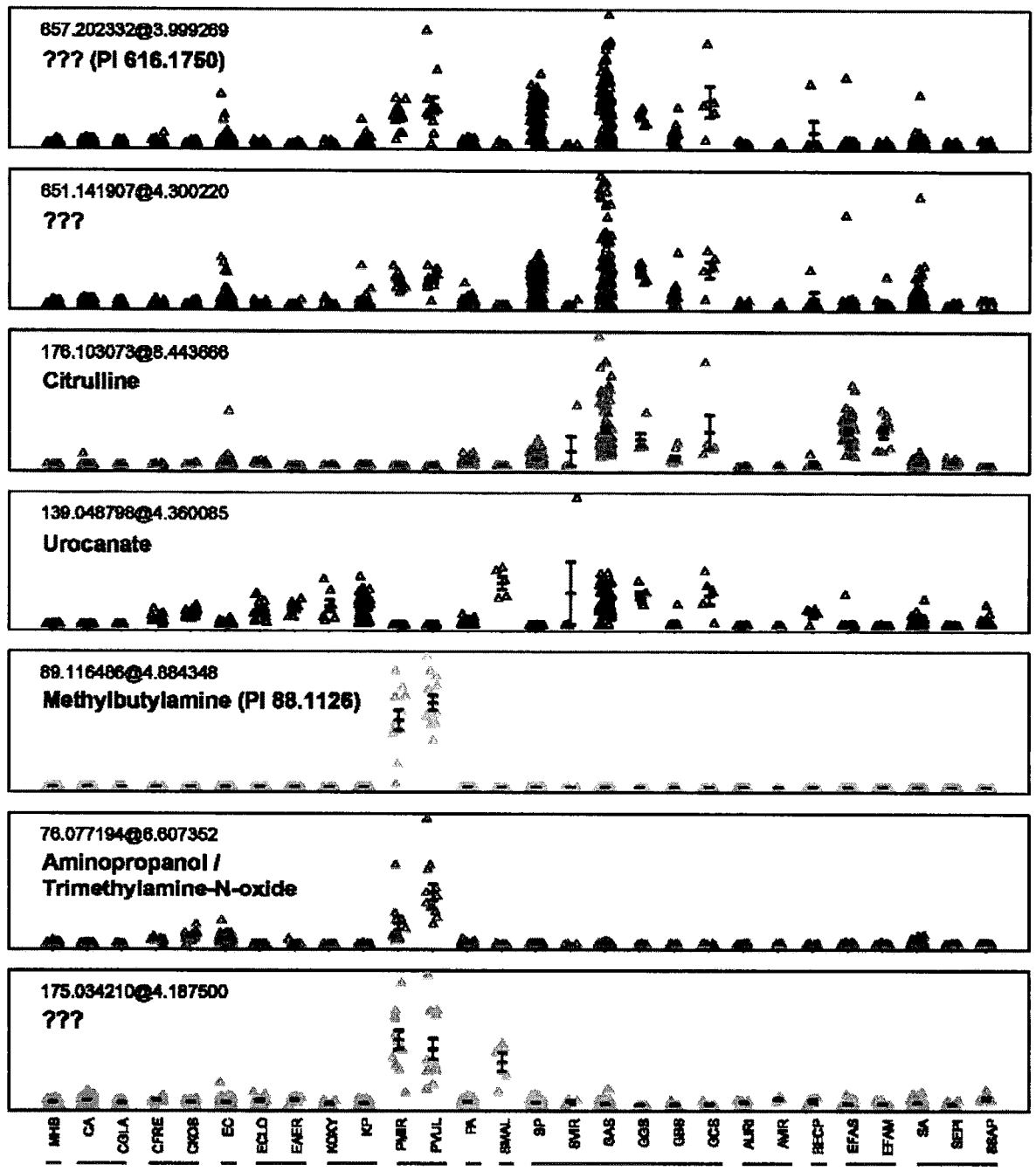
Fig. 18B(ii)

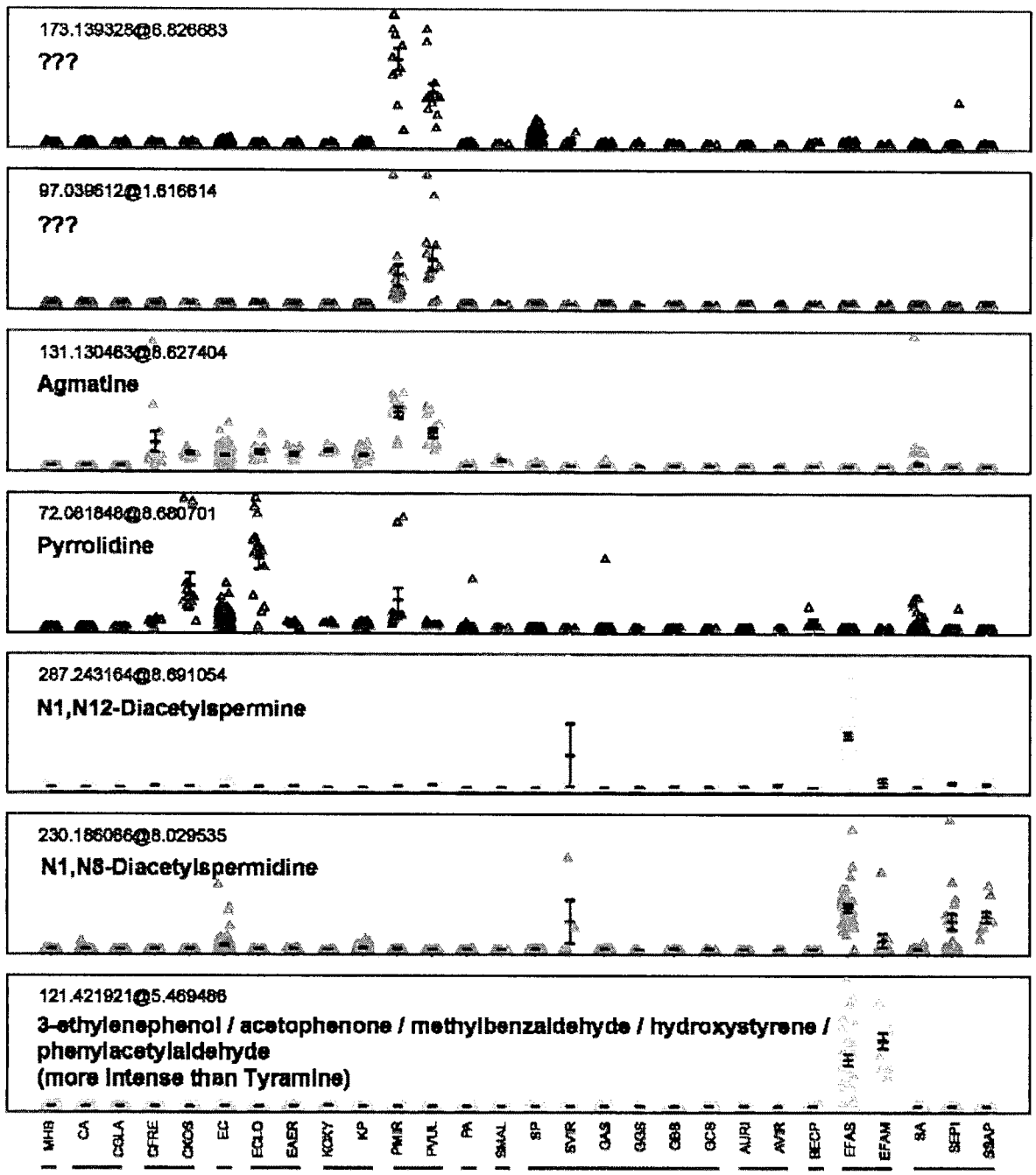
Fig. 18B(iii)

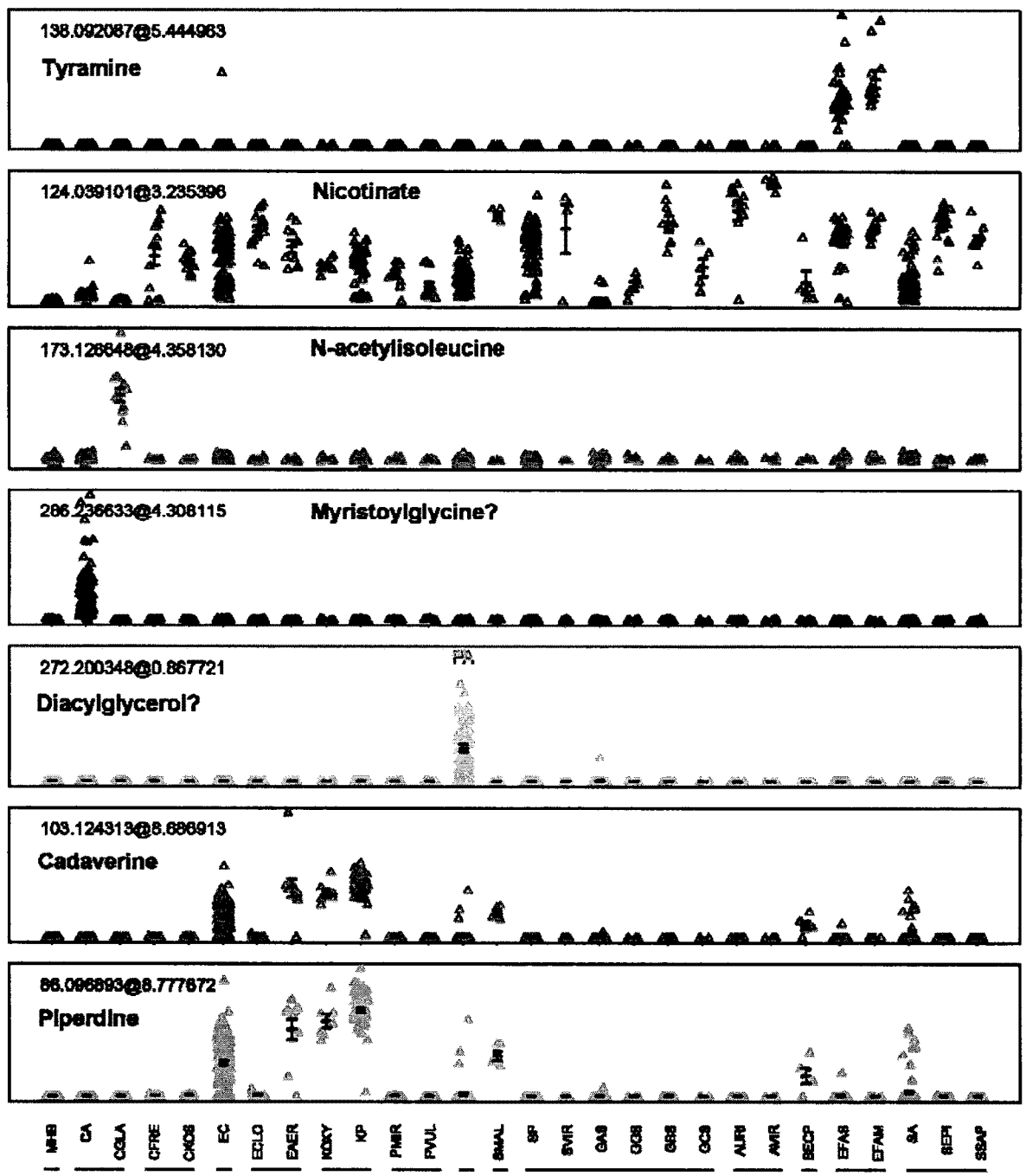
Fig. 18B(iv)

A

B

C

Biomarker Intensity Change with Individual Patient Blood Samples

METABOLOMIC CHARACTERIZATION OF MICROORGANISMS

CROSS-REFERENCE TO RELATED APPLICATIONS

This application is a U.S. national phase of International Application No. PCT/CA2019/051351, filed Sep. 20, 2019, which claims priority from U.S. Provisional Application No. 62/855,568, filed May 31, 2019, the disclosure of each of which is hereby incorporated by reference in its entirety.

FIELD

This invention relates to devices, methods, and systems for detecting consumed and produced metabolites to classify organisms and to measure organism sensitivity to toxic substances.

BACKGROUND

Timely identification of cells is useful in many applications. For example, rapid microorganism identification is of great value when considering food safety, genetic engineering research recombinant verification, microbe detection and disease treatment.

Considering disease treatment, specifically blood borne infection, for example, the length of time between the onset of symptoms and the initiation of effective antibiotic therapy for patients is a major contributor to the morbidity and the mortality from infections. In the case of blood stream infections, survival rates decrease from 80% to 72% over the first 6 hours and continue to decrease hour-by-hour as the infection progresses (FIG. 1).

In current practices, such as sample analysis by chemical tests or spectrometric methods such as by matrix assisted laser ionization desorption mass spectrometry (MALDI-MS), it takes 2-4 days to identify an unknown organism and to determine its level of drug sensitivity considering culture time and analysis. Most of the clinical diagnostic timeline for the current practice is spent waiting for microbial cultures to grow (FIG. 2).

SUMMARY OF THE INVENTION

Methods and systems have been invented for identifying living cells such as microorganisms. The methods and systems may also be useful for determining the sensitivity of microorganisms, or other cells, to toxic substances using changes in the concentration of consumed and/or produced metabolites present in a growth medium. The present invention may complete identification and toxin sensitivity testing in approximately half the time compared to the current practice.

In this application, the term "metabolite" is used to mean any substance used in or produced from cellular metabolism. Thus, metabolite includes both nutrients consumed and waste produced by a living cell. Sometimes, the terms nutrient and precursor are used to indicate a metabolite that is consumed in cellular metabolism.

Also in this application, the terms cell, organism, microorganism, microbe, pathogen and bacteria are used interchangeably. These terms refer to one or more microscopically small organisms which may include any of bacteria, fungi, protozoa or other living, isolated cells such as cell suspensions (i.e. excised cells, tissue culture, etc). Note, therefore that the invention can be used for identification of living cells that metabolize in culture such as, for example, bacteria, fungi, protozoa or isolated cells from excised tissue or tissue culture and these cells are collectively often referred to herein as cells or microorganisms. To be clear, the invention is useful for the analysis of living cells, such as: identification of infection-causing cells and their response to toxins, identification of food contaminating cells or cancer cells, for example for response to toxins such as chemotherapies.

In this application, "toxin" is any substance that modulates the metabolic activity of a cell. This may a substance that kills a cell as well as a substance that impairs or stimulates a cell function, such as any one or more of metabolic pathways. The cell function may therefore are cease or be modified to result in a detectable change in metabolic consumption or output.

Furthermore, in this application, "medium" (and/or) "media" is any liquid or solid-based nutritional substance that is used for growth of cells, sustaining dormant cells, and/or promoting, inhibiting, or sustaining cellular metabolism. Herein, "defined" and "undefined" medium are discussed. While both defined and undefined medium can be complex or rich, defined medium has a substantially known composition, and undefined medium has no established composition and, often, is an extract of a nutrient source such as animal, microbial, or plant extracts. While the composition of an undefined medium may be roughly known, it can vary batch to batch. Herein, defined medium/media specifically excludes animal, microbial, or plant extracts that have not been purified to single compounds.

In accordance with a broad aspect of the present invention, there is provided a method for identifying a cell type of a cell in a sample.

In accordance with a broad aspect of the present invention, there is provided a method for identifying a cell type of a cell in a sample, comprising:
culturing the sample in a growth medium comprising niacinamide to obtain a cultured growth medium;
analysing the cultured growth medium by chemical analysis; and
identifying the cell type as at least one of *Escherichia, Klebsiella, Pseudomonas, Enterococcus, Staphylococcus* or *Streptococcus* species when the cultured growth media contains a higher concentration of nicotinate compared to the growth medium.

In accordance with another broad aspect of the present invention, there is provided a method for identifying a cell type of a cell in a sample, comprising: culturing the sample in a growth medium to obtain a cultured growth medium; analysing the cultured growth medium by chemical analysis; and identifying the cell type as at least one of *Enterococcus faecalis, Staphylococcus saprophyticus*, or *Staphylococcus epidermis* when the cultured growth media contains a higher concentration of N1,N8-diacetylspermidine compared to the growth medium.

In accordance with another broad aspect of the present invention, there is provided a method for identifying a cell type of a cell in a sample, comprising: culturing the sample in a Mueller Hinton growth medium to obtain a cultured growth medium; analysing the cultured growth medium by chemical analysis; and identifying the cell type as *Enterococcus* species when the cultured growth media contains a higher concentration of N1,N12-diacetylspermine compared to the growth medium.

In accordance with another broad aspect of the present invention, there is provided a method for identifying a cell type of a cell in a sample, comprising: culturing the sample in a growth medium to obtain a cultured growth medium; analysing by mass spectrometry to determine if the cultured growth medium contains N-acetylleucine, N-acetylisoleucine or a biomarker with mass of 286.2 at a retention time of 4.3 minutes on the 15 minute HILIC method; and (a) if N-acetylleucine or N-acetylisoleucine are in the cultured growth medium, identifying the cell type as *Candida freundii* and (b) if the biomarker is in the cultured growth medium, identifying the cell type as *Candida albicans*.

In accordance with another broad aspect of the present invention, there is provided a growth medium comprising: 0.5 to 1.5 mM glucose, histidine, nicotinamide, hypoxanthine, threonine, spermine and arginine as metabolic precursors, pyridoxine and catalase, for culturing a sample to identify a pathogen in the sample.

In accordance with another broad aspect of the present invention, there is provided a use of a growth medium comprising 0.5 to 1.5 mM glucose, histidine, pyridoxine, nicotinamide, hypoxanthine, threonine, spermine, arginine and catalase for identifying a pathogen in a sample, wherein chemical analysis of the growth medium after culturing the sample identifies the pathogen from at least the following: *Escherichia* species, *Klebsiella* species, *Pseudomonas* species, *Enterococcus* species and *Candida* species.

In accordance with another broad aspect of the present invention, there is provided a method for identifying a toxin sensitivity of a pathogen in a sample, comprising: culturing the sample in a growth medium to obtain a cultured growth medium; analysing the cultured growth medium by chemical analysis and if the cultured growth medium contains mevalonate, identifying the pathogen as *Staphylococcus aureus*; culturing the pathogen with a toxin-containing growth medium known to have effect against *Staphylococcus aureus*; and analysing the cultured toxin-containing growth medium by chemical analysis for glucose consumption, to determine if the *Staphylococcus aureus* is resistant to the toxin.

In accordance with another broad aspect of the present invention, there is provided a method for analysing a biological sample to identify a pathogen therein, the method comprising: culturing the sample in a first medium to encourage metabolism for identification of the pathogen; at the same time, culturing the sample in a plurality of toxin-containing media each medium having a toxin against a different pathogen; after culturing, analysing the first medium for a metabolic outcome to identify the pathogen; and analysing only a selected toxin-containing medium from the plurality of toxin-containing media, the selected toxin-containing medium being selected to have a toxin relevant against the pathogen identified. There may be a non-transitory computer-readable medium storing instructions executable by one or more processors, for performing the method.

It is to be understood that other aspects of the present invention will become readily apparent to those skilled in the art from the following detailed description, wherein various embodiments of the invention are shown and described by way of example. As will be realized, the invention is capable for other and different embodiments and several details of its design and implementation are capable of modification in various other respects, all captured by the present claims. Accordingly, the detailed description and examples are to be regarded as illustrative in nature and not as restrictive.

DESCRIPTION OF THE FIGURES

For a better appreciation of the invention, the following Figures are appended:

FIG. 17A is a heat map showing biomarkers validated using a total 596 clinical isolates; and in FIG. 17B signals are shown of the top seven biomarkers that can robustly differentiate between the seven species studied.

*maltophilia*; SP, *Streptococcus pneumoniae*; SVIR, *Streptococcus viridans*; GAS, group A *Streptococcus*; GGS, Group G *Streptococcus*; GBS, Group B *Streptococcus*; GCS, Group C *Streptococcus*; AURI, *Aerococcus urinae*; AVIR, *Aerococcus viridans*; BECP, *Burkholderia cepacia*; EFAS, *Enterococcus faecalis*; EFAM, *Enterococcus faecium*; SA, *Staphylococcus aureus*; SEPI, *Staphylococcus epidermis*; SSAP, *Staphylococcus saprophyticus*.

Figure 19:
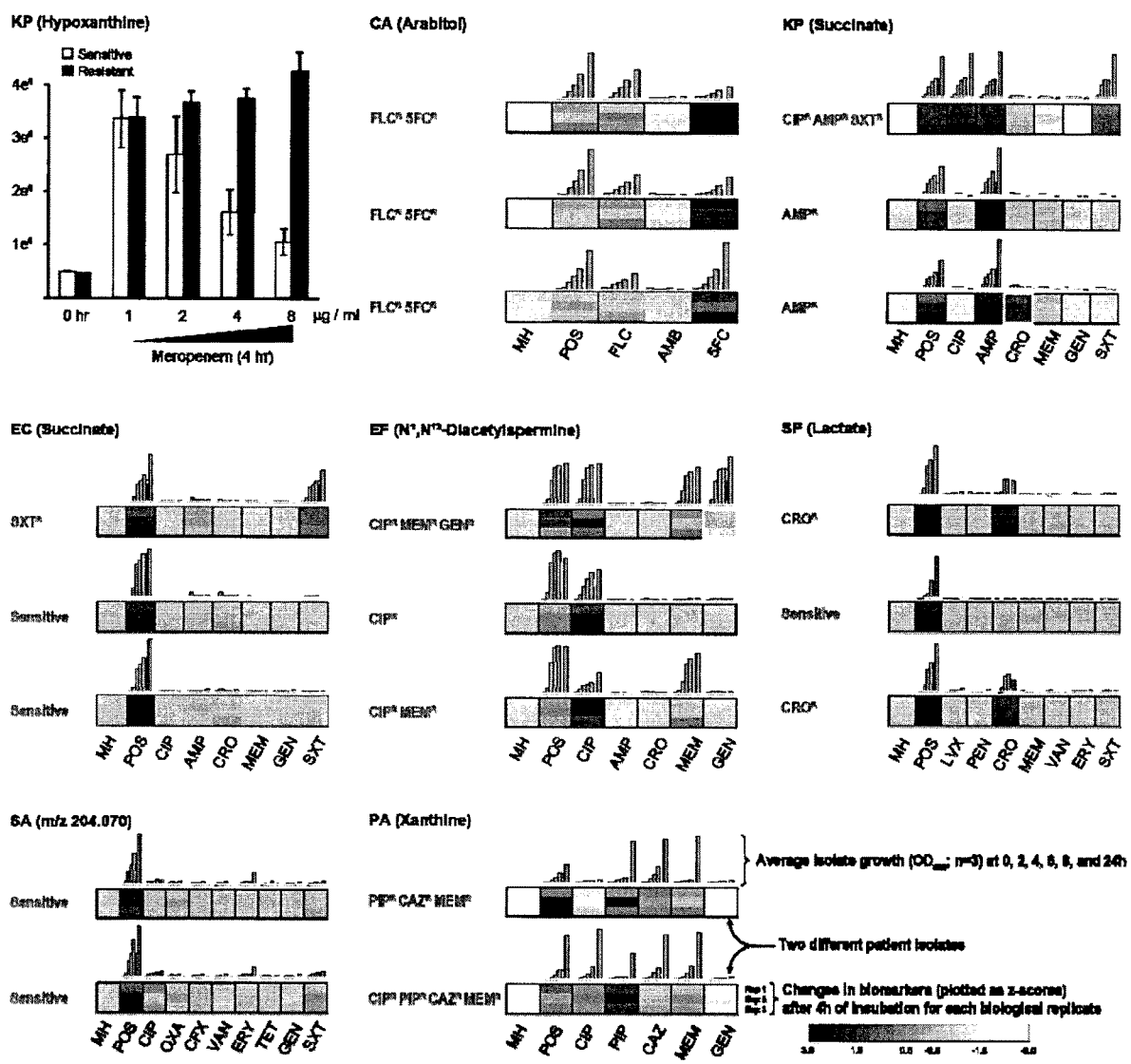

FIG. 19. From Example IX—metabolomic-based antimicrobial susceptibility testing (MAST). Changes in select biomarker levels after a 4 h incubation period for each strain and corresponding liquid growth assays. Biomarker production is observed either in the absence of antimicrobial or when an antimicrobial resistant strain is incubated with a sub-inhibitory dose of antimicrobial. Top-left panel demonstrates an antimicrobial concentration-dependent decrease in biomarker (hypoxanthine) production in sensitive strains versus the stable response of resistant isolates. Remaining panels show sensitivities to the most commonly prescribed antimicrobials for each species at minimum inhibitory concentrations (in µg/mL). FLC, fluconozole (2); AMB, amphotericin B (2); 5FC, 5-flucytosine (0.5); CRO, Ceftriaxone (0.5 and 1 for *S. pneumoniae* and *K. pneumoniae/E. coli* respectively); CIP, ciprofloxacin (1); MEM, meropenem (0.25, 1, and 2 for *S. pneumoniae, K. pneumoniae/E. coli*, and *P. aeruginosa*, respectively); GEN, gentamicin (4; 500 only for *E. faecalis*); AMP, ampicillin (8); SXT, trimethoprim-sulfamethoxazole (2/38); CAZ, ceftazidime (8); PIP, piperacillin (16); LVX, levofloxacin (2); PEN, penicillin (0.06); ERY, erythromycin (0.25 and 0.5 for *S. pneumoniae* and *S. aureus*, respectively); OXA, oxacillin (2); VAN, vancomycin (1, 2 and 4 for *S. pneumoniae, S. aureus*, and *E. faecalis*, respectively); CFX, cefazolin (4); TET, tetracycline (4). In KP, 3rd graph AMP, block CRO and EF, 1st graph CIP MEM GEN, block MH, the non-black border indicates, a negative correlation between biomarker production and overnight liquid growth assays (2% false discovery rate).

Figure 20A:
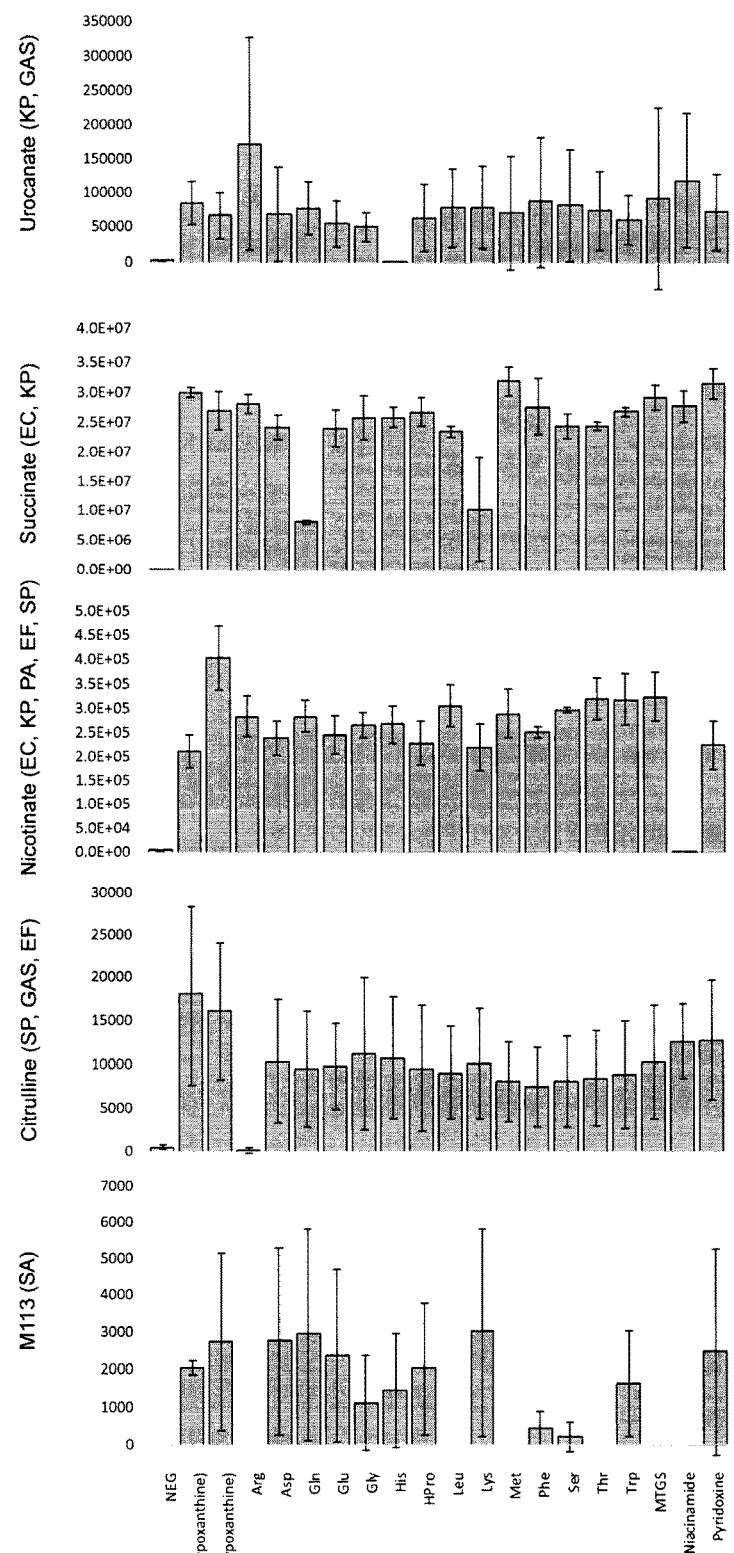
Figure 20B:
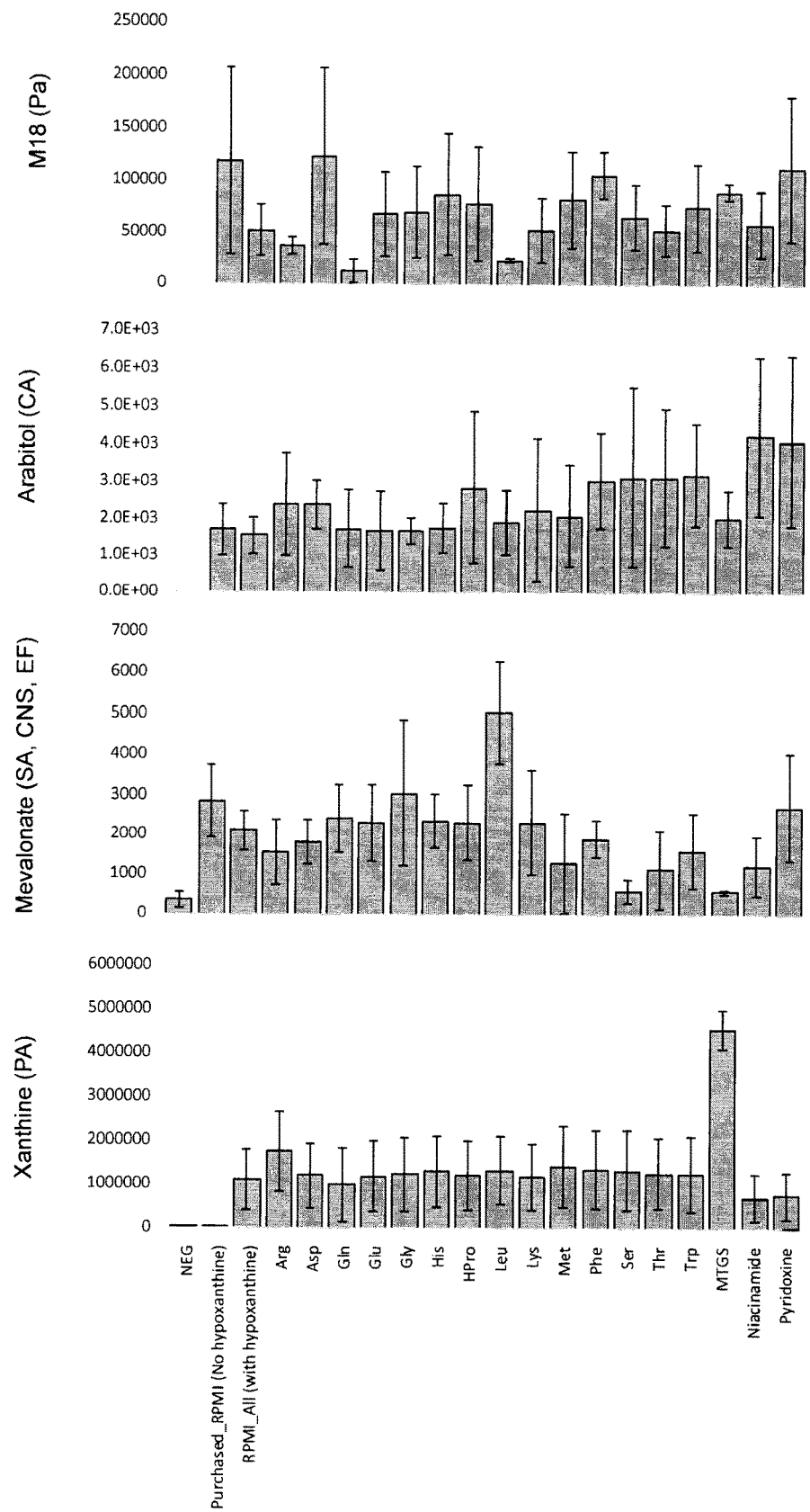

FIGS. 20A and 20B. From Example XI, RPMI component drop out experiments, where individual precursors (x axis) were omitted from the medium to determine if omission of a particular precursor eliminates biomarker production.

Figure 21:
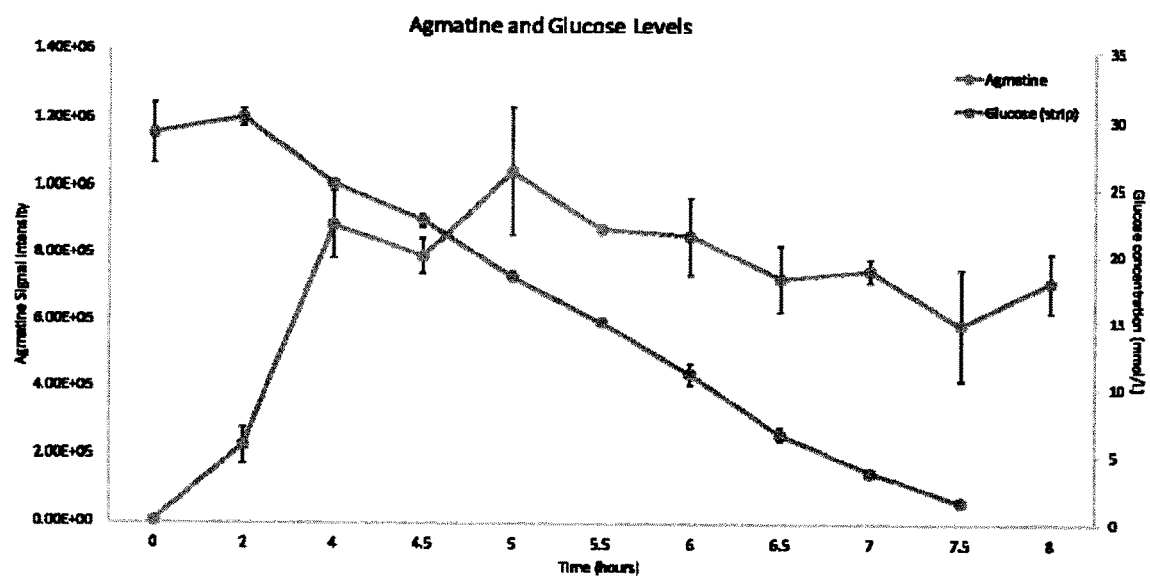
Figure 21:
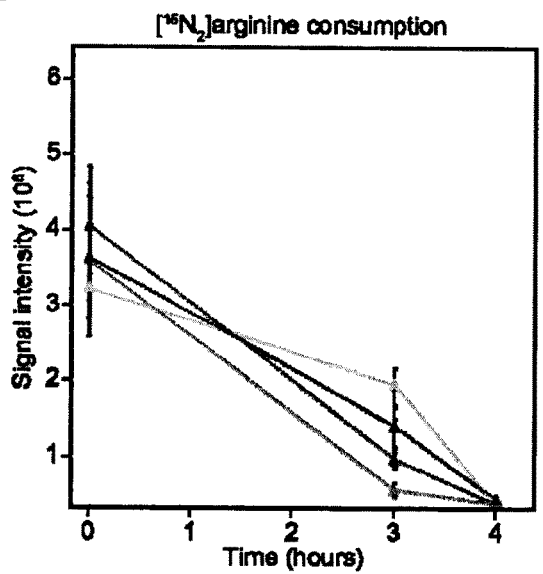
Figure 21:
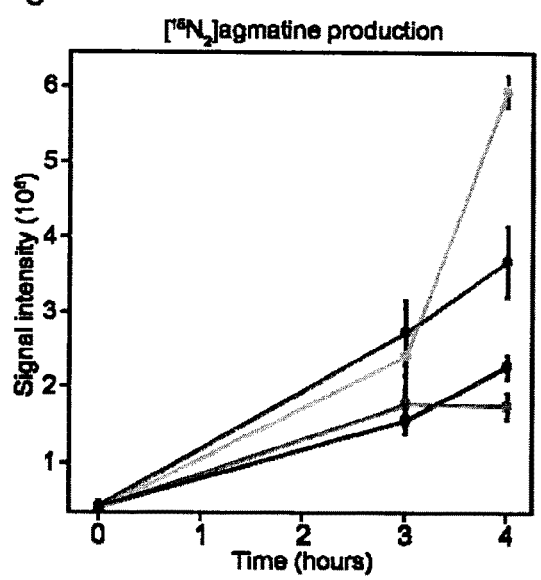

FIG. 21. Agmatine production from glucose or arginine. When Enterobacteriaceae c. was grown in M9 medium in the absence of arginine, agmatine was made from glucose (A). However, when $^{15}$N-labeled arginine was added to the M9 medium (B) it was consumed by the Enterobacteriaceae and converted to $^{15}$N-agmatine (C).

Figure 22A:
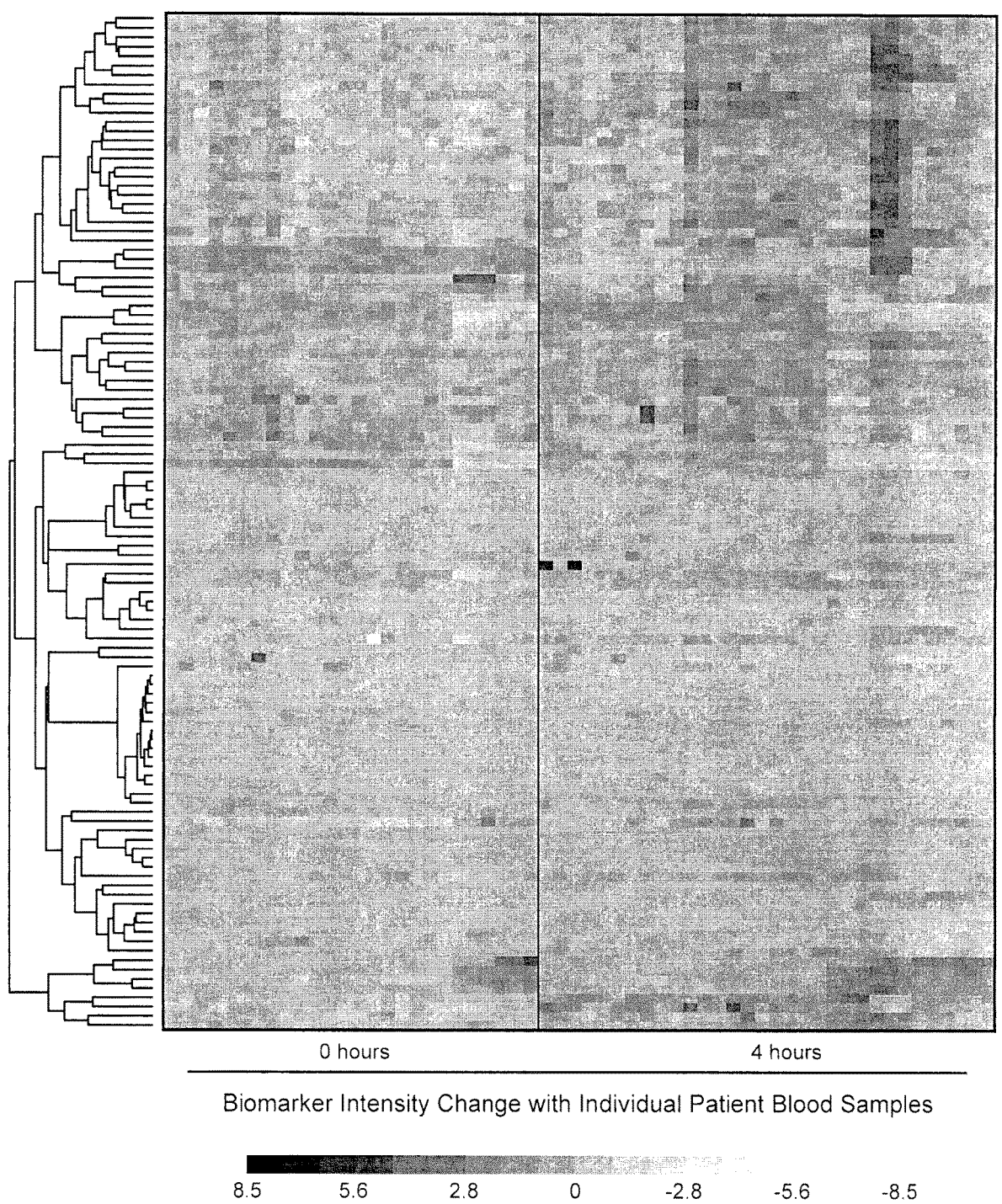
Figure 22B:
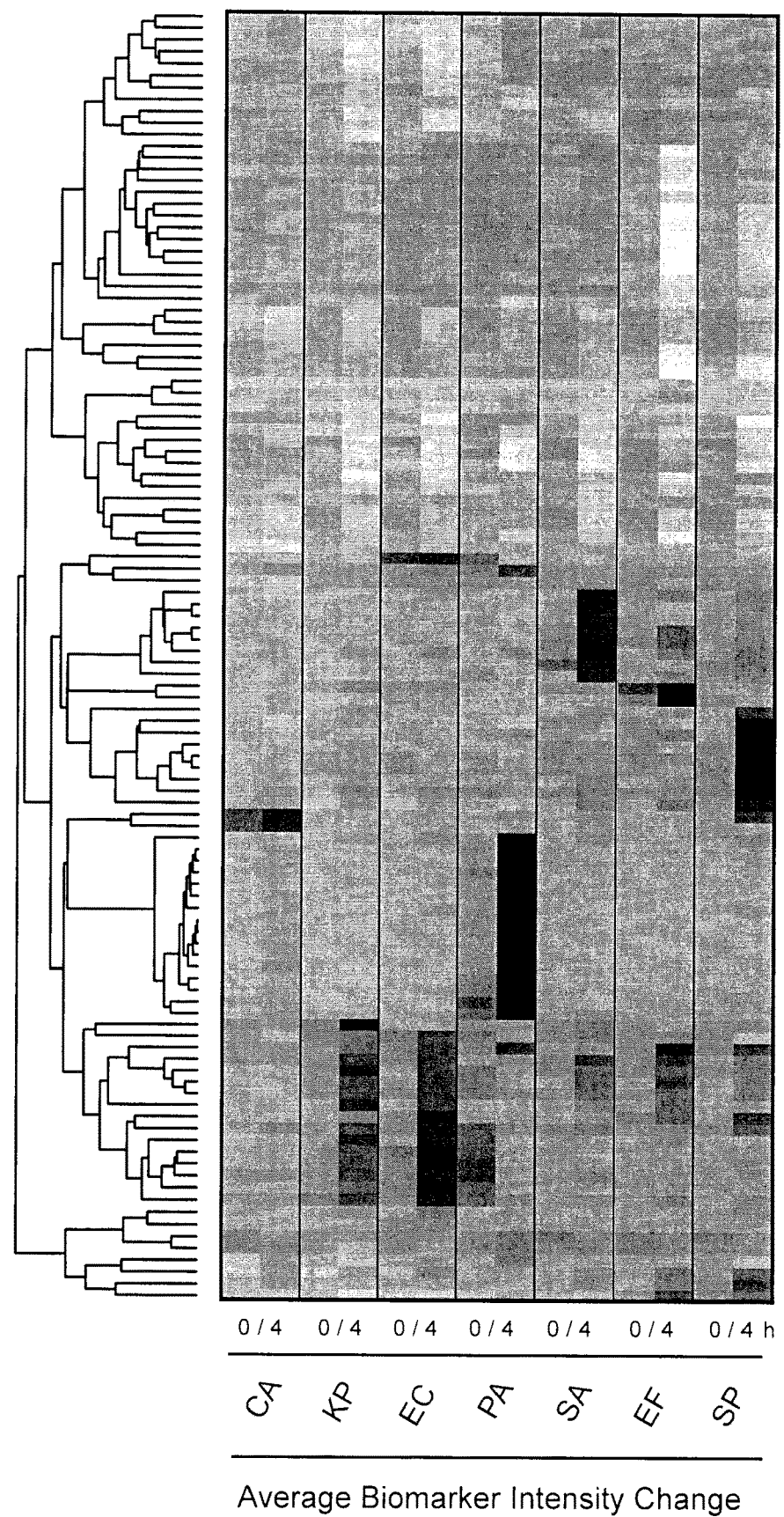

FIGS. 22A and 22B. Heatmap—blood in culture does not affect the markers.

Figure 23A:
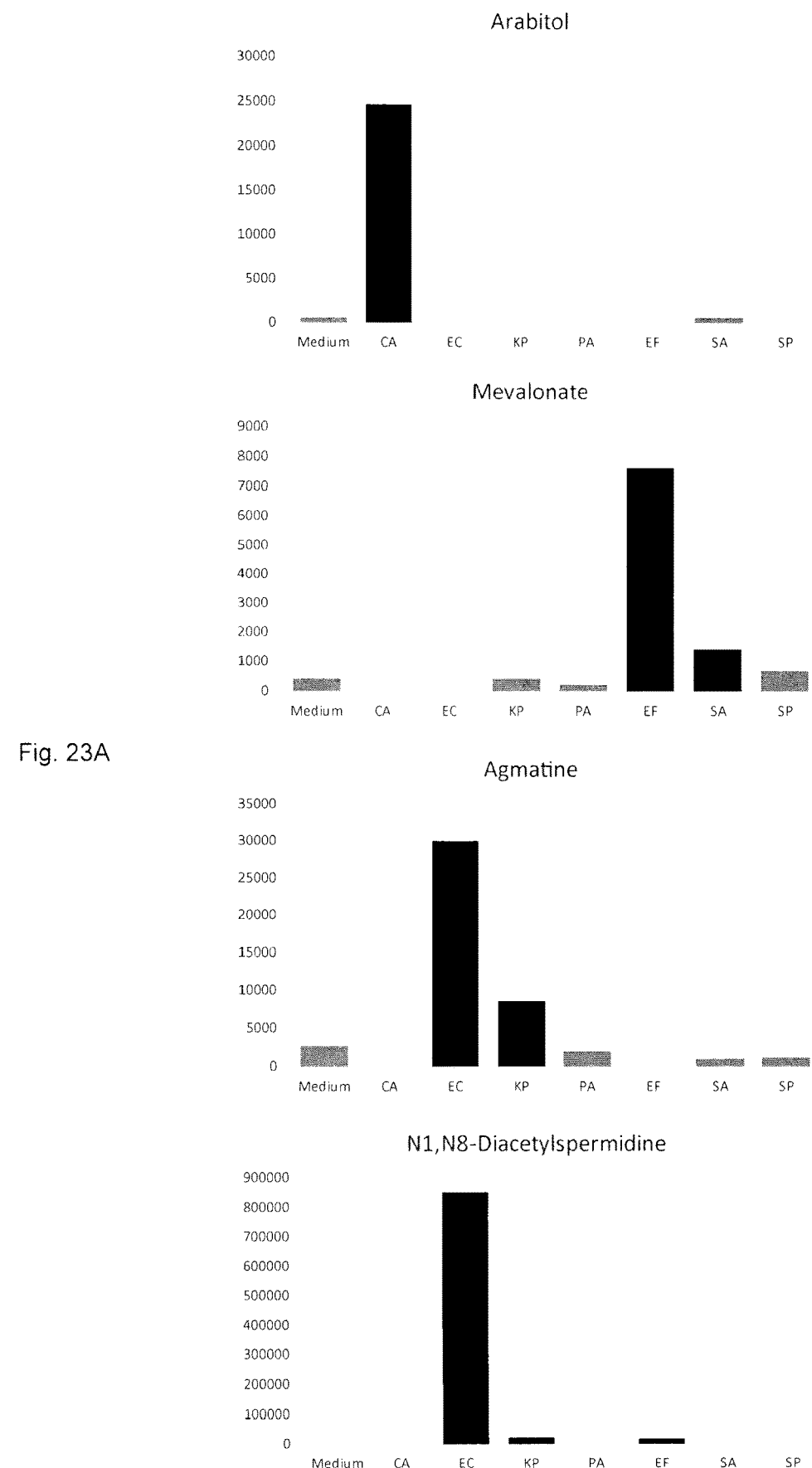
Figure 23B:
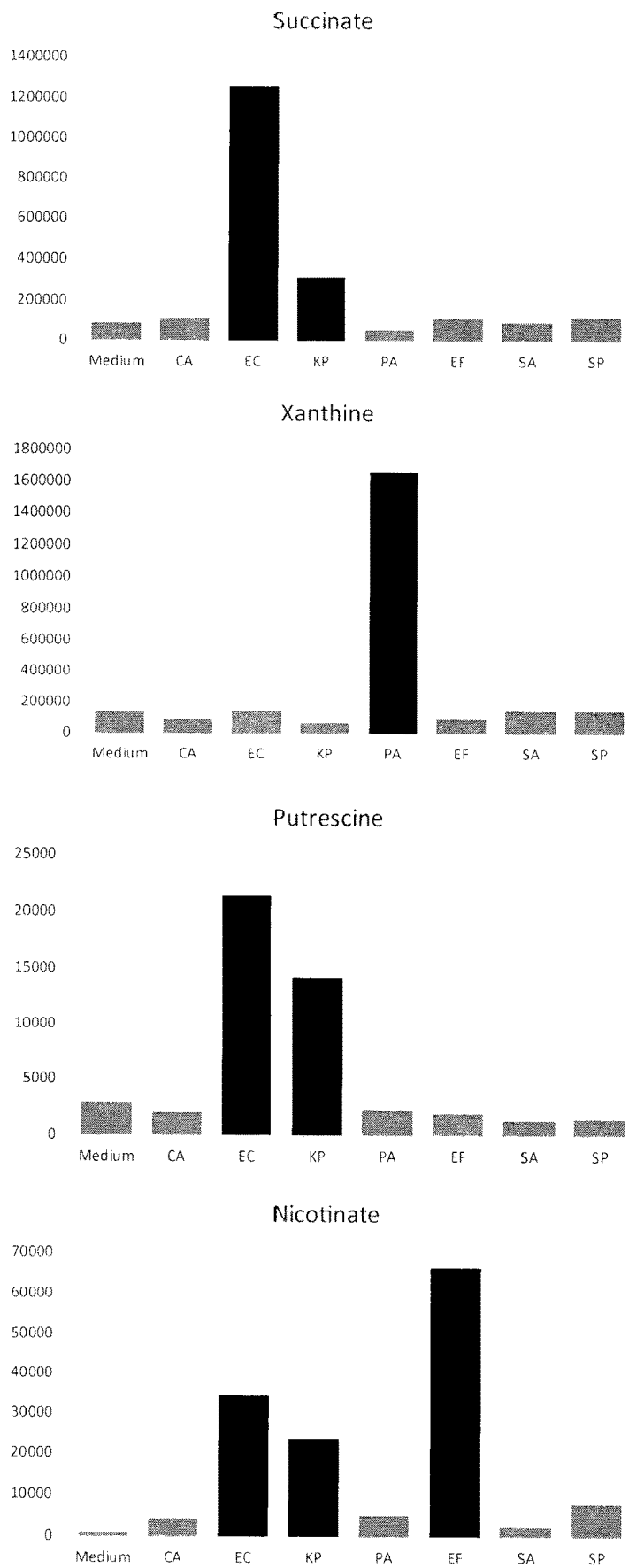
Figure 23C:
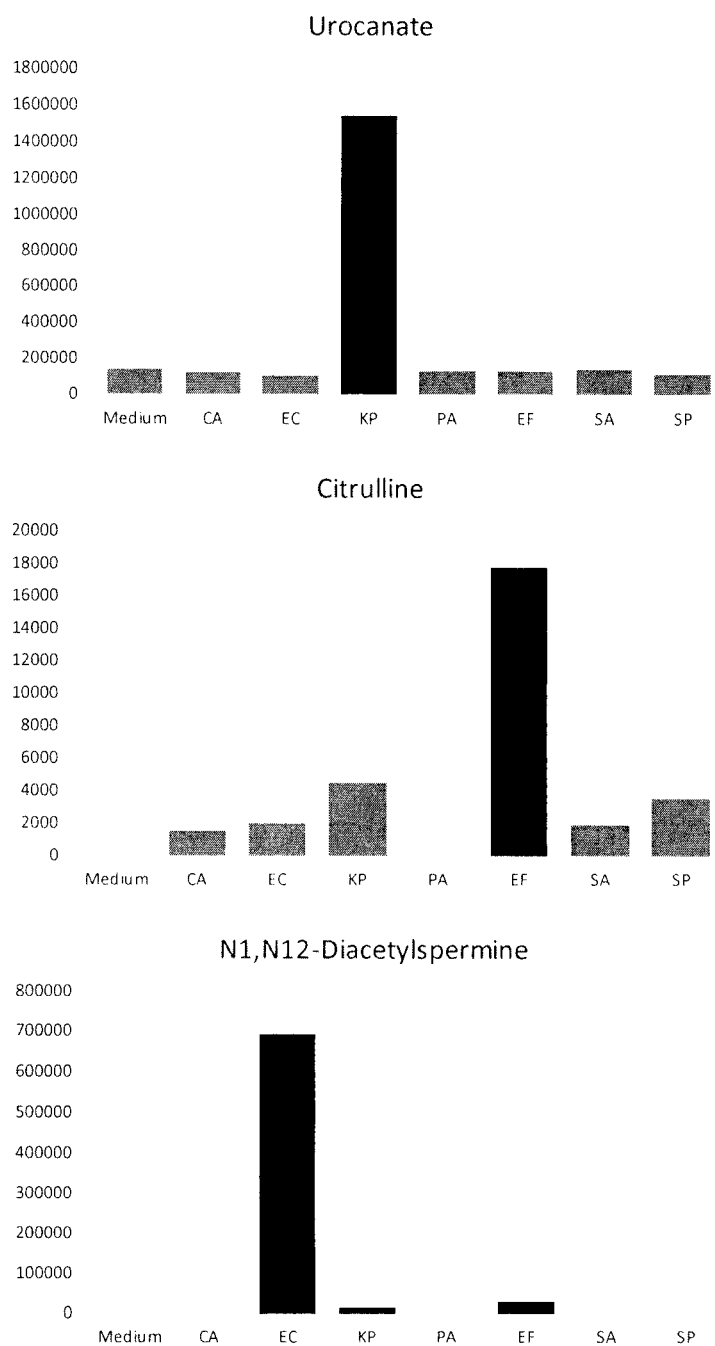

FIG. 23A to 23C. Biomarker production in limited custom medium of Table 1A.

Figure 24A:
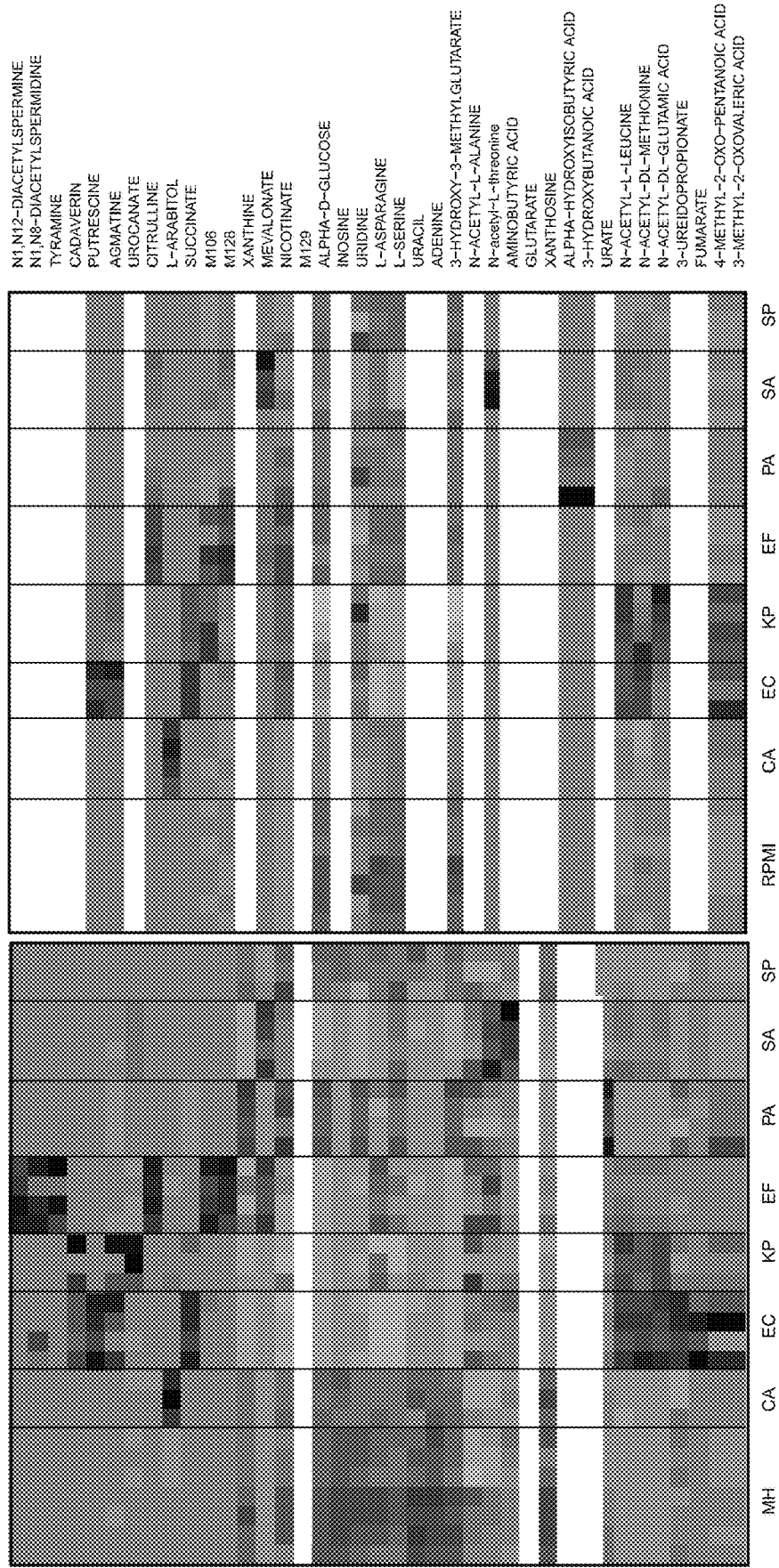
Figure 24B:
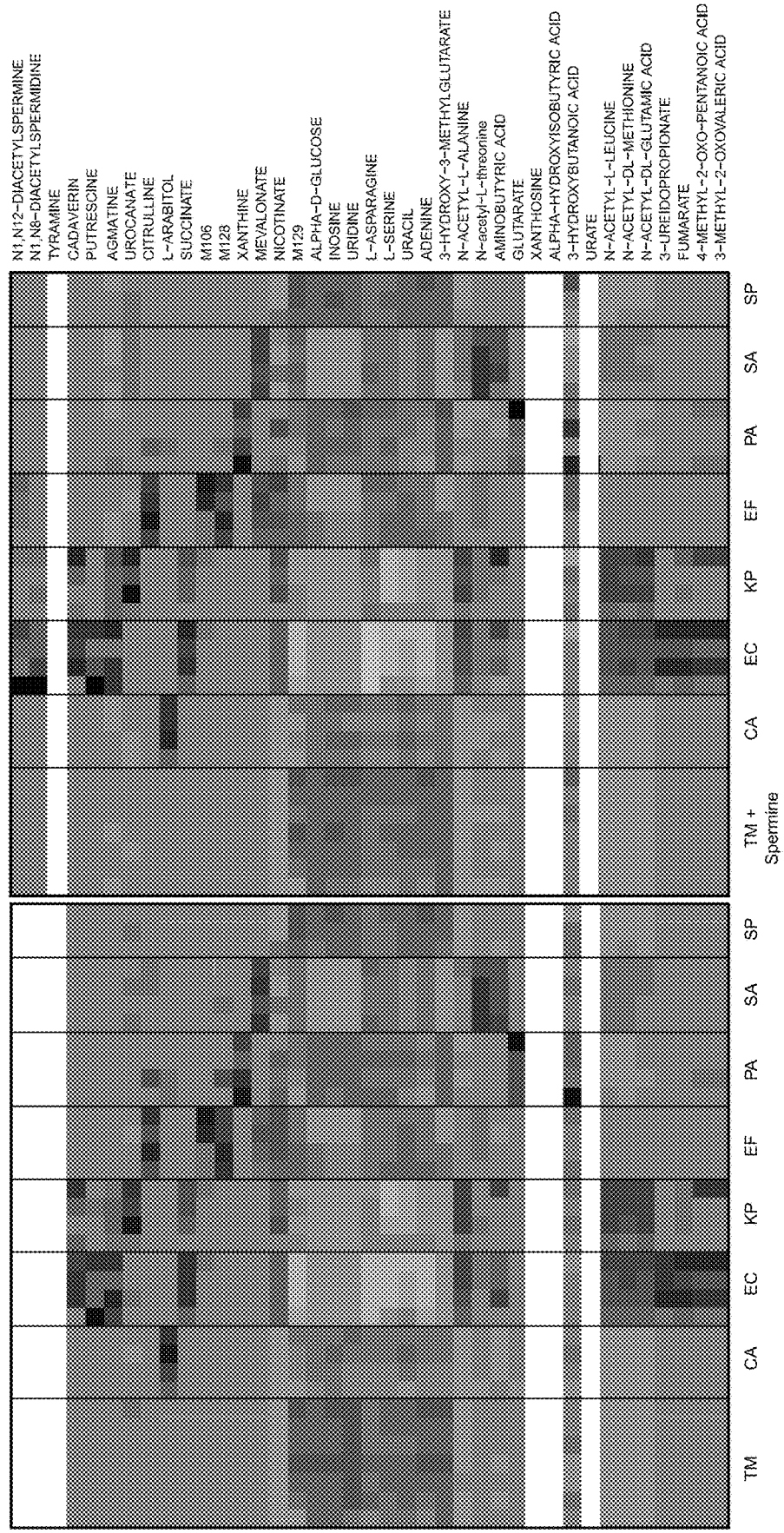

FIGS. 24A and 24B. Comparison of selected biomarker production in Mueller Hinton and RPMI (FIG. 24A) and custom medium of Table 1C (FIG. 24B).

Figure 25:
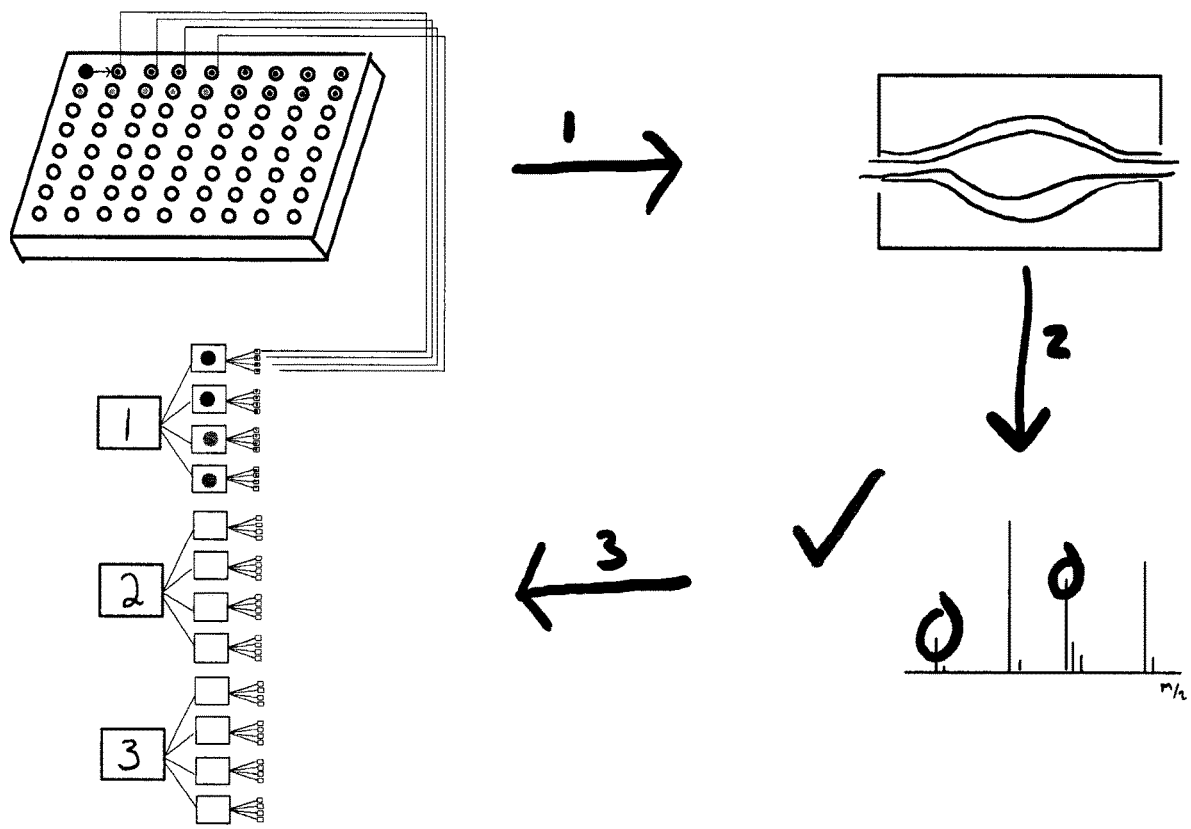

FIG. 25. Process diagram for data dependent sampling.

DETAILED DESCRIPTION

The detailed description and examples set forth below are intended as a description of various embodiments of the present invention and are not intended to represent the only embodiments contemplated by the inventor. The detailed description includes specific details for the purpose of providing a comprehensive understanding of the present invention. However, it will be apparent to those skilled in the art that the present invention may be practiced without these specific details.

The current practice of identifying microorganisms and determining their sensitivity to toxic substances (e.g. antibiotics) is as follows: (1) samples of biological fluids or tissue swabs are collected from a patient; (2) samples are combined with a nutrient-containing growth medium (either solid or liquid); (3) samples are incubated to allow microorganisms to grow until they reach detectable levels (approximately 18-48 hours); (4) microorganisms are identified based on protein profiles using chemical tests or spectrometric methods [e.g. matrix assisted laser ionization desorption (MALDI) mass spectrometry (MS)]; (5) aliquots of the microorganisms are placed in growth medium (either solid or liquid) containing toxin(s); (6) the growth rate of the microorganisms with and without the toxin(s) over approximately 18-48 hours is determined; and (7) data from reference microorganisms is used to determine toxin-sensitive versus toxin-resistant growth rates.

Living cells, such as microorganisms, continuously metabolize: take up nutrients and secrete waste products. Living cells, such as microorganisms, use metabolic nutrients from their environment to supply their energy, redox, and biosynthetic needs. These general requirements of life can be met via a variety of metabolic pathways. Microorganisms have developed diverse metabolic strategies for acquiring and processing their nutrients. These metabolic activities are constrained by the genetic composition and the environmental conditions of the organisms. Each molecule taken up by a microorganism contributes to a complex network of chemical reactions. Metabolic waste products from these networks are substances that do not contribute to the viability of the organism and are secreted to the environment. These metabolic endpoints depend on an organism's metabolic pathway architecture, which is constrained by genetic and environmental factors. Consequently, if environmental conditions are controlled, then the metabolites, which are molecules taken up by organisms and substances they secrete back to their environment, are biological markers for the genetic composition of the microorganism. These metabolites are detected by the present invention and are used to identify the cell type of the organism. The cell type of the organism may be the general class of the organism (i.e. gram negative, gram positive, etc.), the species or species of origin (i.e. the bacterial species, human, etc.), or the strain or the distinguishing characteristic (i.e. human blood cell, resistance or sensitivity to a toxin such as an antibiotic or chemotherapy, quiescence or actively growing, successfully genetically transformed, etc.).

The biological consumption of nutrients and the secretion of waste products is an essential component of living cells. Environmental conditions, such as the presence of toxins, may modulate a cell's metabolism by killing the cell or stimulating or substantially impairing the flow of metabolites into or out of the cell. The present invention, may also detect the cell type relating to a subspecies, strain characteristic such as its toxin-induced changes to nutrient uptake and waste secretion. Toxins may include, for example, antibiotics, inorganics, cancer chemotherapies, etc.

Figure 1:
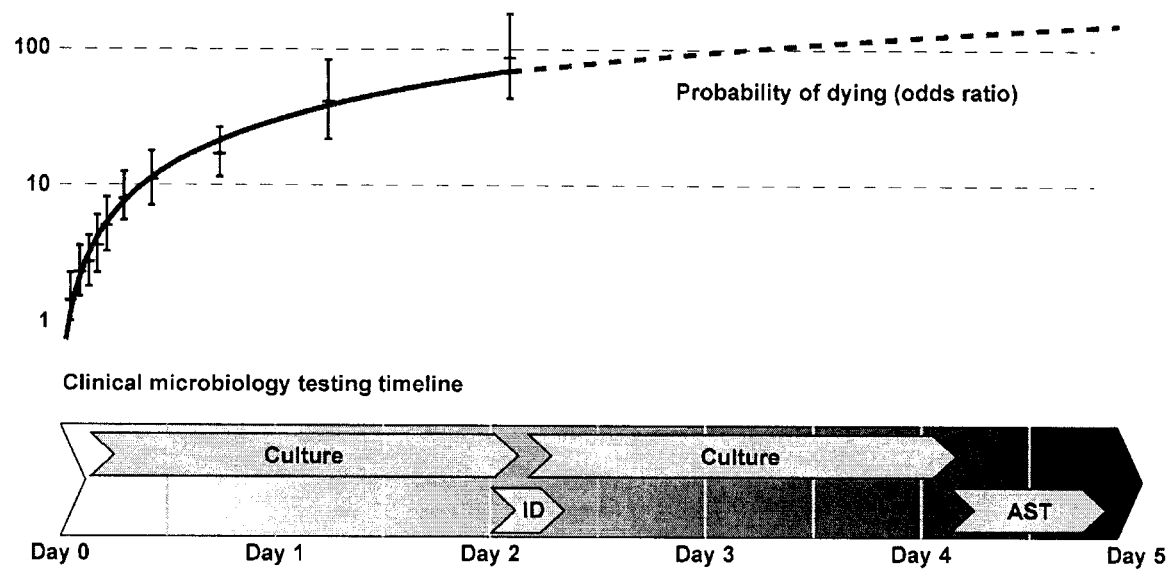
FIG. 1. Shows microbiology testing timeline versus the probability of patient death due to infection. Survival data are shown between the onset of symptoms and administration of antibiotics. Resistance refers to antibiotic susceptibility testing time and ID refers to microbial identification by MALDI-MS.
Figure 2:
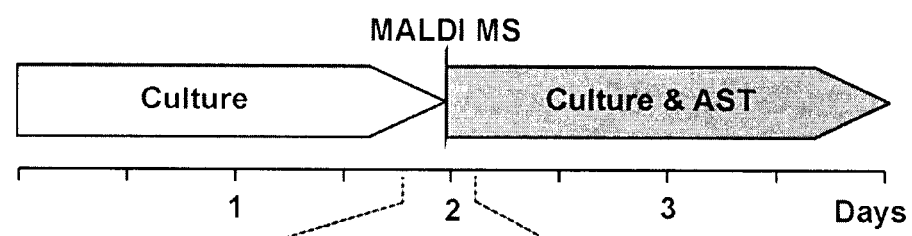
FIG. 2. (A) Shows clinical workflow for current health care practice for identification of an unknown organism and its toxin sensitivity. The first 1-2 days of culturing are spent waiting for bacteria to grow to detectable densities. MALDI-MS analyses are then completed to identify the unknown organism. An aliquot of the culture is inoculated into new cultures and antibiotic susceptibility testing ("AST") is completed by growing the unknown organisms in several antibiotics over a range of drug doses. (B) Shows a possible timeline for one embodiment of the present invention. The unknown organisms are combined with a nutrient-containing growth medium and incubated for four hours. Metabolite analyses are conducted using an MS instrument. Antibiotic susceptibility testing is completed in the second stage incubation ("Inc+anti"). The unknown organisms identified in the first stage are combined with a controlled dose of antibiotics in fresh growth medium and incubated. Metabolites present in the growth medium are assessed by MS to determine the effective antibiotic dose.
Figure 2:
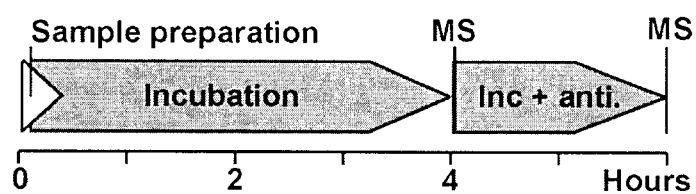
Figure 3:
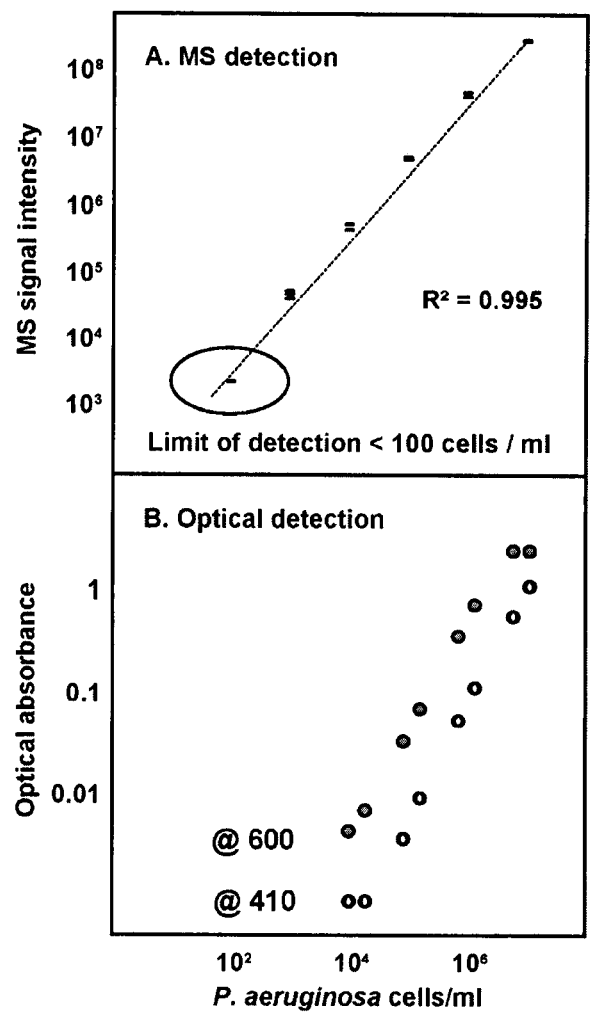
FIG. 3. Shows MS-based and optical-based limits of detection.

Growth medium in which cells are grown provides the nutrients and accumulates the waste. Consequently, the metabolic signal of microorganisms is amplified over time through cumulative changes in media composition. As a result, metabolites in the growth medium can be more than 500,000 times more abundant than the peptides and proteins currently used for MALDI-MS classification of microorganisms. Thus, a metabolically-based assay allows microorganisms to be detected at low concentrations. For example, the present invention can identify a microorganism based on analysis of a sample with fewer than 100 bacteria per milliliter (FIG. 3). This sensitivity shortens the incubation times compared to the current practice.

Also, in the present invention the metabolites of greatest interest are small molecules, for example, of less than 600 Daltons, or even less than 400 Daltons. Such metabolites are mostly monomers. These metabolites are consumed and appear very rapidly in the growth medium and, particularly, much more rapidly than macromolecules such as peptides and proteins currently used for MALDI-MS classification of microorganisms.

The devices, methods and systems of the present invention identify the cell type of an organism. It can identify an unknown organism's general class, species or particular cellular characteristics such as toxin sensitivity.

Figure 4A:
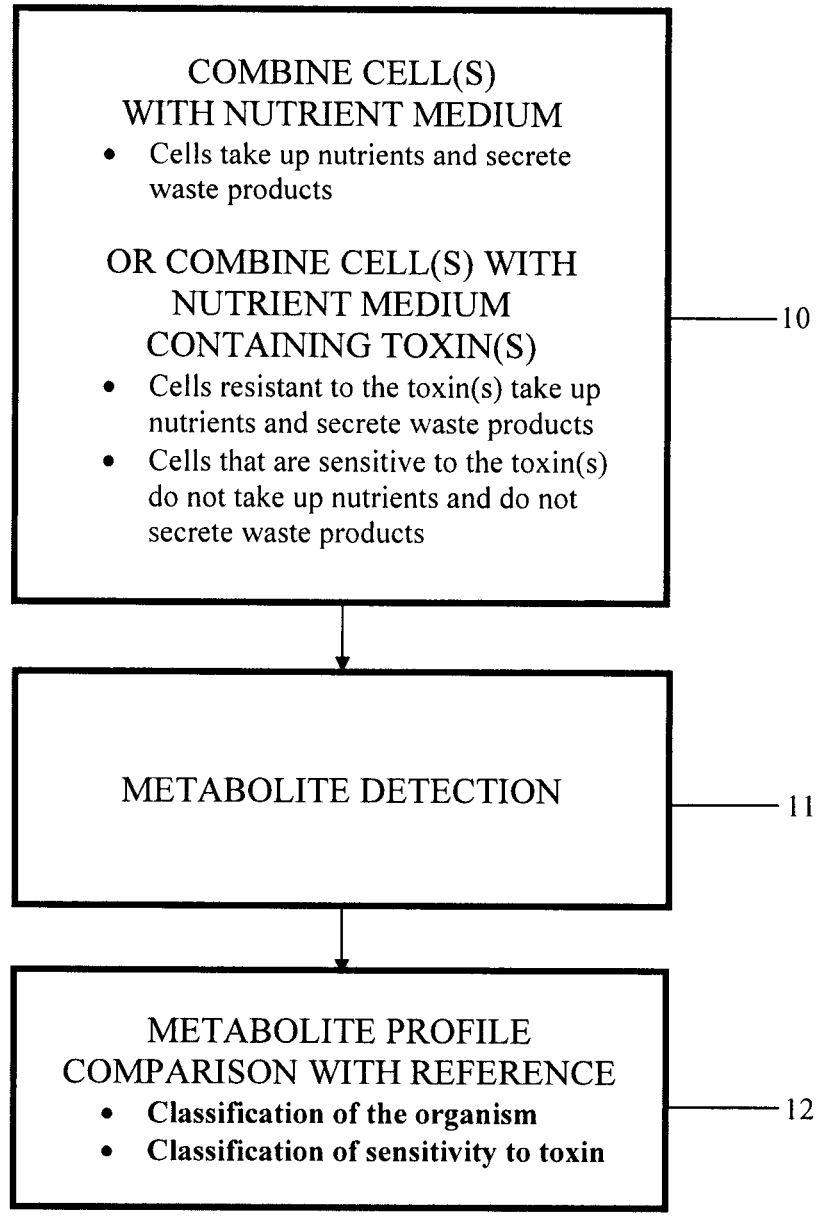
FIG. 4A. Shows an example of a method flow diagram for identifying an unknown organism and determining its sensitivity to toxins.

In one embodiment, a method (FIG. 4A) includes: incubation 10 of a sample in a growth medium, chemical analysis 11 of metabolite biomarkers in the growth medium after incubation; and identification 12 of a microorganism in the sample by comparison of metabolite biomarker levels in the growth medium with reference metabolite profiles.

The incubation period allows cells in the sample to metabolize: consume their preferred nutrient(s) and secrete metabolic waste products. Metabolites present in the medium after analysis are analyzed to obtain metabolic data for the organisms in the growth medium. Reference metabolite profiles, which are the known metabolite results for groups of microorganisms or individual species or subspecies and strains, as described below, are compared to the metabolic data acquired from analysis of the sample, thereby to classify the unknown organism.

Samples that can be added to the growth medium include, but are not limited to: food, tissue, biological fluids, such as for example any of feces, blood, urine or cerebral spinal fluid or swabs, such as from living or non-living surfaces (i.e. tissue swabs or swabs from clinical surfaces). The sample may be unprocessed or may be pretreated. In one embodiment, for example, the method includes pretreating the sample to separate microorganisms from remaining sample contents. For example, a swab may be soaked to collect microorganisms therefrom. As another embodiment, the method may include separating microorganisms from other sample constituents such as other cells. For example, blood samples may be processed to separate microorganisms from patient cells such as blood cells. This processing, for example, may be by size exclusion such as filtration or centrifugation. However, it is noted that experimental data has shown that the present method can accurately identify a microorganism from a sample, even where it contains other living cells such as a biome or blood cells.

To facilitate separation, the method may further include sample dilution. Thus, the method may include pretreating the sample including diluting the sample and separating the microorganism cells from the diluted sample. Dilution may be growth medium or nutrient-free wash solutions, such as sterile saline.

With or without separation, in another embodiment, a pretreatment step includes concentrating the microorganisms from the sample into a concentrated analysis solution. For example, concentrating can be by filtering or separation by density (i.e. centrifuge). Concentration can reduce the sample volume by $1/10$ to $1/100,000$. For example, a 1-10 ml sample can be reduced to less than 50 µl. For example samples of about 5-25 µl are useful. Concentration may result in a microorganism concentration of less than 500 cells per ml or possibly less than 100 cells per ml. In one embodiment, the step or concentration brings the microorganisms to a known or desired cell count per volume (concentration).

The growth medium contains nutrients to support cellular metabolism. Because the present invention is based on the analysis of normal metabolism, the growth medium need not contain any non-typical biomarkers or macromolecules, but instead may be typical growth medium such as, for example, liquid or solid formulations of M9, Mueller Hinton (MH) medium, Lysogeny broth, tryptic soy broth, yeast extract peptone dextrose, BacT™, BacT/Alert™, Vitec™, Dulbecco Modified Eagle Medium™ or Roswell Park Memorial Institute™ (RPMI) medium. In one embodiment, a growth medium is used that has a custom composition to support growth of one or more selected microorganisms and for production of biomarkers. The growth medium was engineered to ensure growth of selected pathogens, according to nutrient requirements therefor, and to ensure biomarker production. This may control the particular cell to be cultured and/or may simplify analysis, as there will be fewer metabolites to identify. In one embodiment, a control chemical that is not involved in metabolism may be added to the growth medium for tracking use during spectrometric analysis. In one embodiment, isotope labelling can be employed to permit tracking. For example, a known nutrient may be labelled so that the metabolism and modification/secretion thereof can be followed.

Rich, also termed complex, medium with many nutrient options may facilitate cell growth, to thereby increase the speed of analysis and thereby speed of cell type identification. On the other hand, simpler medium with fewer nutrients may readily select for the growth of fewer cell types but may be easier to analyse and thereby facilitate cell type identification. Notably, rich or simpler medium may be defined or undefined.

In one embodiment, the metabolic profile of the unmodified growth medium, before adding the sample, is of interest for comparison and may be obtained by chemical analysis. In some methods, a control of the growth medium may be collected shortly after addition of the sample. Any microorganisms in the control may be killed to stop metabolism. In other embodiments, no control is required if the spectrometric profile is already available for a selected growth medium or the starting growth medium spectrometric profile is not of interest.

Incubation permits the microorganisms in the sample to metabolize to consume and generate metabolites. Incubation may be carried out at an elevated temperature such as about human body temperature for example 35-40° C. Incubation should be maintained for a period suitable to generate detectable amounts of waste products from metabolism. In one embodiment, the method includes incubation for 1-6 hours, such as 2-4.5 or 3.5-4.5 hours. In one embodiment, time of incubation is set and variance is limited to +/−30 minutes or even lower such as +/−10 minutes. In particular, microbes may undergo various stages of metabolism during their life cycle. During a first stage of metabolism certain first chemicals are generated and over time those first chemicals are broken down by further metabolism or natural decay. In situations such as the acidogenic to solventogenic shift, the metabolite profile may change over time. As such, it may be important to control the period of time for incubation in order to establish the metabolic profile of the sample at a particular stage of metabolism. Control of the duration of incubation may ensure the repeatability of the method and accuracy of the sample profiles as against reference profiles obtained from similarly timed incubations.

As noted hereinabove, it is desirable to reduce the time for identification of organisms. In the method, the incubation step may require the most time. To reduce the overall time for analysis, the method may include performing any pretreatment steps in growth medium and possibly also applying heat during the pretreatment steps. For example, ambient or heated growth medium can be employed for dilution, separation and concentration such that incubation is initiated and the microorganisms begin to metabolize during these steps. Also, equipment used for pretreatment can be heated. For example, the equipment, such as for dilution, filtration, centrifugation, etc., can be heated to about 35-40° C.

After incubation, the growth medium is analyzed to determine its metabolite content, which is its metabolic profile. In one embodiment, after a selected incubation time, the growth medium is quenched to stop metabolism. In other words, any living cells in the growth medium are killed. The method employed for quenching may be selected to reduce chemical modification, thereby to preserve the metabolites. In one embodiment, methanol is added to the growth medium to stop metabolism.

The method includes chemical analysis of the growth medium after incubation to identify the metabolites in the growth medium. In particular, the metabolites are employed as biomarkers and the levels of various metabolites are determined possibly including those consumed and produced.

Chemical analysis can be simple such as by pH assessment, analysis by a glucometer, simple chromatography or simple optical analysis. These methods are particularly useful for medium with simple profiles (FIG. 14) or where only a few metabolic biomarkers are of interest. While straightforward, the simple forms of chemical analysis may create a suitable signal indicative of the levels of the one or more metabolic biomarkers in the growth medium.

However, for more complex analysis, where, for example, the medium is more complex or more than one cell type may be present in the sample, more complex chemical analysis may be useful such as spectrometric analysis. Of course, the level of any particular metabolite is indicated by spectrometric signal intensity. The actual concentration of a biomarker is not necessarily determined, but as will be appreciated the spectrometric data is collected as a signal that has an intensity that may correlate to a concentration, all of which is referred herein as a metabolite level. When the growth medium is spectrometrically analyzed, a signal is generated that indicates intensities of a number of biomarkers. Because of the unique metabolic system of each type of microorganism, the growth medium from each species of microorganism generates a unique signal when the data from one or more metabolic biomarkers is considered. The resulting spectrographic data regarding the levels of one or more biomarkers is termed a metabolic profile. Spectrometric analysis may be by mass spectroscopy (MS), nuclear magnetic resonance spectroscopy (NMR) or spectrophotometry such as by optical analysis. Some useful MS platforms are liquid chromatography MS (LC-MS), triple quadrapole MS or high resolution MS.

It is noted that a metabolite signal in spectrometric analysis may be complex and in fact may include more than one signal per molecule. Overall, the group of signals for that molecule can be resolved and considered a single metabolite signal. For example, a mass spectrometer will detect 10-50 signals for each molecule that results from the original molecule (parent) plus a variety of fragments, adducts (chemical combinations that happen in the instrument), and isotopomers (naturally occurring forms of the molecule with 1 or more extra neutrons). Detecting any of these signals can indicate one molecule, and in this application a metabolite of interest.

Once analyzed, the microorganism can be identified by comparing the sample's resulting metabolic profile (i.e. spectrometric data regarding the biomarker levels in the growth medium after incubation) against reference metabolic profiles for known microorganisms grown in similar medium over a similar incubation period. As will be apparent from the examples that follow, such comparison can be done manually.

However, for speed of analysis the data can be analyzed by an analog, electronic or computerized processor against, for example, a stored database of reference metabolic profiles. Using a computer system with software, for example, numerous metabolite reference profiles may be rapidly compared to the metabolic data acquired from the sample to identify the cell type in the sample.

It is not necessary to identify the metabolites used as biomarkers provided the analysis data is compared against a reference metabolic profile obtained from similar conditions of growth medium, cell concentration and time period for incubation. Reproducible spectral features can be obtained by molecules that are related through structure or metabolic function such as amino acids, nucleosides, carbohydrates, tricarboxylic acid cycle intermediates and fatty acids.

As noted, metabolic molecules of greatest interest are those that are readily consumed or formed by cellular metabolism such as simple carbohydrates, amino acids, nucleobases and their derivatives. Such molecules are often smaller than 600 or 400 Daltons and are monomers or simple complexes of two or three monomers.

Figure 13A:
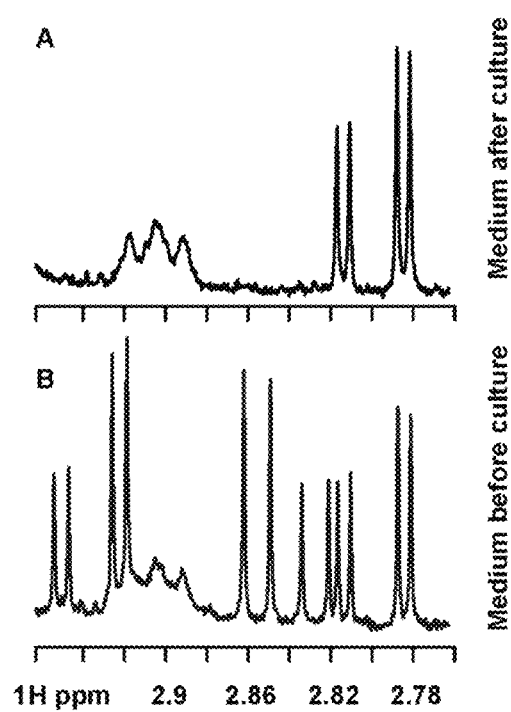
FIG. 13A. Shows select biomarkers detected in spent blood culture bottles from a clinical diagnostic laboratory as determined by $^1$H NMR. In this example, the patient was suffering from a bloodstream infection with *Pseudomonas aeruginosa*. Nutrients missing from the growth medium result from the metabolic action of the pathogen.
Figure 13B:
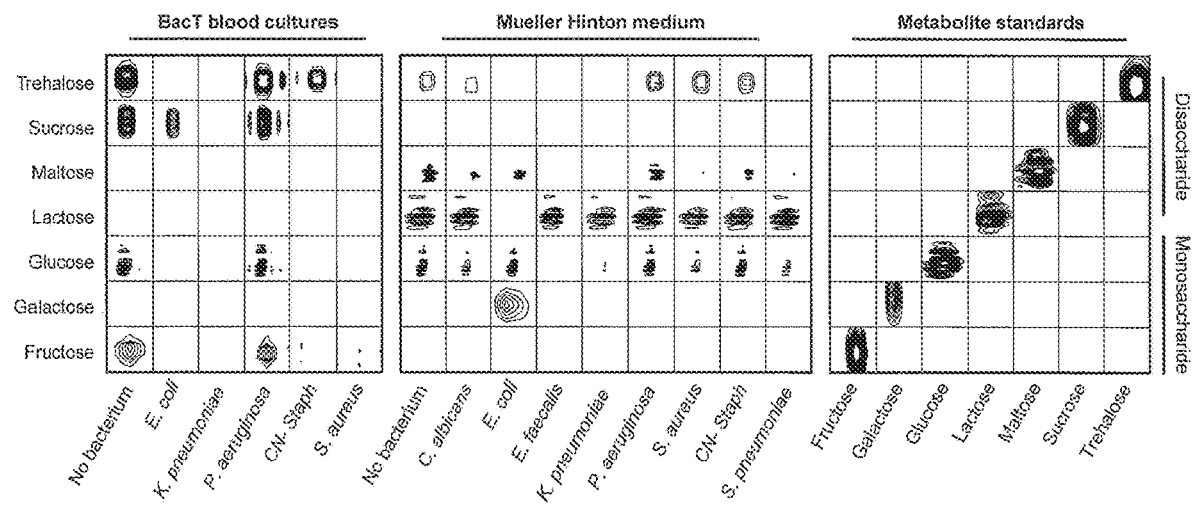
FIG. 13B. NMR was employed to analyze sugar monomers (saccharides and disaccharides) in two types of growth medium after incubation with common bacteria. The Figure shows diagnostic metabolite signals observed in two growth media as detected by multidimensional (1H-13C) nuclear magnetic resonance spectroscopy (NMR). Diagnostic NMR regions of interest corresponding to the each of seven target sugars are shown in growth media and in solutions of pure standards (100 mM). Bacterial isolates were grown for four hours in either BacT blood culture medium (BioMérieux) or Muller Hinton medium. The two media contain different carbohydrate nutrients as shown in the no bacterium control samples. Microbes grown in the two media produced diagnostic patterns of metabolites that were sufficient for differentiating the microorganisms (e.g. the presence of sucrose after the incubation in BacT medium distinguishes *Escherichia coli* from *Klebsiella pneumoniae*).

Diagnostic metabolites observed in microbial cultures are frequently excreted with closely related molecules originating from the same metabolic pathway. As shown in FIG. 13B, incubating *E. coli* in the presence of lactose will result in the production of both glucose and galactose, which are the breakdown products of lactose. Thus, the presence of any metabolite from this pathway can be used to diagnose the presence of *E. coli* under the conditions used in this study. Similarly, inosine, hypoxanthine, xanthine, guanine, inosine monophosphate, xanthosine monophosphate, and uric acid are all metabolites that can be derived from guanosine monophosphate and reflect the action of a shared metabolic pathway. More broadly, the presence of diagnostic nucleotides, or their break down products, in the growth medium is indicative of a specific microbial metabolic activity that can be used as a diagnostic indicator for the type of microorganism. Similarly, amino acid breakdown products originating from a specific metabolic activity (e.g. arginine catabolismcommunicate overlapping diagnostic information. For example, agmatine, putrescine and ornithine, each originate from the breakdown of arginine and can be used as diagnostic indicators of microorganisms. Classes of molecules where metabolic pathway activity results in clusters of closely related diagnostic metabolites include carbohydrate metabolism (e.g. FIG. 13B, glucose and galactose from lactose), nucleotide metabolism, amino acid metabolism, tricarboxylic acid cycle metabolism, and fatty acid metabolism.

Specific metabolites that have been identified as useful for the identification of 85% or more of the pathogens of clinical interest include adenine, adenosine, arginine, 4-aminobutyrate, cytidine, glucose, glutarate, glycine, guanine, guanosine, hypoxanthine, inosine, N-acetyl-phenylalanine, ornithine, sn-glycerol-3-phosphate, succinate, taurine, uridine, urocanate and xanthine or derivatives thereof. There are also nine metabolites that have not been identified but are seen in spectrometric analysis and are useful to differentiate microorganisms. No more than these 30 molecules are needed to correctly identify the following eleven microorganisms: *Escherichia coli*; *Klebsiella pneumoniae*; *Klebsiella oxytoca*; *Pseudomonas aeruginosa*; *Staphylococcus aureus*; *Enterococcus faecalis*; *Enterococcus faecium*; *Streptococcus pneumoniae*; Group A *Streptococcus*; *Candida albicans*; and *Candida parapsilosis*, which cause more than 85% of human bloodstream infections. Additional pathogens of interest include *Citrobacter* species, *Enterobacter* species, *Proteus* species, *Acinitobacter* species, and *Streptococcus* and *Staphylococcus* species different than those listed above and be differentiated using the above mentioned biomarkers.

By analysis of the growth medium after incubation, metabolic differences are detected, thereby to permit identification of the cell type being incubated. For example, with reference to FIG. 5, FIG. 6A and FIG. 6B, gram negative bacteria, such as *Escherichia coli* (EC) and *Klebsiella* species (KO and KP), secrete diagnostic quantities of succinate and consume glucose when grown in Mueller Hinton medium. Under the same conditions, however, the gram negative *Pseudomonas aeruginosa* (PA) has little impact on succinate and glucose but consumes diagnostic quantities of ornithine. Similarly, the gram positive bacterium *Staphylococcus aureus* (SA) consumes diagnostic quantities of taurine and secretes N-acetyl phenylalanine when grown in Mueller Hinton whereas the gram positive *Enterococcus faecalis* (EF) consumes diagnostic quantities of arginine. Likewise, the gram positive *Streptococcus viridans* (SV) and *S. pyogenes* (SP) produce diagnostic levels of glutarate when incubated in Mueller Hinton whereas group A *Streptococcus* (SG), *Enterococcus faecali* (EF), *Staphylococcus aureus* (SA) and coagulate negative *Staphylococcus* (SN) do not.

Further testing of pathogen metabolism in Muller Hinton medium identified that:
  Succinate levels differentiate *E. coli* and *Klebsiella* ssp from all other organisms in the panel;
  Urocanate levels differentiate *E. coli* and *Klebsiella* ssp;
  10-Hydroxydecanoate differentiates *Pseudomonas aeruginosa* from all others in panel;
  Arbitol levels differentiate *Candida* ssp from all other organisms in the panel;
  Glucose levels differentiate *Pseudomonas aeruginosa* from all other gram negative organisms;
  N-acetyl-aspartate levels differentiate *Enterococcus* from all other organisms in panel;
  Xanthine differentiates *viridans* streptococci from others in the panel;
  The presence of galactose is diagnostic for *E. coli*; and
  Glucose versus lactose levels differentiate *E. faecalis* from other gram positive organisms.
  After incubation in BacT medium:
  Sucrose levels differentiate *E. coli*, *Klebsiella* ssp and *S. aureus*; and
  Trehalose levels differentiate CN-Staph from *S. aureus* and *E. coli*.

Further metabolic analysis found that numerous organisms can be reliably identified, as follows:
  If a growth medium contains niacinamide (which is also called nicotinamide) after metabolism is permitted, the production of nicotinate in the growth medium identifies the presence *Escherichia*, *Klebsiella*, *Pseudomonas*, *Enterococcus*, *Staphylococcus* and/or *Streptococcus* species in the sample. In other words, if after culturing a sample of unknown micororganisms in a growth medium that contains niacinamide, there is a higher concentration of nicotinate compared to the original media, then it can be concluded that the sample contained at least one of *Escherichia*, *Klebsiella*, *Pseudomonas*, *Enterococcus*, *Staphylococcus* or *Streptococcus* species. Pyridoxine is a cofactor for the enzyme that converts nicotinamide to nicotinate and may be added to facilitate metabolism. However, some microbes do not need this cofactor as they may synthesize this on their own When a sample is grown in media containing arginine, metabolism that results in the production of citrulline identifies the presence of Gram+ species *Enterococcus* or *Streptococcus* in the sample.

When a sample is grown in a media containing carbohydrate, such as for example, glucose, sucrose, fructose, etc.: a) culturing that results in the production of arabitol identifies the presence of *Candida* species, such as *Candida albicans*, in the sample; and b) culturing that results in the production of succinate identifies the presence of *Escherichia* or *Klebsiella* species in the sample. In other words, if, after culturing, there is a resulting concentration of arabitol and succinate— then the sample contains all these genus of microbes.

Culturing that results in the production of xanthine identifies the presence of *Pseudomonas* species in the sample. For *Pseudomonas*, there are further biomarkers useful for pathogen identification and verification, as noted below. It is noted that xanthine production has been linked to *Streptococcus viridans* (FIG. 6A), but further testing has shown that this link, due possibly to retention times, is not as clear as the indication of *Pseudomonas* species in the sample.

When a sample is grown in media containing histidine and carbohydrate, such as for example, glucose, sucrose, fructose, etc., metabolism that results in the production of urocanate identifies the presence of *Klebsiella* species and/or Group A *Streptococcus* in the sample. It is noted that urocanate production has been linked to *Streptococcus viridans*, but further testing has shown that this link, due possibly to complications in retention times, may not be definitive. Thus, with reference to the above, an analysis that shows a culture profile where carbohydrate has been consumed and succinate produced, and which therefore has indicated that either *Escherichia* or *Klebsiella* is present, the further analysis for urocanate would differentiate clearly as between the presence of *Escherichia* and *Klebsiella* species. Also with reference to the above data, an analysis that shows a culture profile where the production of nicotinate identified the presence *Escherichia*, *Klebsiella*, *Pseudomonas*, *Enterococcus*, *Staphylococcus* or *Streptococcus* species in the sample, a further analysis finding a concentration of urocanate would differentiate the presence of Group A *Streptococcus*, *Streptococcus viridans*, and *Klebsiella* species from all the others. To differentiate Group A *Streptococcus* from *Klebsiella*, the presence of urocanate and absence of succinate production identifies the presence of Group A *Streptococcus* and *Streptococcus viridans*. Alternatively or in addition, the culturing could be conducted in media containing arginine, where as noted above, metabolism that results in the production of citrulline indicates Group A *Streptococcus*, *Enterococcus* species, or *Streptococcus pneumoniae*. Streptococcus viridans can be further differentiated from Group A Streptococcus by production of glutarate.

In culture medium containing threonine, metabolism that results in the production of N-acetylthreonine appears to identify the presence of Enterococcus in the sample.

In culture medium containing carbohydrate, metabolism that results in the production of mevalonate identifies the presence of Staphylococcus or Enterococcus in the sample.

In a culture medium with arginine, a cultured sample which contains the metabolite agmatine indicates the presence of Enterobacteriaceae species.

In a culture medium, an increase in the concentration of methylbutylamine is indicative of the Proteus species in the cultured sample.

In a culture medium, an increase in the presence of $N^1,N^8$-diacetylspermidine is indicative of Enterococcus faecalis, Staphylococcus saprophyticus, and Staphylococcus epidermis in the sample being cultured. This marker may be useful to differentiate between E. faecalis, which produces $N^1,N^8$-diacetylspermidine and E. facium, which does not.

After culturing, tyramine is indicative of Enterococcus species.

There are many species of Candida and while arabitol has been identified as indicative of yeast and specifically C. albicans, other biomarkers have been identified for identification of other species. For example, N-acetylleucine/N-acetylisoleucine is indicative of Candida freundii and which can be used to differentiate it from C. albicans. Also, a biomarker with mass of 286.2366 at a retention time of 4.3 minutes on the 15 minute HILIC method is indicative of Candida albicans, which can differentiate it from C. freunidii.

While agmatine is produced by all Enterobactericiae tested, cadaverine and putrescine are only produced by certain organisms listed below, allowing differentiation between some of these Enterobactericiae. In particular, after culturing, the presence of cadaverine is an indicator for E. coli, Enterobacter aerogenes, Klebsiella species, and Stenotrophomonas maltophilia. After culturing, the presence of putrescine identifies Citrobacter species, E. coli, Enterobacter species, Klebsiella species, and Proteus mirabilis.

Some metabolomic profiles are more specific to the growth medium used. For example:

When a sample is grown in a RPMI media, which contains hypoxanthine, niacinamide and pyridoxine, the production of xanthine and 6-hydroxynicotinate is detected, this identifies the presence of Pseudomonas species in the sample. It is believed that xanthine is produced from hypoxanthine and 6-hydroxynicotinate is produced as a metabolite of niacinamide and pyridoxine.

Agmatine in a cultured sample is indicative of the presence of species in the family Enterobacteriaceae. In a culture medium, such as M9 medium, where there is a single source of carbon, such as where the medium contains only carbohydrate as the source of carbon, the metabolite agmatine indicates the presence of Enterobacteriaceae species. Alternately, in other more complex culture media such as MH with arginine, a cultured sample that contains the metabolite agmatine indicates the presence of Enterobacteriaceae species.

Also, in MH aminobutyric acid is useful to differentiate Staphylococcus aureus from coagulase negative Staphylococcus since S. aureus makes it and coagulase negative Staphylococcus does not.

In some media containing spermine, metabolism that results in the production of $N^1,N^{12}$-diacetylspermine identifies the presence of Enterococcus, Klebsiella and E. coli in the sample. In RPMI, which does not include spermine, Enterococcus does not produce $N^1$, $N^{12}$-diacetylspermine, but in other medium like MH, only Enterococcus produces $N^1,N^{12}$-diacetylspermine.

Increased concentration of any of these biomarkers in cultured medium compared to the control medium is indicative of metabolic activity of the associated pathogen in the cultured medium. However, concentration fold changes have been identified for at least some of the precursors and biomarkers. Preferred fold changes are shown in the Decision Tree of FIG. 16, for example, but it is to be appreciated that positive concentration changes can be ½ of those indicated. For example, with reference to FIG. 16, a 2.5 fold increase, and more clearly a 5 fold increase, in arabitol from control to cultured medium is indicative of the presence of Candida albicans in the culture. As another example, a concentration increase of mevalonate in a cultured medium is indicative of Staphylococcus and Enterococcus species. To be certain over noise conditions, a greater than 5 fold increase, and more clearly a 10 fold or more increase (as actually indicated in FIG. 16), in mevalonate from control to cultured medium is indicative of the presence of Staphylococcus and/or Enterococcus in the culture. Of course, these can be differentiated by biomarkers N1, N12-diacetylspermine (intensity increase >2.5E3 or possibly >5E3) or aminobutyric acid (>2.5 fold or possibly >5 fold increase).

If quantitative variability is found to be a problem, analysis of a cultured sample can be spiked with a known concentration of an isotope of a target analyte (precursor or biomarker). The signal intensity for the known concentration of isotope labelled target can be employed to normalize quantitative variability and, thereby, to calculate the concentration of the target analyte. This method includes detecting both the target and the simultaneously eluting isotope-labelled version of the target analyte and comparing their peak intensities. Using isocratic continuous elution and isotope dilution, the samples can be accurately analysed despite variability in ion suppression. This isotope dilution strategy enables target analytes to be accurately quantified in a plurality of samples analysed, as described in applicants co-pending application PCT/CA2019/050763, filed May 31, 2019, incorporated herein by reference.

Figure 11:
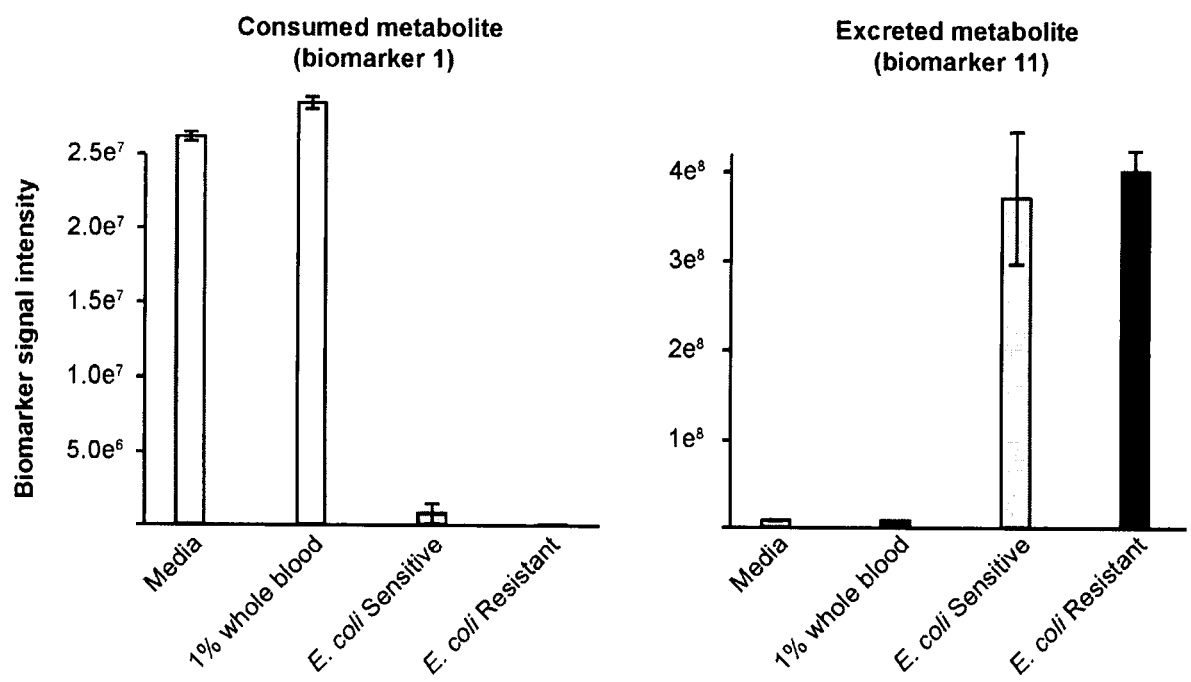
FIG. 11. Shows the contribution that the human serum and cells may have on biomarker signals. Samples were spiked with 1% of whole human blood and were allowed to incubate for 4 hours.

These above-noted target metabolites, while useful for pathogen identification, are not affected by blood cell metabolism. As such, even though blood cells in the sample to be analyzed may also be metabolizing, such metabolism does not interfere with the production of the above-noted target metabolites (FIGS. 11 and 24).

While previously known media such as MH or RPMI can be used, it may be desirable to employ a custom media that includes minimal necessary precursor nutrients and buffers, salts, enzymes, etc. for the general support of the microbe such as some or all of those identified above, useful to differentiate and identify the common microbes responsible for infection such as blood-based infections. Thus, while the results above and later examples are shown for BACT, M9, MH and/or RPMI, phenotypes observed can be recreated in more restricted media provided that (a) enough nutrients are provided for the cells to grow long enough to obtain metabolic signals and (b) the appropriate precursor is present to produce the target biomarker. The growth need only be for a short time, for example less than 6 hours or about 4 hours.

In one embodiment, for example, an engineered medium for identification of a microorganism in a biological sample may include at least the following precursors: 0.5 to 1.5 mM carbohydrate such as glucose, histidine, pyridoxine, nicotinamide (niacinamide) and arginine. The amount of carbohydrate is much lower than prior medium, but is sufficient to support growth of microbes in the culture for a short time such as at least three to eight hours, which is in the range of the 3.5 to 5 hours found to be suitable to generate good metabolomic signals. In another embodiment, for example, an engineered medium for identification of a microorganism in a biological sample may include at least the following precursors: glucose such as 0.5 to 1.5 mM glucose, histidine, pyridoxine, nicotinamide, hypoxanthine, threonine, spermine and arginine and the enzyme catalase.

In another embodiment, an engineered, defined medium includes the components listed in Table 1A, with an actual composition used for testing in the first column and possible broad and narrow concentration ranges indicated.

TABLE 1A

An engineered, defined limited medium for metabolomic study TM limited medium (MLM)

| | | Ranges (g/L) | |
|---|---|---|---|
| | g/l | Broad | Narrow |
| $Na_2HPO_4$ | 6 | 1.5-24 | 3-12 |
| $KH_2PO_4$ | 3 | 0.75-12 | 1.5-6 |
| $NH_4Cl$ | 1 | 0.1-4 | 0.5-2 |
| NaCl | 0.5 | 0.05-4 | 0.12-2 |
| $CaCl_2$ | 0.003 | 0.007-2 | 0.015-0.6 |
| $MgSO_4$ | 0.12 | 0.1-.5 | 0.6-0.24 |
| $FeSO_4$ | 0.00015 | 0.00007-0.05 | 0.00007-0.0005 |
| $(NH_4)_6Mo_7O_{24} \cdot 4H_2O$ | 0.0037 | 0.001-0.01 | 0.002-0.008 |
| $H_3BO_3$ | 0.0247 | 0.0001-0.1 | 0.001-0.04 |
| $CoCl_2 \cdot 6H_2O$ | 0.0071 | 0.0001-0.1 | 0.003-0.02 |
| $CuSO_4 \cdot 5H_2O$ | 0.0025 | 0.0001-0.1 | 0.001-0.005 |
| $MnCl_2 \cdot 4H_2O$ | 0.0158 | 0.0001-0.1 | 0.007-0.03 |
| $ZnSO_4 \cdot 7H_2O$ | 0.0029 | 0.0001-0.1 | 0.0015-0.006 |
| D-Glucose | 0.2 | 0.02-2 | 0.1-0.4 |
| Niacinamide | 0.001 | 0.0001-0.1 | 0.0005-0.002 |
| Pyridoxine•HCl | 0.001 | 0.0001-0.01 | 0.0005-0.002 |
| Hypoxanthine | 0.25 | 0.02-1 | 0.12-0.5 |
| L-Arginine | 1 | 0.2-5 | 0.5-2 |
| L-Threonine | 1 | 0.2-5 | 0.5-2 |
| L-Histidine | 0.5 | 0.1-5 | 0.25-1 |
| Spermine | 0.14525 | 0.02-2 | 0.07-0.3 |
| Catalase | 0.33 | 0.05-3 | 0.15-0.6 |

With reference to the decision tree of FIG. 16 and Table 1B, these precursors and nutrients are selected, for example, to support metabolism and some of which can be used for identification, as follows:

Glucose (precursor) is converted into the following:
Arabitol (for IDing *Candida* species such as *C. albicans*)
Mevalonate (for ID of *Staphylococcus* and *Enterococcus*)
Succinate (for ID of *Klebsiella* and *Escherichia*);
Histidine (precursor) is converted into urocanate (for ID of *Klebsiella* and Group A *Streptococcus*);
Nicotinamide (precursor) is converted into nicotinate (for ID of *Pseudomonas aeruginosa, Escherichia, Klebsiella*, Group A *Streptococcus, Streptococcus pneumonia*, and *Enterococcus*). Pyridoxine is the cofactor for the enzyme that converts nicotinamide to nicotinate, but some microbes don't need this cofactor as they may synthesize this on their own.
Arginine (precursor) is converted into citrulline (for ID of *Streptococcus pneumonia*, Group A *Streptococcus* and *Enterococcus*). Arginine (precursor) is also be converted into agmatine (for ID of Enterobacteriaceae).
Spermine (precursor) results in the production of $N^1,N^{12}$-diacetylspermine (for ID of the presence of at least *Enterococcus*).
Hypoxanthine is metabolized to xanthine (for ID of *Pseudomonas aeruginosa*).
Threonine is metabolized to n-acetylthreonine (for ID of *Enterococcus*).
Catalase reduces free radicals to assist with the growth of *Streptococcus pneumoniae*.

TABLE 1B

Biomarkers and some of the pathogens identified

| Nicotinate | Xanthine | Succinate | Urocanate | Citrulline | Mevalonate | Agmatine | Arabitol |
|---|---|---|---|---|---|---|---|
| *Pseudomonas* | *Pseudomonas* | | | | | | |
| *E.coli* | | *E.coli* | | | | | |
| *Klebsiella* | | *Klebsiella* | *Klebsiella* | | | | |
| Group A *Strep* | | | Grp A *Strep* | Group A *Strep* | | | |
| *S. pneumoniae* | | | | *S. pneumoniae* | | | |
| *Enterococcus* | | | | *Enterococcus* | *Enterococcus* | | |
| *Coagulase (−) Staph (CNS)* | | | | | *CNS* | | |
| *Staph aureus* | | | | | *Staph aureus* | | |
| *Enterobacteriaceae* | | | | | | *Enterobacteriaceae* | |
| | | | | | | | *Candida* |

In addition to the precursors noted above, the medium could contain:
 a. Leucine to further promote growth of *Staphylococcus* species; and/or
 b. Leucine and glutamine, which in addition to histidine, promotes the growth of *Streptococcus* species.

In one embodiment, a complex but defined medium may include the chemicals listed in Table 1C at various concentrations. It will be appreciated that the concentrations of each of the various chemicals can vary and still support metabolism useful for metabolomic identification of some pathogens. In one embodiment, however, the chemicals in the defined MPA/MIA medium in Table 1C that are also listed in Table 1A have the broad or narrow concentration ranges according to the indications on Table 1A, with other chemicals at various concentrations. For the examples listed herein below, the medium was prepared according to the following recipe of Table 1C.

TABLE 1C

Defined MPA/MIA Medium

|  | g/L | mM |
|---|---|---|
| L-Valine | 1 | 8.54 |
| L-Tyrosine•2Na•2H$_2$O | 0.5 | 1.90 |
| L-Tryptophan | 0.02 | 0.10 |
| L-Threonine | 1 | 8.39 |
| L-Serine | 1 | 9.52 |
| L-Proline | 2.5 | 21.71 |
| L-Phenylalanine | 0.5 | 3.03 |
| L-Methionine | 0.5 | 3.35 |
| L-Lysine•HCl | 5 | 27.38 |
| L-Leucine | 1 | 7.62 |
| L-Isoleucine | 1 | 7.62 |
| L-Histidine | 0.5 | 3.22 |
| L-Glutamic Acid | 3 | 20.39 |
| L-Aspartic Acid | 1 | 7.51 |
| L-Arginine | 1 | 5.74 |
| hypoxanthine | 0.25 | 1.84 |
| L-Glutamine | 5 | 34.21 |
| L-Cystine•2HCl | 0.05 | 0.16 |
| L-Asparagine (anhydrous) | 0.05 | 0.38 |
| Alanine | 1 | 11.22 |
| Glycine | 0.01 | 0.13 |
| Glutathione (reduced) | 0.001 | 3.3E-03 |
| D-Glucose | 0.2 | 1.11 |
| Calcium Nitrate•4H$_2$O | 0.1 | 0.42 |
| Magnesium Sulfate (anhydrous) | 0.05 | 0.42 |
| Potassium Chloride | 0.4 | 5.37 |
| Sodium Bicarbonate | 2 | 23.81 |
| Sodium Chloride | 6 | 102.67 |
| Sodium Phosphate Dibasic | 0.8 | 5.64 |
| FeSO4•6H2O | 2.6E-04 | 1.0E-03 |
| CuSO4•5H2O | 2.5E-06 | 1.0E-05 |
| ZnSO4•7H2O | 2.88E-06 | 1.0E-05 |
| MnCl2•H2O | 1.58E-05 | 8.0E-05 |
| H3BO3 | 2.47E-05 | 4.0E-04 |
| CoCl2•6H2O | 7.14E-06 | 3.0E-05 |
| Choline Chloride | 0.003 | 2.1E-02 |
| Niacinamide | 0.001 | 8.2E-03 |
| p-Aminobenzoic Acid | 0.001 | 7.3E-03 |
| Thiamine•HCl | 0.001 | 3.0E-03 |
| Vitamin B12 | 0.000005 | 3.7E-06 |
| Riboflavin | 0.0002 | 5.3E-04 |
| Pyridoxine•HCl | 0.001 | 4.9E-03 |
| Folic Acid | 0.001 | 2.3E-03 |
| D-Pantothenic Acid (hemicalcium) | 0.00025 | 1.0E-03 |
| D-Biotin | 0.0002 | 8.2E-04 |
| INOSINE | 0.005 | 0.02 |
| URIDINE | 0.005 | 0.02 |
| URATE | 0.005 | 0.03 |
| ADENINE | 0.01 | 0.07 |
| URACIL | 0.01 | 0.09 |
| GUANINE | 0.01 | 0.07 |

TABLE 1C-continued

Defined MPA/MIA Medium

|  | g/L | mM |
|---|---|---|
| THYMINE | 0.005 | 0.04 |
| CYTOSINE | 0.005 | 0.05 |
| OROTATE | 0.005 | 0.03 |
| L-ORNITHINE | 0.01 | 0.08 |
| Spermine | 0.145 | 1.00 |
| 3-acetamidopropanal | 0.01 | 0.09 |
| Catalase | 0.33 | NA |

Alternately or in addition, a custom media may be used according to one of the compositions listed above, but that contains marked identification nutrients or marked components for ratio normalization. Marking may be, for example, by isotopic labelling. Thus, another aspect of the invention relates to engineering the medium for specific isotopic outcomes. Since the data herein shows that target metabolites are derived from known precursors, we can substitute stable, marked, such as isotope-labelled, precursors into an engineered medium to ensure that the detected biomarkers are produced from the specific precursors we selected. When coupled to mass spectrometry detection, this strategy ensures that any potential background signal, or biomarkers produced through pathways other than the target pathway, are not detected as false positive signals. In one example, therefore, a particular labelled precursor can be introduced to the medium such that labelled metabolites can be readily linked to the labelled precursor. For example, succinate can be derived from various carbon sources such as glucose and glutamine and through various pathways, but the introduction of a labelled glucose could readily identify labelled succinate as resulting from microbe metabolism of interest, as noted above. In one embodiment, a medium can be prepared and used where one or more of the following precursors are isotopically labelled: glucose, histidine, nicotinamide and arginine.

In some embodiments, the medium may include isotope-encoded gradients of standards. Typically metabolites are quantified relative to a standard curve, these metabolite standards can be added to a sample at multiple concentrations to establish the relationship between concentration and intensity. The disadvantage of this strategy is that multiple samples must be analyzed to establish the standard curve. In one embodiment, multiple isotope forms (e.g. 1C-glucose, 2C glucose, 3C glucose, 4C glucose, 5C glucose and/or 6C glucose) can be spiked into a sample to encode the metabolite concentrations in that single sample. This method could be used both through isotope dilution (both standards and unlabeled target molecules present in the same sample) or through external calibration (where standards are only present to allow relative intensities to be compared between samples).

An analysis of cultured medium for the presence of only the metabolites arabitol, xanthine, succinate, urocanate, nicotinate, mevalonate and citrulline would positively identify a pathogen in the cultured sample to at least the genus level from *Candida, Escherichia, Klebsiella, Pseudomonas, Enterococcus, Staphylococcus* or *Streptococcus* species. An analysis for agmatine may be of further assistance for the identification of Enterobacteriaceae. The above-noted analyses can be concluded after only about four hours of culture time.

Thus, the metabolite biomarkers are useful for identification of cell type, for example, the presence of broad classes, species or strains of cells. One or more biomarkers are specific to individual species and thus, the method can accurately identify cell type when considering the presence of the one or more biomarkers in growth medium incubated with a cell of unknown cell type.

One cell type of interest is the characterization of cell's sensitivity to a toxin. Thus, the method can also be used for analysis of a sample for toxin sensitivity of the cells therein. A similar method is employed, but the growth medium includes an amount of a toxin such as an antibiotic or a chemotherapy. With reference to the options noted above and FIG. 4A, the method includes combining a sample likely containing a microorganism with a growth medium and an amount of a toxin such as an antibiotic or chemotherapy, for example any one or more of amoxicillin, penicillin, tetracycline, vancomycin, streptomycin, cephalexin, erythromycin, clarithromycin, azithromycin, ciprofloxacin, levofloxacin, ofloxacin, chloramphenicol, bactrim, bacitracin, linezolid, cefepime, cefoperazone, cephalexin, meropenem, clotrimazole, econazole, azide, rotenone, antimycin A, chloroquine, nitazoxanide, melarsoprol, eflornithine, tinidazole, miltefosine, metronidazole, 5-fluoromuricil, Gen, SXT, ceftriaxone, ampicillin, ceftazidime or deoxycytidine. The mixture of cell-containing sample, growth medium and toxin is incubated for a period of time. During the incubation period, organisms that are not sensitive to the toxin(s) may consume their preferred nutrient(s) and secrete metabolic waste products, whereas organisms that are sensitive to the toxin(s) may become metabolically perturbed or inactive. The growth medium after incubation is chemically analyzed 11 and metabolite levels is the growth medium are compared to reference metabolite profiles from cell cultures with toxin-induced metabolic changes to identify 12 the toxin-sensitivity of the microorganism in the sample. The comparison may be by various means such as manually or automatically. Using a computer software, for example, metabolite reference profiles may be readily compared to the metabolic data acquired from analysis of the incubated growth medium to classify the toxin sensitivity of the organism. This method may be used on its own to classify the toxin sensitivity of the organism. Alternately, this method may be employed to identify toxin-sensitivity sequentially or in parallel with a method to identify the microorganism in the sample.

While microbe identification requires a more complicated analysis, antimicrobial susceptibility testing may require only a broad approach. Further, there may be independent susceptibility markers that are not the same as markers used for identification. Thus, different strategies can be used for identification versus susceptibility to a toxin. For antimicrobial susceptibility testing, a method where the growth medium is MH and contains glucose, niacinamide (nicotinamide) and pyridoxine, the following results after culturing identify a resistant microorganism:

glucose consumption is indicative of, for example, *Escherichia, Klebsiella, Enterococcus, Staphylococcus* and *Streptococcus* with antimicrobial resistance;

succinate production is clearly indicative of the presence of either *Escherichia* or *Klebsiella* species with antimicrobial resistance; and nicotinate production is clearly indicative that the culture contained *Streptococcus* and other species with antimicrobial resistance.

Table 7 shows some toxin susceptibility indicators.

Thus, the present method may be used to detect individual cell types in a sample, such as the bacterial species and/or drug sensitivities of a microorganism organisms present in a sample. The method may be useful to differentiate between two or more microorganisms. The present invention may also be used to identify cell types in mixtures of cell species or the one or more toxin sensitivities of one or more organisms present in a sample.

The present invention may be used to analyze samples originating from a single sample or a single patient. The present invention may also be used to acquire data on multiplexed samples originating from a plurality of samples or a plurality of patients.

The method may include operating an analytical device to carry out one or more steps of the method. For example, the growth medium after incubation may be loaded into an analytical device for analysis and comparison. Alternately, the method may include loading the sample into the device and the method is carried out entirely in the device.

Figure 4B:
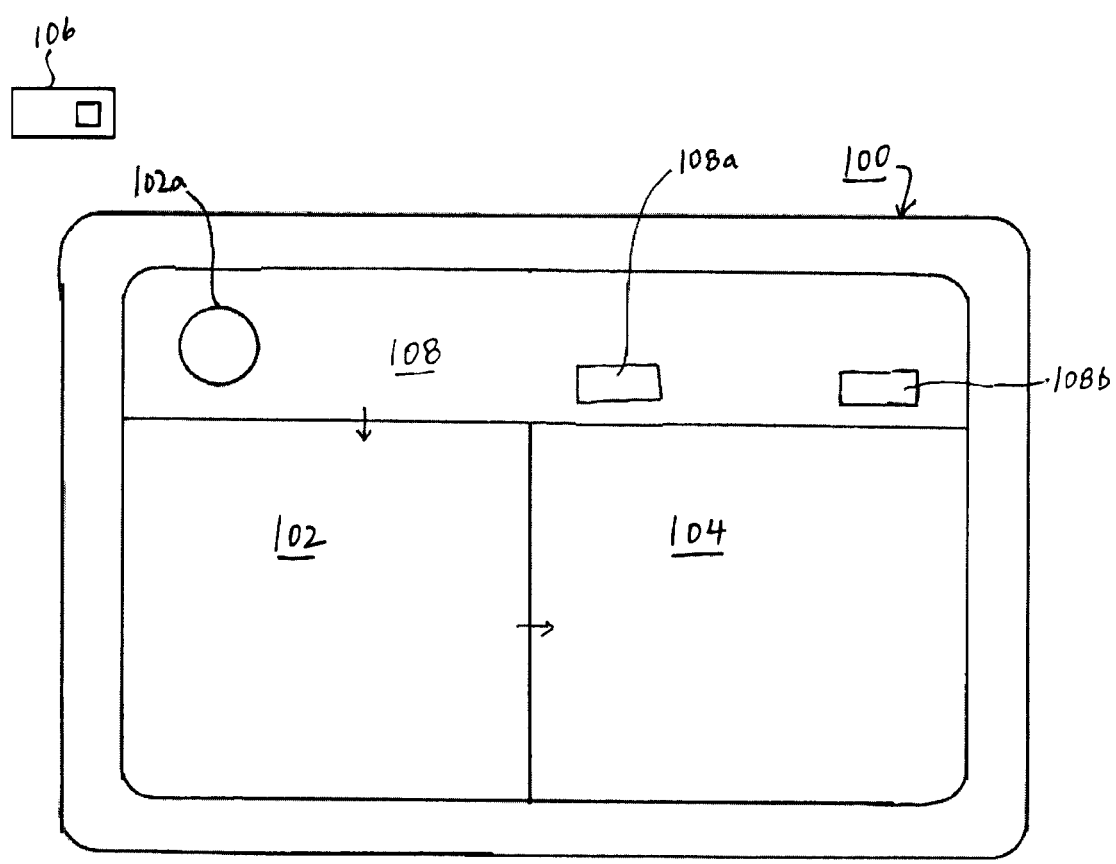
FIG. 4B. Schematically illustrates a device according to the invention.

As schematically illustrated in FIG. 4B, a device 100 according to the invention includes at least two components: an analytical data acquisition tool 102, and a computer system 104 that compares output results from analytical data acquisition tool 102 with reference standards, reference metabolite profiles, to identify a cell's type, such as its broad class, its species or a cell characteristic, such as strain, toxin sensitivity or verification of recombination.

Analytical data acquisition tool 102 may be one based on simple chemical analysis such as pH, electrical conductivity or the presence of glucose or a more complex technology such as one based on spectrometry such as for example, mass spectroscopy ("MS"), nuclear magnetic resonance spectroscopy ("NMR") or spectrophotometry such as by optical analysis. Tool 102 includes an inlet port 102*a* for accepting an amount of growth medium for analysis thereof. The device may be configured to handle unprocessed or processed growth medium. When considering processed growth medium, the device may be configured to accept and handle packaged growth medium 106 such as on a cassette or strips or in tubes, gels, etc.

Device 100 also includes computer system 104 in communication with tool 102 and configured to receive results from tool 102. System 104 further includes a processor configured to analyse the data from tool 102 and to identify the cell type such as broad class, species and/or strain/cellular characteristic such as toxin resistance. In one embodiment, the data is a metabolite profile and the computer system includes a computer storage element for storing a database of reference metabolite profiles.

Multiple reference metabolite profiles are used to populate the database and enable the computer system. The computer model compares the information received from the sample testing with reference metabolite profiles to determine the identity of the unknown organism and/or its sensitivity to toxins. A computer system, for example software, compares the data acquired from the sample to reference metabolite profiles. Samples are classified by a level, such as presence, absence or amount above or below a threshold or within a specified range, for a single biomarker or a plurality of biomarker levels. The biomarker level (i.e. presence, absence or level) is indicated by spectrometric signal intensity. The reference metabolite profile can include reference data for a selected one or more biomarkers in a specified growth medium and general cell concentration, for a class of or specified microorganism and after a specified incubation period. Alternately, the reference metabolite profiles are each a cumulative spectrometric signal or pattern across a spectrum for a class of or specified microorganism at a cell concentration in a specified growth medium, after a specified incubation period. The data from an analyzed growth medium can be matched to a reference metabolite profile using simple processing or an algorithm (e.g. support vector machine, principle component analysis, single value decomposition).

In one embodiment for complex analysis, the device comprises a support vector machine algorithm that may be used to automatically classify microorganisms from clinical samples and distinguish drug-sensitive versus resistant strains of microorganisms.

In order to establish a database of reference metabolite profiles, known organism can be incubated under known conditions of nutrient source, time and toxin concentration. The growth medium after such an incubation can be analyzed and the resulting data recorded for one or more natural metabolite biomarkers such as the up to 21 or 30 biomarkers noted above or the full signal may be recorded across a spectrometric spectrum, and this data can be recorded as a reference metabolic profile. When reference metabolic profiles are obtained from a plurality of cells, such as microorganisms, of interest, this data can be stored in the computer system to create a database and support a fully automated computer program, useful to identify unknown organisms and classify sensitivity to toxin(s) based on the metabolic profiles obtained from clinical samples. The reference data can readily be applied to resolve signals from samples containing one or more types of microorganisms.

The computer system is configured to output information regarding an identification of the microorganism in the sample and possibly any toxin resistance.

In another embodiment, the device may include a sample pretreatment chamber and/or an incubation chamber 108. Input port 102a would then provide sample input to these chambers. These chambers may contain supplies of growth medium, dilution liquid, etc. such that the device is self-contained and configured to carry out a method from receiving an unprocessed sample to microbe identification. A sample pretreatment chamber may be configured for processing an unprocessed sample to a form suitable for incubation. For example, the sample pretreatment chamber may include dilution and size exclusion, such as filtration apparatus 108a. The incubation chamber and possibly the sample pretreatment chamber includes a heater 108b.

Figure 4C:
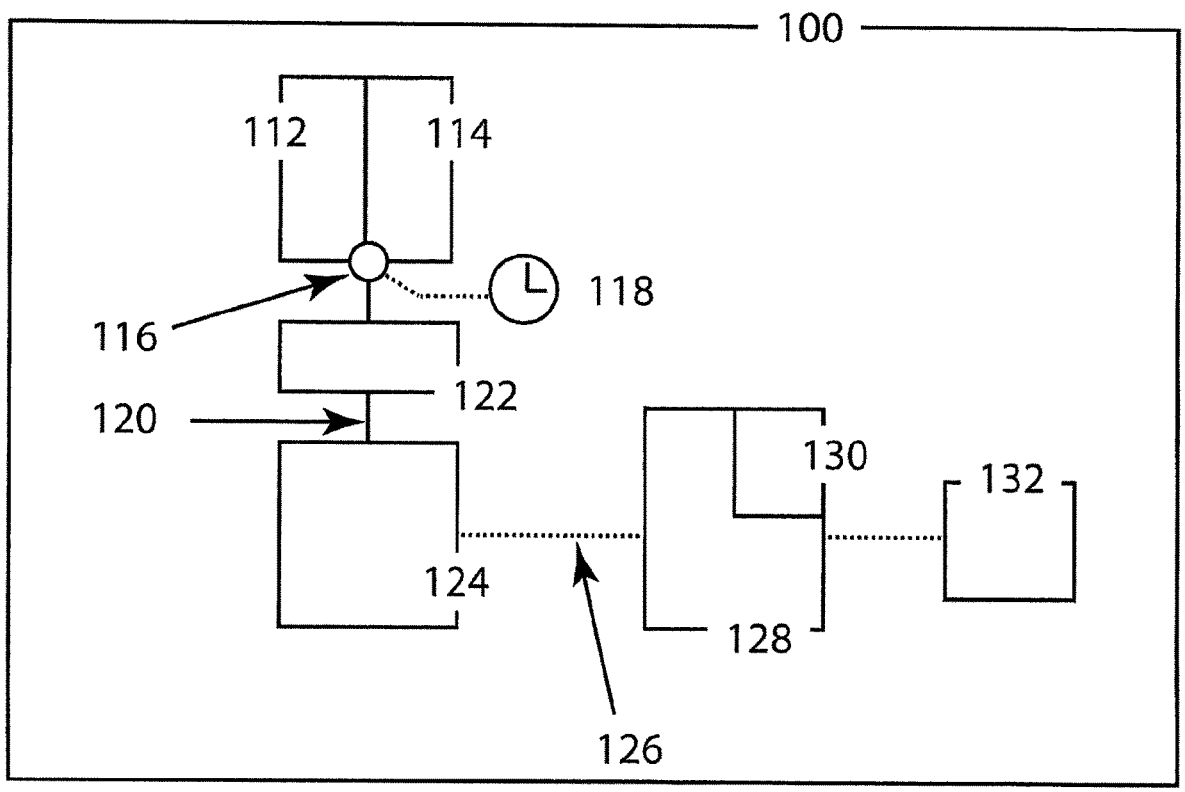
FIG. 4C. Shows another embodiment of a device according to the invention.

FIG. 4C shows another embodiment of a device 100 according to the invention. Device 100 of FIG. 4C includes a first microbial incubation chamber 112, a second microbial growth chamber 114 and a sample preparation chamber 122. A sampling port 116 provides communication from the chambers 112, 114 to a sample transfer tube 120, which opens into chamber 122. A timing device 118 controls the operation of sampling port 116 so it only opens when permitted by the timing device. Incubation time in chambers 112, 114 can be controlled by the timing device.

The device further includes an analytical metabolite data acquisition device 124. A tube 120 leads from chamber 122 to device 124. Analysis device 124 is connected by a physical or wireless communication 126 to a data analysis device 128 that operates with a database of reference metabolic profiles data analysis device 128. Data analysis device 128 outputs to a display device 132, such as a printer, a screen, a computer terminal, etc. on the device or coupled wirelessly or through physical connections to the data analysis device of device 100.

Components port 116, timing device, tube 120, etc. may be components of an autosampler.

In use, microbial samples and growth media are added to a microbial incubation chamber 112. In parallel, or sequentially, samples from chamber 112 are transferred to second microbial growth chamber 114 where the sample-containing growth medium may be mixed with a toxin 114. Cultures in chambers 112 and/or 114 are incubated for a fixed period of time by way of a timing device 118. Device 118 controls the operation of sampling port 116.

Culture samples are transferred from chambers 112 and/or 114 through the sampling port and sample transfer tube 120 and are delivered to sample preparation chamber 122.

After preparation, samples are transferred from the preparation chamber to a metabolite analysis device 124 and signals of metabolite levels are generated. Observed metabolite signals are transmitted to a data analysis device 128 that uses a reference dataset 130 and processor to identify the cell type or plurality of cell types present in the microbial sample. The organism type is then reported via the display device 132.

There may be software for controlling the operation of the device components. In one embodiment, there are processing strategies, for example, data dependent feedback for autosampling. For example, there may be data-dependent communication software to make identification and then to dictate which operations of the sampling, for example, which culture well is run on the autosampler.

After loading the sample, the device can provide an output of the organism type in 2 to 8 hours. As noted herein, the metabolic information can be analyzed automatically through devices and control software. In another embodiment, there may be a method, such as may be in embodied software, that matches changes, for example threshold values, in biomarkers listed herein either for identification or sensitivity for inhibitors. For example, processing strategies may be employed such as data dependent feedback for process control and data-dependent communication software. In another embodiment, there may be a method, such as may be in software, that utilizes threshold values for identification or susceptibility to toxins to communicate and possibly control operations, between a biomarker analysis machine (i.e. a mass spectrometer) and a sample input machine (i.e. an autosampler).

Such a method would demonstrate drastically reduced antibiotic testing timelines.

In one embodiment, for example as illustrated schematically in FIG. 25, to facilitate identification and toxin susceptibility a system/process can include (i) a culturing approach that cultures the sample both in first medium to encourage metabolism for identification and at the same time cultures in a plurality of toxin-containing media each medium having a toxin against a different pathogen and (ii) an analysis approach that after culturing, analyses the first medium metabolic outcome, for example, for biomarkers to identify the pathogen and then analyses only those toxin-containing media that have toxins relevant against the identified pathogen. All of the cultures can be on a common apparatus, for example a single multi-well plate, so that the culturing for identification and for toxin susceptibility can all be done at the same time and can be handled as one unit by the analysis apparatus. The analysis can be directed by software configured to sample the first culture (top left hand corner), which has media for general pathogen identification and send that for analysis (step 1), in step 2, the analysis identifies the pathogen and then, based on the identification, step 3, samples only those cultures that have toxins relevant against the identified pathogen (four samples 1). Thus, susceptibility analysis occurs based on culturing that occurs at the same time and from the sample handling as the culturing for pathogen identification. Also use of the analysis apparatus for susceptibility is only for pathogen growth in toxin-containing media that have toxins relevant against the identified pathogen. This facilitates and streamlines the culturing and analysis processes to more quickly arrive at the diagnosis and treatment strategy.

These methods can be computer implemented and, therefore, stored on a non-transitory computer-readable medium with instructions executable by one or more processors, for example in an autosampler.

In another embodiment, the invention relates to a treatment regimen for treatment of an infection comprising one or more aspects of the methods described above and identifying a toxin for acting against the cell type identified. In another embodiment, a method for treating an infection that comprises one or more aspects of the method described above and further administering an effective amount and type of antibiotic(s) to a patient suffering from infections based on the identification of a microorganism and its sensitivity to antibiotics using metabolite data acquired. As such, one or more aspects of the method described above and further selecting a type of antibiotic based on the identification of a microorganism and its sensitivity to antibiotics using metabolite data acquired, may be used for treatment of a patient suffering from an infection.

In another embodiment, a method according to the invention includes screening the effectiveness of a chemotherapy against a cancer cell using one or more aspects of the method described above, wherein a chemotherapy drug is added to the growth medium.

In another embodiment, a method according to the invention includes screening the effectiveness of a genetic recombination on a cell using one or more aspects of the method described above, wherein the recombination modulated metabolism and the method rapidly confirms that the recombination was successful.

In another embodiment, the present invention is a method for determining whether a patient has an infection, comprising: obtaining a patient specimen (e.g. blood, urine, swab, stool) or a clinical specimen (i.e. hospital equipment swab); combining the specimen with a growth medium; data acquisition of the organism's metabolic activity; diagnosing the patient as having an infection based on metabolite biomarkers concentration changes or are present relative to reference metabolite profiles. The method may further include suggesting a treatment or administering the appropriate antibiotic and dose of antibiotic relative to the concentration of metabolite present.

In another embodiment, the method of the present invention, as described above, is determining whether a food is contaminated with a microorganism.

The following examples are included for the purposes of illustration only, and are not intended to limit the scope of the invention or claims.

EXAMPLES

Example I: MS Detection of the Organism

The growth medium used in this example, Mueller-Hinton, enabled metabolite uptake by the microorganisms. This medium is prepared from 2 g beef extract, 17.5 g casein hydrolysate, and 1.5 g starch dissolved in 1 liter of deionized water. A microorganism-containing sample was mixed with the growth medium, the consumed and the produced biomarkers were evaluated using a diagnostic data collection tool. Microbial samples were prepared by making 0.5 McFarland standard dilutions (approximately $1\times10^8$) of seven opportunistic pathogens: *Escherichia coli*, EC; *Klebsiella pneumoniae*, KP; *Pseudomonas aeruginosa*, PA; *Staphylococcus aureus*, SA; *Enterococcus faecium*, EF; *Streptococcus pneumoniae*, SP; and *Candida albicans*, CA. These seven target microbes were selected because they cause more than 85% of the human bloodstream infections. At time 0 hours, standardized microbial samples were combined 1:1 with a Mueller-Hinton growth medium. Aliquots of each sample (100 microliters) were immediately harvested and metabolism was quenched by combining the aliquot with an equal volume of methanol and stored at 4° C. until the data acquisition of the metabolic composition was available. An additional microbial aliquot was allowed to incubate in its growth medium at 37° C. for four hours. At time 4 hours, samples were harvested (100 microliters), combined with an equal volume of methanol to quench metabolism and transferred to 4° C. until the data acquisition of the metabolic composition was available. The microbial culture experiment was completed three times to generate three independent biological replicates. All samples were then analyzed by liquid chromatography mass spectrometry (LC-MS) using a hydrophobic interaction liquid chromatography column and a high-resolution mass analyzer acquiring data in both positive and negative ionization mode. Over 250 metabolites were analyzed by LC-MS and retention times and ionization properties were verified using metabolite standards analyzed on the same LC-MS platform. Both known metabolites (as defined by co-elution of observed signals with a reference standard using extracted ion chromatograms with 5 ppm mass windows) and unknown metabolites were identified and metabolite intensities were determined. Metabolite levels before and after the four-hour incubation were analyzed and 30 metabolites have proven to be sufficient in order to unambiguously differentiate between seven different target microbes. These metabolites are adenine, adenosine, arginine, 4-aminobutyrate, cytidine, glucose, glutarate, glycine, guanine, guanosine, hypoxanthine, inosine, N-acetyl-phenylalanine, ornithine, sn-glycerol-3-phosphate, succinate, taurine, uridine, urocanate, xanthine and nine signals from unknown metabolites. From this preliminary experiment, it was concluded that the pattern of metabolites in the microbial growth medium could be detected by LC-MS and used to differentiate between common microbial pathogens.

Example II: Automated Detection of Clinical Isolates

Figure 6A:
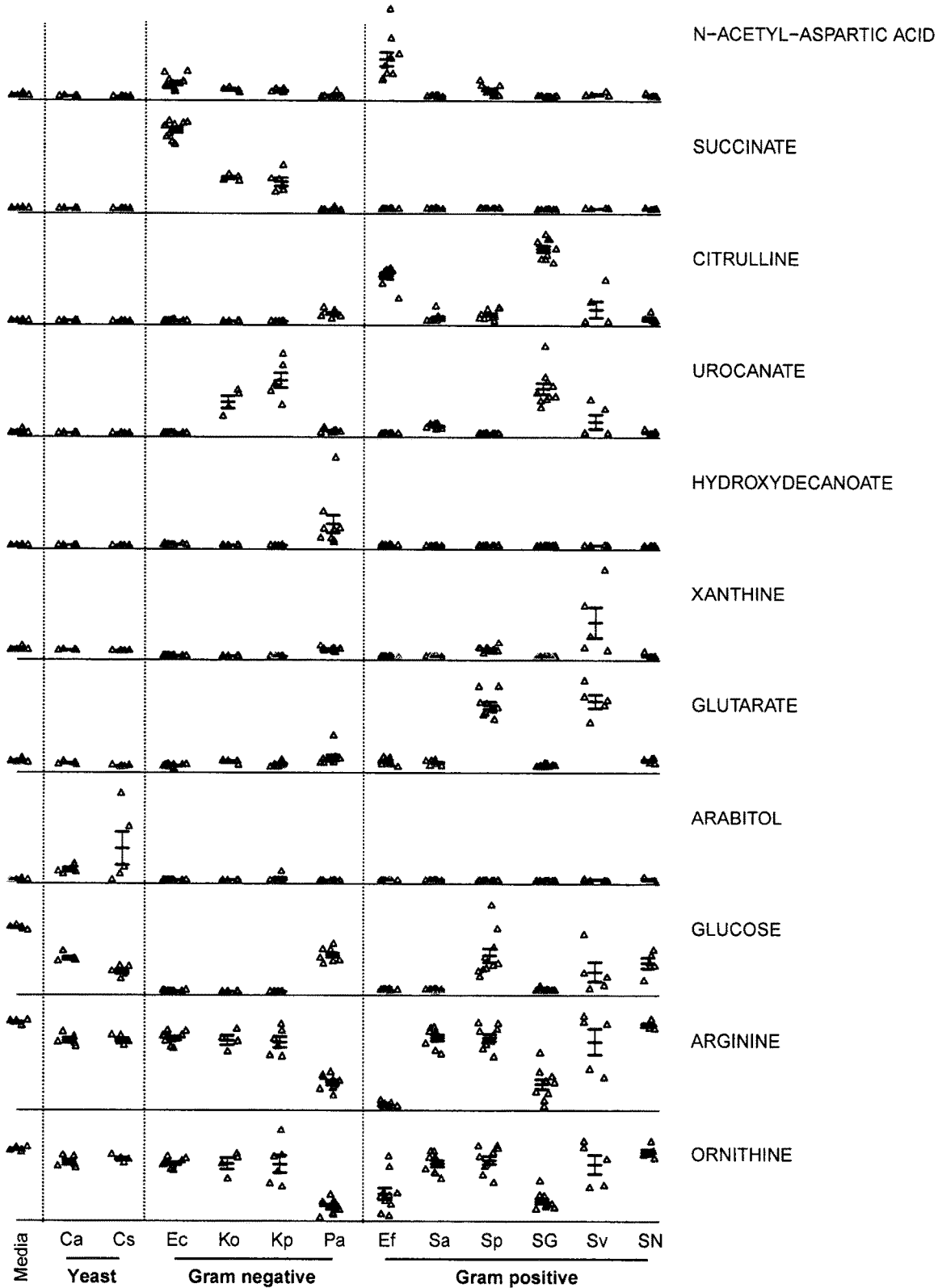
FIG. 6A. Shows selected biomarkers, as measured by MS, present in the media from microbial cultures. Cultures were standardized with 0.5 McFarland dilutions of common pathogens and commencal organisms. Sample key: *Candida* species, Ca, Cd, Cg, Ck, Cp; *Escherichia coli*, EC; *Klebsiella oxytoca*, KO; *Klebsiella pneumoniae*, KP; *Pseudomonas aeruginosa*, PA; *Pseudomonas putida*, Pp; *Staphylococcus aureus*, SA; *Enterococcus faecium*, EF; *Streptococcus pneumoniae*, SP; group A *Streptococcus*, SG; *Streptococcus viridans*, SV; and coagulase negative *Staphylococcus*, SN.
Figure 7:
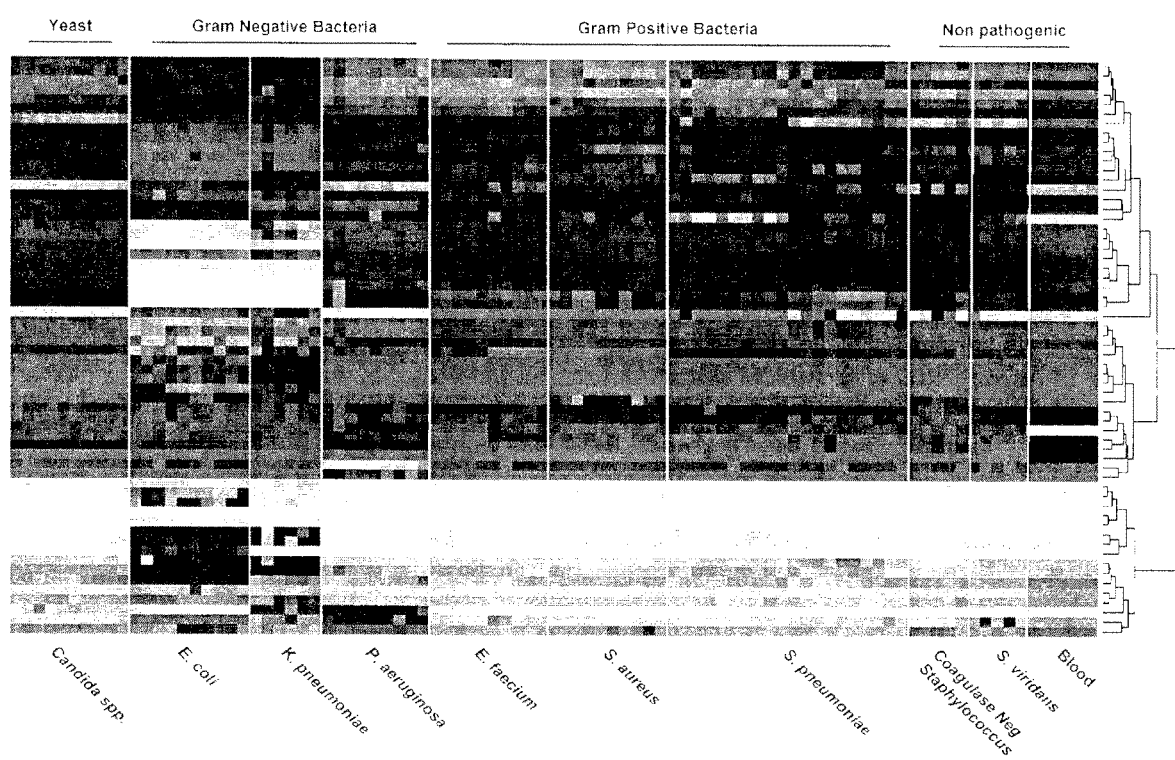
FIG. 7. Shows selected metabolite levels observed in the growth medium of 100 cultures clinical isolates of bacteria. Each media sample was inoculated with $10^8$ bacteria per ml and incubated for four hours. Metabolite levels across the target organisms were then identified by mass spectrometry.

To determine the diagnostic feasibility of the present invention, 100 microbial cultures of clinical isolates were prepared and analyzed as per the procedure in Example 1. The 100 isolates were prepared from nine groups of organisms (FIG. 6A) representing common pathogens and commensal organisms observed in clinical diagnostic laboratories. Data from 250 known metabolites and all unknown signals were acquired. The 60 most statistically significant signals observed after 4 hours of incubation were determined by one-way analysis of variance ("ANOVA"). Hierarchical clustering of these selected biomarkers showed distinct species-related clustering in metabolite levels (FIG. 7). All 60 of these diagnostic signals were used to create a support vector machine (SVM) model of microbial species. A total of 21 samples were used to construct the SVM computer system and the microorganisms present in the remaining 79 clinical samples were predicted using the metabolite levels. The SVM computer system correctly identified the organism in all 79 blinded clinical samples. In addition, none of the samples were misidentified in this analysis, indicating a sensitivity >99% with <1% false discovery. This experiment indicated that a fully automated computer system based on analysing metabolite levels in the medium could correctly identify pathogens and common commensal organisms from a representative transect of clinical isolates.

Table 2 shows clinical isolates identified by an automated computer analysis of metabolite levels. Classifications were completed as per the procedure in Example 2. Numbers of correctly-identified organisms are shown—all organisms in this study were properly identified via a SVM computer system of metabolite levels observed after 4 hours of incubation in Mueller-Hinton growth medium. *Candida* sp. indicate diverse species from the yeast genus *Candida*; VRE *E. faecium* indicates vancomycin-resistant *enterococcus*. From this study it can be concluded that automated data acquisition of metabolite levels in growth medium are a feasible mechanism for performing diagnostic evaluation of clinical microbiology samples.

TABLE 2

Unknown organism predicted from biomarkers using computer model

|  | CS | EC | KP | PA | EF | VR | SA | SP | GA |
|---|---|---|---|---|---|---|---|---|---|
| *Candida* sp. | 10 | | | | | | | | |
| *E. coli* | | 10 | | | | | | | |
| *K. pneumoniae* | | | 10 | | | | | | |
| *P. aeruginosa* | | | | 9 | | | | | |
| *E. faecalis* | | | | | 5 | | | | |
| VRE *E. faecium* | | | | | | 5 | | | |
| *S. aureus* | | | | | | | 10 | | |
| *S. pneumoniae* | | | | | | | | 10 | |
| Group A *Strep* | | | | | | | | | 10 |

Example III: Analysis of Sensitivity Limits

To ensure compatibility of the present invention with the clinical implementation, the analytical sensitivity of the device was measured. Cultures of *Pseudomonas aeruginosa* were grown to approximately 0.5 McFarland. The culture was then diluted using consecutive 1:10 dilutions in metabolite-free phosphate-buffered saline over a 5 orders of magnitude. The limit of detection for metabolite-based analyses was then determined by LC-MS as per the procedure in Example 1 and compared to traditional optical analysis of light scattering by bacterial cells at 600 nM. The LC-MS based assay showed a wider dynamic range and a lower limit of detection (<100 cells/ml) as compared to the optical method. This example indicates that the device and LC-MS analysis has sufficient sensitivity for clinical application of the device.

Example IV: Automated Detection of Antibiotic Susceptibility

Figure 9:
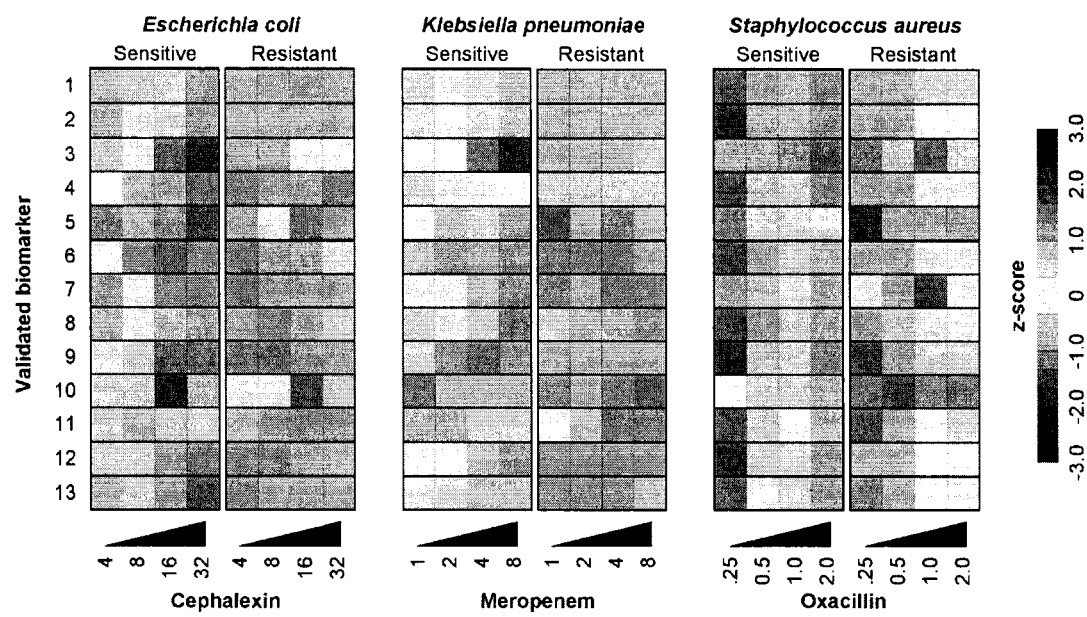
FIG. 9. Shows biomarker panel of sensitive versus resistant strains of three target organisms. Drug doses are listed in μg/ml. A computer model using these biomarkers successfully differentiated the organisms.
Figure 10:
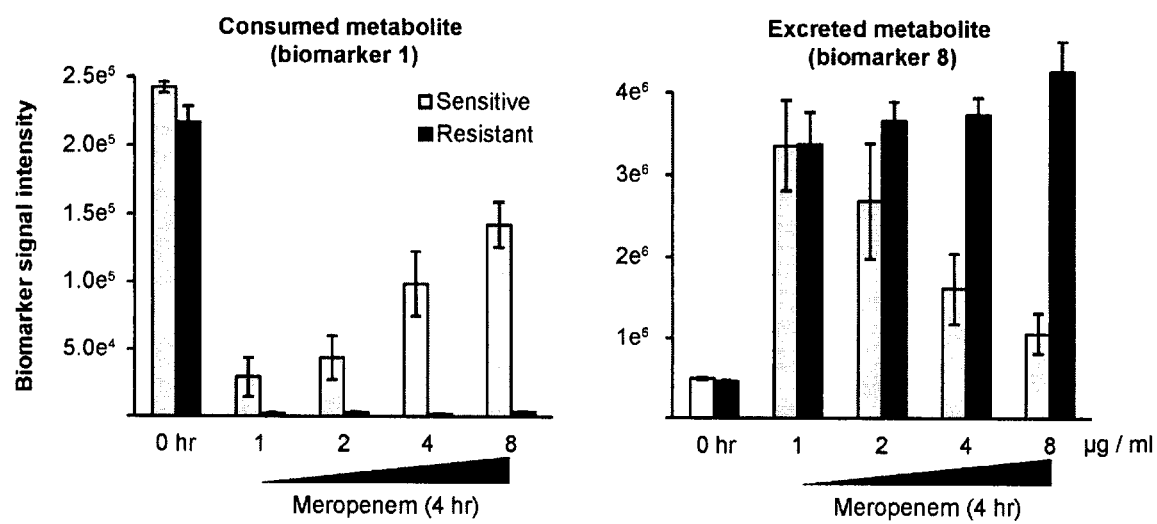
FIG. 10. Shows metabolic detection of antibiotic resistance by mass spectrometry. Biomarker levels were assessed in sensitive and carbapenem-resistant *K. pneumoniae* across a range of meropenem doses. This data shows toxin-induced changes in metabolism that differentiate drug-sensitive and resistant isolates. This data is a sub-set of the larger set shown in FIG. 9.

Identifying drug-induced changes in metabolite levels could enable more rapid diagnostic assays. To determine the feasibility of this approach, microbial cultures were prepared, analysed, and classified as per the procedure in Example 1 except that the Mueller-Hinton growth medium in Example 1 was supplemented with a range of antibiotic concentrations (FIG. 9-10). Drug sensitive and resistant strains underwent clinical screening using the standard drug doses used by diagnostic laboratories. The pattern of metabolites taken up and secreted into the medium across the range of antibiotic doses matched the established minimum inhibitory concentrations ("MIC") for each of the bacteria (FIG. 9). Moreover, despite the presence of 1% blood intentionally added to samples to mimic blood culture applications, there was no overlap in background metabolite signals from the blood and the diagnostic signals from the microbial metabolism (FIG. 11). This indicates the compatibility of metabolite-based drug sensitivity system with clinical applications of this technology.

Figure 12:
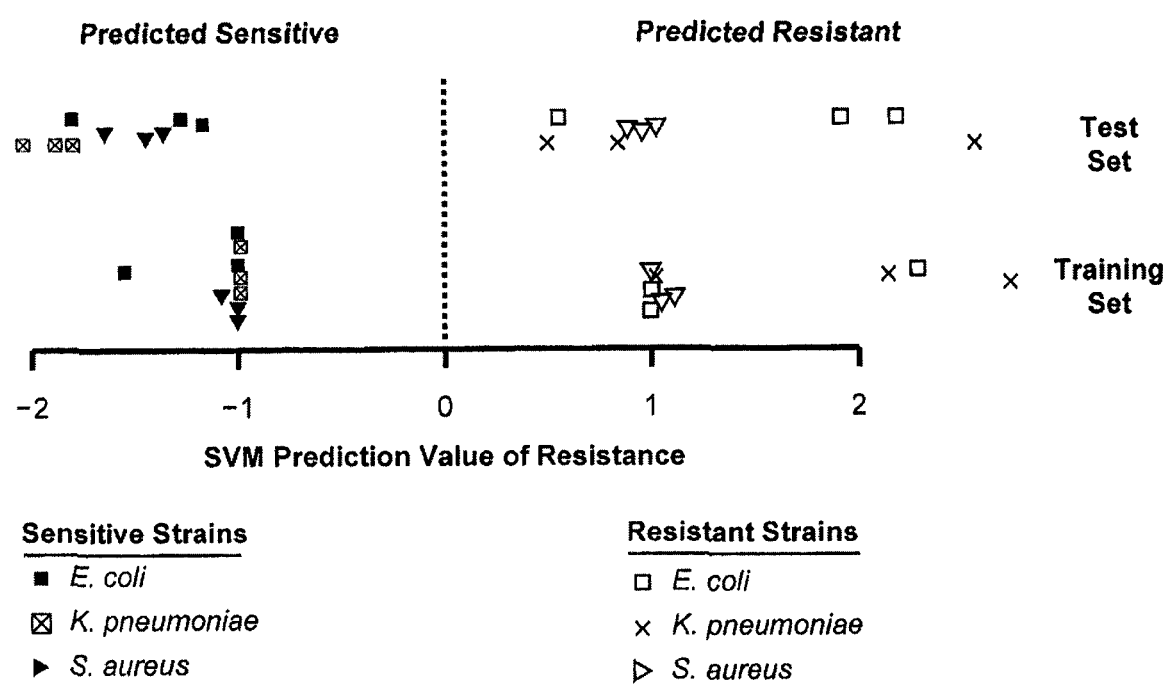
FIG. 12. Shows computer prediction of drug sensitivity. Drug-induced changes in biomarker levels were recorded in 36 clinically-relevant strains (three species with sensitive and resistant isolates, 6 replicates; *E. coli*+/−extended-spectrum beta-lactamase, *K. pneumoniae*+/−carbapinem resistance, and *S. aureus*+/−methicillin resistance). These biomarker levels were used to create a database training set. A computer model predicted resistance using biomarker levels in 18 samples.

To determine if automated metabolite analyses could be used to detected microbial drug sensitivity, drug-induced changes in biomarker levels were recorded in 36 clinically-relevant strains (three species with sensitive and resistant isolates, each with 6 replicates; *E. coli*+/−extended-spectrum beta-lactamase, *K. pneumoniae*+/−carbapinem resistance, and *S. aureus*+/−methicillin resistance). A computer model (SVM) was constructed to predict resistance using biomarker levels. Resistance levels were then predicted in 18 blinded test samples. The computer model correctly identified all resistant strains (FIG. 12). This study showed that toxin-induced changes in metabolite levels can be detected and used to automatically classify antibiotic sensitivity in clinically-relevant species.

Example V: Clinical Evaluation of Metabolite-Based Microbial Detection

Figure 5:
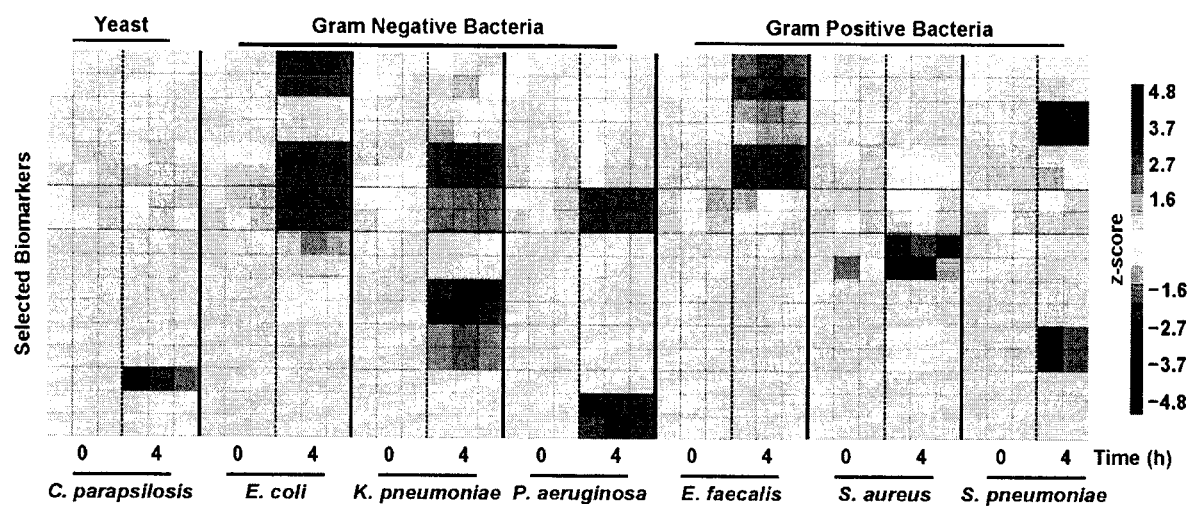
FIG. 5. Shows metabolite-based identification of seven unknown organisms. Heat map of biomarkers (plotted as z-scores) selected from over 250 metabolites observed in the MS spectra. The biomarkers are plotted prior to and after a 4 h incubation in a nutrient rich medium.
Figure 6B:
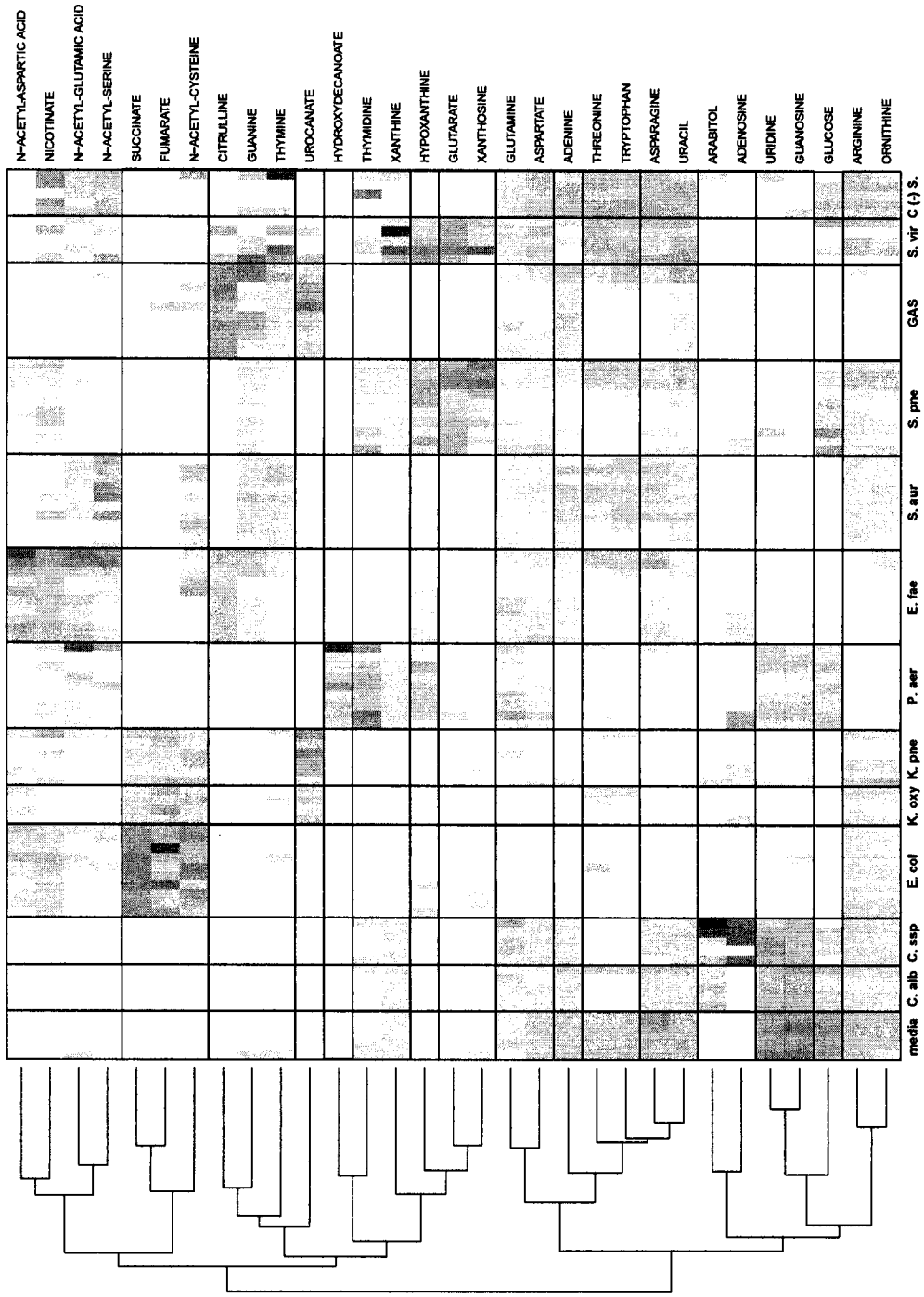
FIG. 6B is a heat map of expanded results supporting FIG. 6A. Sample key: *Candida* species, C. ssp,; *Candida albicans*, C. alb; *Escherichia coli*, E. col; *Klebsiella oxytoca*, K. oxy; *Klebsiella pneumoniae*, K. pne; *Pseudomonas aeruginosa*, P. aer; *Enterococcus faecium*, E. fae; *Staphylococcus aureus*, S. aur; *Streptococcus pneumoniae*, S. pne; group A *Streptococcus*, GAS; *Streptococcus viridans*, S. vir; and coagulase negative *Staphylococcus*, C(-)S.
Figure 8A:
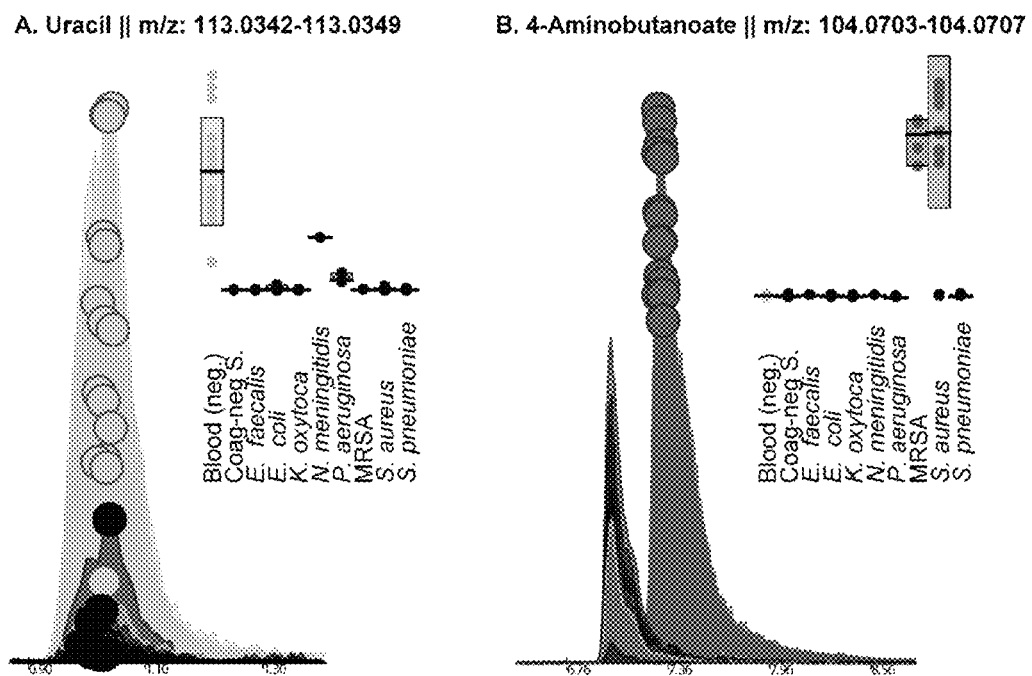
FIG 8A. Shows select biomarkers detected in spent blood culture bottles from a clinical diagnostic laboratory as determined by MS.

To determine the compatibility of the metabolically-based microbial detection system, human blood cultures were collected directly from a clinical diagnostic laboratory and analyzed by MS. The existing VITEK (BioMerieux) culture system used for high-volume blood-borne pathogen testing platform functions by combining clinical blood specimens with a microbial growth medium. This is done to enable microbial growth for the downstream protein analysis used in the current technology (FIG. 8A). Once bacterial densities have reached detectable levels (approximately 1,000 cells/ml) an aliquot is harvested and the bottles are discarded. These discarded blood cultures were collected directly from the clinical sample stream and analyzed by the present metabolite-based detection platform. Microbial metabolism was quenched by combining a 100 microliter aliquot with an equal volume of methanol, insoluble components were removed by centrifugation, and soluble extracts were analyzed by LC-MS. LC-MS analyses showed both general biomarkers of infection that differentiated positive from negative cultures and species-specific biomarkers similar to those seen in Examples 1, 2, and 3 (FIG. 5-7). This study showed that metabolic detection technology could be directly integrated into the existing clinical workflow.

Figure 8B:
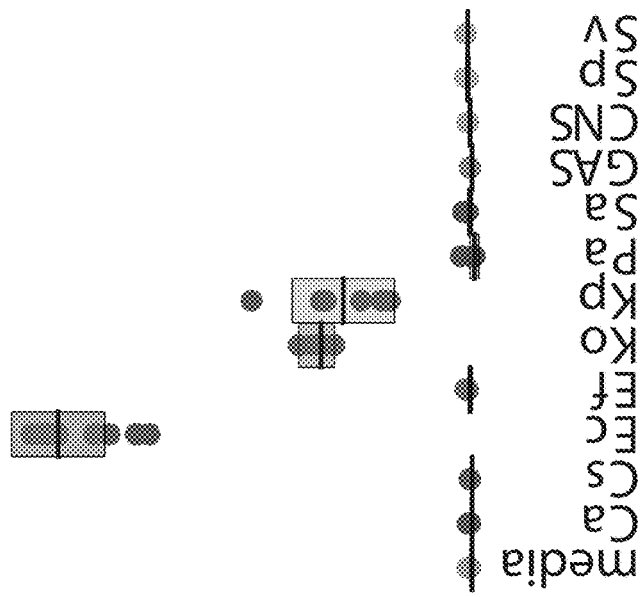
FIG 8B. (A) Shows a raw mass spectrometer dataset (extracted ion chromatogram) showing the signal for succinate observed in Mueller Hinton after four hours incubation in the presence of microorganisms. This figure depicts the diagnostic differences in Escherichia and Klebsiella signals versus those seen in nine other microbes. (B) The mass spectrometry intensities for succinate depicted as a boxplot. This figure depicts the same data as shown in FIG. 8B (A), but in a processed format.
Figure 8B:
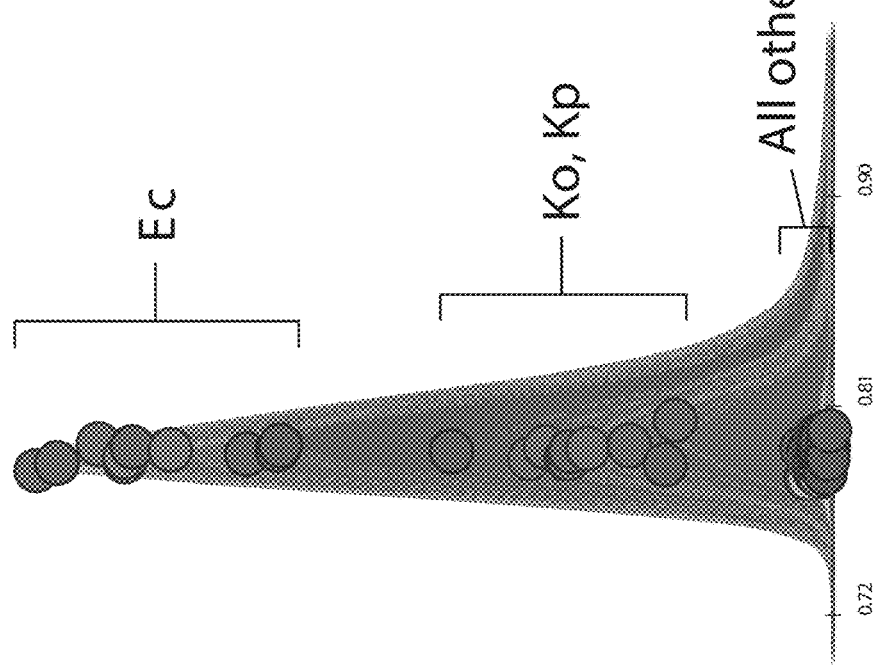

This study also shows that blood metabolites and pathogen metabolites can be detected such that even samples with mixtures of cells can be analyzed and cells identified therein. Identification of a mixture of cells is also shown in FIG. 8B.

Example VI: Detection of Organisms by NMR and Determination of Drug Sensitivity

Although LC-MS analyses is a powerful approach for detecting changes in the metabolic composition of growth medium, it is only one example of a wide range of possible analytical techniques that could be used to detect the metabolism of microorganisms. To determine the feasibility of NMR-based microbial detection systems, a clinical blood sample was obtained and prepared as per the procedure in Example V. The extract was then dried to remove the methanol component, resuspended in 100% $D_2O$ containing 500 µM 4,4-dimethyl-4-silapentane-1-sulfonic acid (DSS;

an internal standard used to reference chemical shifts). $^1$H NMR spectra of the media were acquired on a 600 MHz instrument of a *Pseudomonas aeruginosa* positive culture. These data showed metabolic changes caused by the *P. aeruginosa* (FIG. 13A).

These studies indicate that NMR has sufficient sensitivity to detect microbial metabolic activity in samples taken directly from the existing clinical pipeline.

To determine if NMR could be used to distinguish microorganisms, cultures of eight different microorganisms (*C. albicans, E. coli, K. pneumoniae, E. faecalis, P. aeruginosa*, coagulase negative *Staphylococcus, S. pneumoniae*, and *S. aureus*) were inoculated into in BacT blood culture medium (BioMérieux) or Mueller Hinton medium and grown for four hours. Metabolites were extracted as described above (Example VI) and analyzed by multidimensional 1H-13C heteronuclear single quantum coherence (HSQC) NMR. Diagnostic regions of interest in the NMR spectra that correspond to seven target sugars were extracted and compared to reference signals of metabolites standards prepared at 100 mM. The pattern of sugars observed in the growth medium was sufficient to distinguish all the target pathogens. This study indicated that NMR is capable of differentiating between types of microorganisms.

Figure 14:
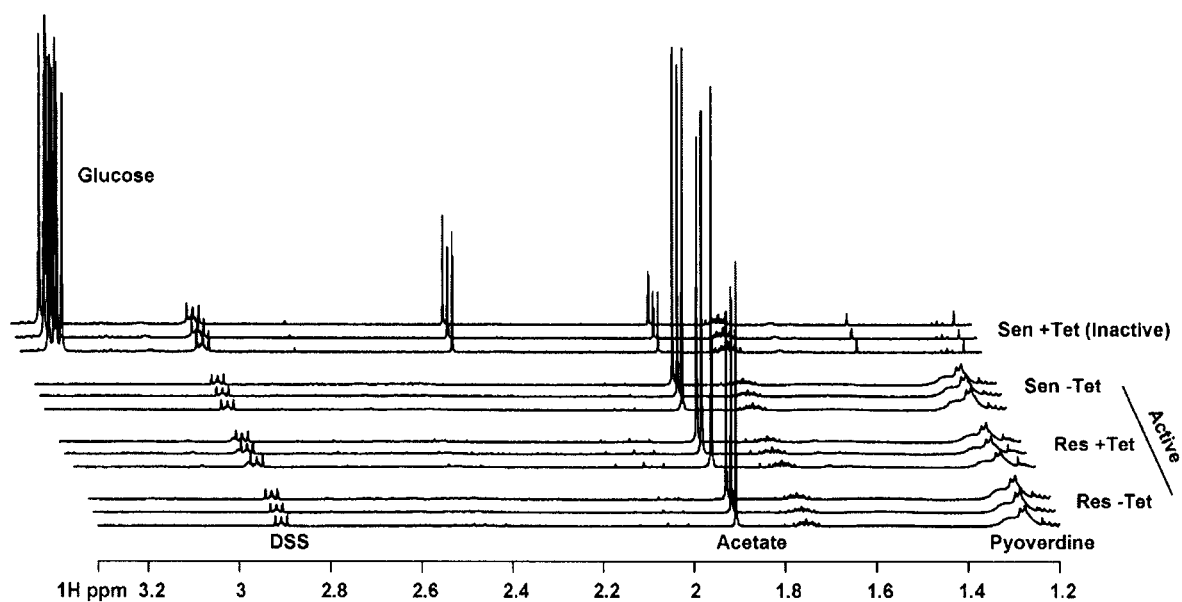
FIG. 14. Shows $^1$H NMR-based differentiation between drug sensitive (Sen) and drug-resistant (Res) isolates of *Pseudomonas aeruginosa* in the presence and absence of 60 μg/ml tetracycline (Tet). Metabolite biomarkers of drug efficacy are noted along with DSS, an internal standard.

To determine if NMR could be used to detect antibiotic-induced perturbation in microbial metabolism, cultures of tetracycline sensitive and resistant isolates of *Pseudomonas aeruginosa* were prepared as per the procedure in Example 1. The Mueller-Hinton growth medium was substituted for M9 medium (M9 media is prepared according to the well known recipe, such as is published at http://cshprotocols.cshlp.orq/content/2010/8/pdb.rec12295.short, which is 47.7 mM Na2HPO4, 22 mM KH2PO4, 8.6 mM NaCL, 18.7 mM NH4Cl, 22 mM glucose, 2 µM MgSO4 and 100 nM CaCl2)). Growth medium was prepared with and without 60 ug/ml tetracycline and were incubated with each strain for 12 hours. NMR samples of the media were prepared and analyzed as described above. The NMR data showed that all of the drug resistant isolates as well as the drug-sensitive isolate incubated in non-antibiotic medium were metabolically active; each active strain consumed glucose and produced acetate and pyoverdine (FIG. 14). In contrast, NMR analysis of the drug sensitive line incubated with tetracycline showed metabolic inactivation (i.e. minimal glucose consumption and minimal acetate and pyoverdine production). This study indicated that NMR is capable of detecting drug-induced inhibition in microbial metabolism.

While the analysis of FIG. 14 is by NMR, the simplicity of the system including the use of a simple growth medium with only a limited number of nutrients, lends itself as well to more simple chemical analysis. For example, the results to identify drug resistant isolates could be obtained with a glucometer. When simpler medium options are employed, growth may be slower, but growth medium analysis and identification against reference profiles may be facilitated.

Example VII: Determination of Drug Sensitivity by Spectrophotometry

Figure 15:
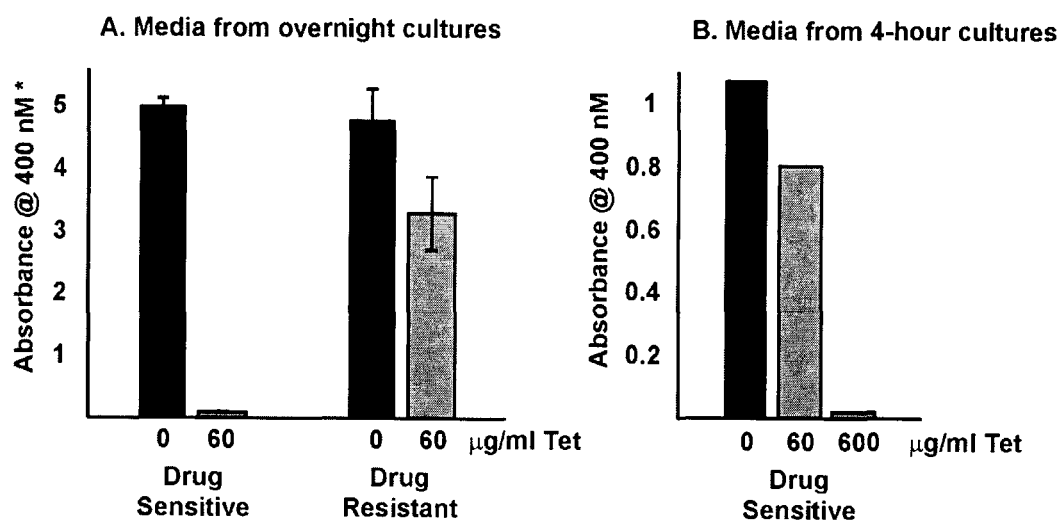
FIG. 15. Shows metabolic detection of antibiotic resistance by optical absorbance. Cultures of *Pseudomonas aeruginosa* were prepared in the optically-neutral M9 medium. The microbial production of the optically-active pyoverdine was detected by absorbance at 400 nM in media that had the cells removed via centrifugation. The optical differentiation of drug sensitive (Sen) and drug-resistant (Res) isolates of *Pseudomonas aeruginosa* in the presence of 0, 60, and 600 μg/ml tetracycline (Tet) is shown.

Although NMR and MS offer opportunities for decoding complex mixtures of metabolites, optically engineered growth medium could also provide a mechanism for identifying microorganisms and measuring their sensitivity to toxin(s). To determine the feasibility of using optically-based methods for detecting drug-induced perturbations in microbial metabolism, *Pseudomonas aeruginosa* cultures were prepared as described in Example V. M9 growth medium, as described in Example VI, was used for this example because of its minimal optical properties, which enables sensitive detection of optically active metabolic waste products. Drug sensitive and resistant strains were incubated for either 4 or 8 hours in M9 medium containing 0, 60, and 600 µg/ml tetracycline. The cells were then removed by centrifugation and the cell-free medium composition was analyzed by spectrophotometric absorbance at 400 nM. The pyoverdine secreted by *P. aeruginosa* absorbs at this wavelength and can be used as a marker for metabolic activity (FIG. 15). Drug sensitive isolates showed impaired pyoverdine production when incubated with tetracycline, whereas the drug resistant lines did not. Moreover, the impairment in pyoverdine secretion was proportional to the concentration of the tetracycline (FIG. 15). This study showed that spectrophotometric analysis could be used to detect microbes and measure drug sensitivity.

Example VIII: Metabolite Identifiers for Common Pathogens

A panel of the following organisms was analyzed by mass spectrometry after incubation in Mueller Hinton medium: *Candida albicans, Candida* ssp (other species of *Candida*), *Escherichia coli, Klebsiella oxytoca, Klebsiella pneumoniae, Pseudomonas aeruginosa, Enterococcus faecium, Staphylococcus aureus, Streptococcus pneumoniae*, Group A *Streptococcus, Streptococcus viridans*, Coagulase-Negative Staphylococci (CN-Staph).

The following metabolites were identified that can be used for identification and saved as reference metabolic profiles:

Succinate levels differentiate *E. coli* and *Klebsiella* ssp from all other organisms in the panel;
Urocanate levels differentiate *E. coli* and *Klebsiella* ssp;
Hydroxydecanoate differentiates *Pseudomonas aeruginosa* from all others in panel;
Arbitol levels differentiate yeast from all other organisms in the panel;
Glucose levels differentiate *Pseudomonas aeruginosa* from all other gram negative organisms;
N-Acetyl-Aspartate levels differentiate *Enterococcus* from all other organisms in panel;
Xanthine differentiates *viridans* streptococci from others in the panel;
The presence of galactose is diagnostic for *E. coli*; and
Glucose versus lactose levels differentiate *E. faecalis* from other gram positive organisms.

A panel of organisms was analyzed by NMR after incubation in BacT medium:

Sucrose levels differentiate *E. coli, Klebsiella* ssp and *S. aureus*; and
Trehalose levels differentiate CN-Staph from *S. aureus* and E. coll.

Example IX: Further Metabolomic Testing

In a large study, the metabolic preference assay (MPA) disclosed herein that measures supernatant biomarker production and consumption, was used to differentiate between seven different species (*Candida albicans, Klebsiella pneumoniae, Escherichia coli, Pseudomonas aeruginosa, Staphylococcus aureus, Enterococcus faecalis*, and *Streptococcus pneumonia*) responsible for 85% of bloodstream infections. Strains were grown in Mueller Hinton medium for 4 hours, and supernatants were analyzed by ultra-high performance liquid chromatography mass spectrometry (UHPLC MS) to identify potential biomarkers. For initial biomarker discovery, three clinical isolates of each species (2 for PA) were each analyzed in replicate (n=9). Untargeted MS analysis was used to find biomarkers that were common to all three isolates of each species, and that could differentiate between the different species. The stability of top biomarkers was subsequently assessed on a large cohort of clinical isolates (n=596) representing these 7 species. The molecular identity of select biomarkers was verified by standard additions and MS/MS fragmentation patterns comparing standards and samples.

To assess specificity and selectivity of MPA to identify pathogens in blood, a further blinded study was performed on patient samples collected over a 10 day period (n=809). Also to test the reliability of MPA for antibiotic susceptibility testing (AST), a metabolomic-based antibiotic susceptibily test (MAST) studied changes in metabolite concentrations for each of the original strains used for biomarker discovery (n=3; n=2 for S. au and P. ae) grown in the presence of antibiotics in triplicate.

Strains, Growth, and Sample Preparation

All chemicals were obtained from Sigma-Aldrich (St. Louis, Mo. USA), VWR (Radnor, Pa. USA), or Fisher Scientific (Waltham, Mass. USA) unless otherwise specified. Clinical isolates used in this study were obtained from bloodstream infected patients. All strains were first identified and tested for antibiotic susceptibility using a clinical laboratory testing pipeline (plating on selective medium for single colony isolation, Gram staining, MALDI-TOF-MS species identification, and sub-culturing for purity and inoculation onto VITEK 2 (bioMerieux) antimicrobial susceptibility panels), and subsequently frozen as cryostocks. With the exception of S. pneumoniae, all strains were routinely grown in Mueller Hinton medium (BD Difco, Mississauga, ON, Canada). S. pneumoniae isolates were first revived on trypticase soy agar plates containing sheep blood (BD BBL, Mississauga, ON, Canada) and then sub-cultured into Mueller Hinton medium supplemented with catalase (1000 U/mL). For biomarker discovery and validation of biomarkers using MPAs, exponential phase cultures were used to seed 96 well culture plates (Corning, N.Y., N.Y. USA) containing Mueller Hinton medium with 10% donated human blood to a 0.5 McFarland ($OD_{600}$~0.07 or ~$1.5 \times 10^8$ CFU/mL). Cultures were incubated in a humidified incubator (Heracell VIOS 250i Tri-Gas Incubator, Thermo Scientific, Waltham, Mass. USA) under a 5% $CO_2$ and 21% $O_2$ atmosphere for four hours. After incubation, samples were transferred to a 96 well PCR plate (VWR), and centrifuged for 10 minutes for 4000 g at 4° C. to remove cells. Supernatant was removed, mixed 1:1 with 100% LC-MS grade methanol, and either frozen at −80° C. for further processing, or centrifuged again for 10 minutes at 4000 g at 4° C. to remove any protein precipitate. Supernatant was then diluted 1:10 with 50% LC-MS grade methanol and analyzed using UHPLC-MS. AST MPAs were performed as described above, however, cultures were seeded at a 0.05 McFarland, and no blood was added to avoid potential carryover of antibiotics or antibodies from donor blood and to allow for periodic growth measurements at $OD_{600}$ (Mutiskan G O, Thermo Fisher Scientific, Waltham, Mass. USA). Antibiotics used for each species was based on prevalence of being used for treatment. Published strain-specific minimum inhibitory concentrations (MIC) of each antibiotic were used (C. L. S. I. (CLSI). (CLSI, Wayne, Pa., USA, 2018), pp. 1-296.).

UHPLC-MS

Metabolite samples were resolved via a Thermo Fisher Scientific Vanquish UHPLC platform using hydrophilic interaction liquid chromatography (HILIC). Chromatographic separation was attained using a binary solvent mixture of 20 mM ammonium formate at pH 3.0 in LC-MS grade water (Solvent A) and 0.1% formic acid (% v/v) in LC-MS grade acetonitrile (Solvent B) in conjunction with a 100 mm×2.1 mm Syncronis™ HILIC LC column (Thermo Fisher Scientific) with a 2.1 µm particle size. For general metabolic profiling runs (15 minute) the following gradient was used: 0-2 min, 100% B; 2-7 min, 100-80% B; 7-10 min, 80-5% B; 10-12 min, 5% B; 12-13 min, 5-100% B; 13-15 min, 100% B. For expedited runs (5 minute) used for the ID and AST race experiments, the gradient was as follows: 0-0.5 min, 100% B; 0.5-1.75 min, 100-80% B; 1.75-3 min, 80-5% B; 3-3.5 min, 5% B; 3.5-4 min, 5-100% B; 4-5 min, 100% B. The flow rate used in all analyses was 600 uL/min and the sample injection volume was 2 uL. Samples were ionized by electrospray using the following conditions: spray voltage of −2000 V, sheath gas of 35 (arbitrary units), auxiliary gas of 15 (arbitrary units), sweep gas of 2 (arbitrary units), capillary temperature of 275° C., auxiliary gas temperature of 300° C. Positive mode source conditions were the same except for the spray voltage being +3000 V. Data were acquired on a Thermo Scientific Q Exactive™ HF (Thermo Scientific) mass spectrometer using full scan acquisitions (50-750 m/z) with a 240,000 resolving power, an automatic gain control target of $3e^6$, and a maximum injection time of 200 ms. All data were acquired in negative mode except for MS/MS fragmentation analysis and confirmation of $N^1,N^{12}$-diacetylspermine, which ionized more efficiently in positive mode. Select biomarkers were confirmed using MS/MS analysis across a range of collision energies from 10-50 eV, at 30,000 resolving power, with a $5e^4$ automatic gain control target, and an isolation window of 4 m/z, selecting for previously observed parent ions. Biomarkers were matched to standards using fragmentation spectra and retention times. $N^1,N^{12}$-diacetylspermine was purchased from Cayman Chemical Company (Ann Arbor, Mich. USA), all other standards were purchased from Sigma-Aldrich. Fragmentation data were analyzed using Xcalibur 4.0.27.19 software (Thermo Scientific). All other MS analyses were conducted in MAVEN (H. Li et al., Adaptable microfluidic system for single-cell pathogen classification and antimicrobial susceptibility testing. *Proc Natl Acad Sci USA*, (2019)).

Figure 18A:
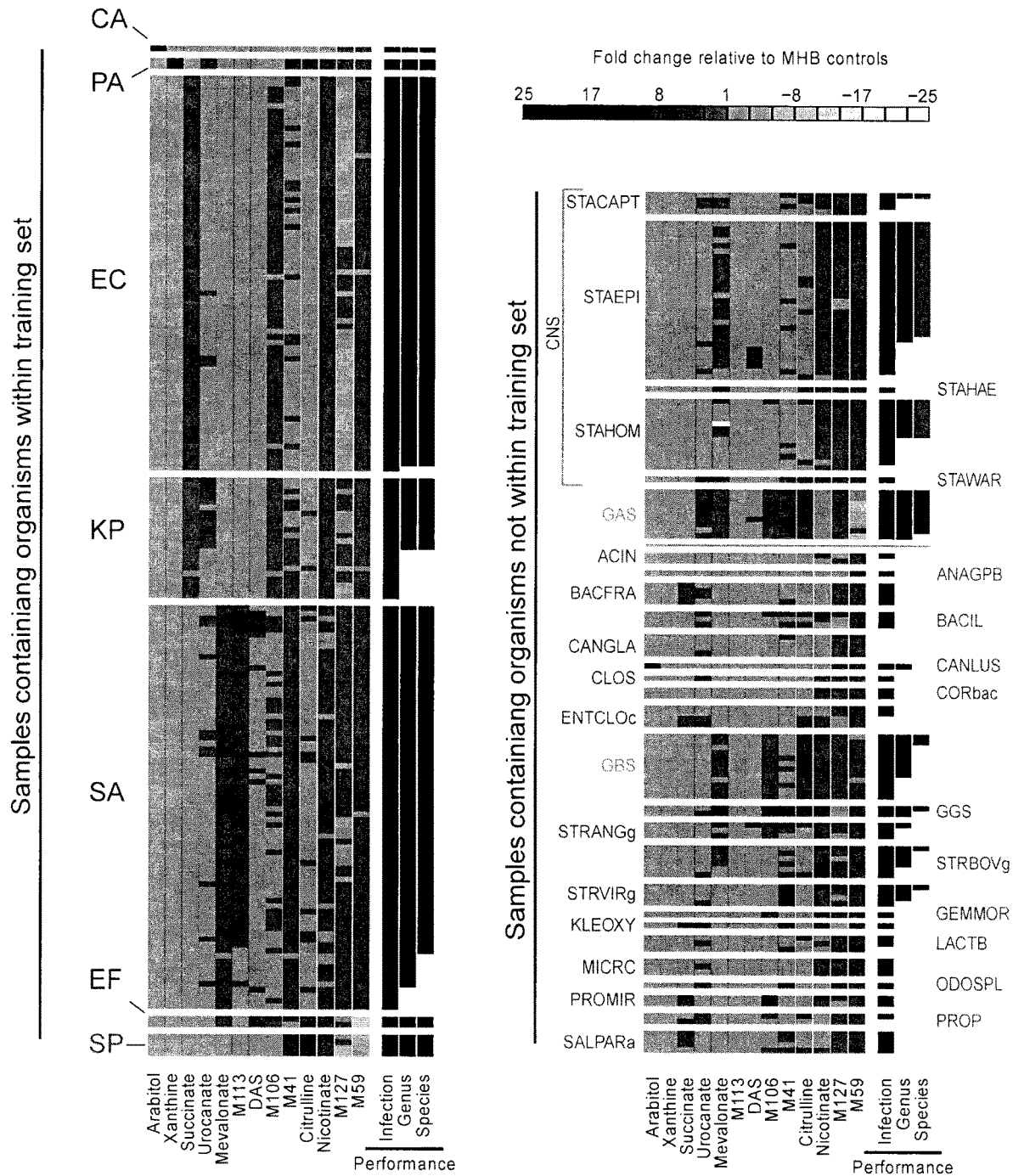
FIG. 18A (i) and (ii). From Example IX, data from the blinded clinical trial where eleven key biomarkers were used to identify species via metabolomics. The heat map depicts fold changes of metabolite intensities relative to an uninfected Mueller Hinton blood control in positive cultures (mono-cultures only) versus negative blood cultures (ii). In the Performance and right hand side Infection columns, each panel shows agreement between metabolomics versus culture-based assignments with strong agreement shown as black, some agreement shown as dark gray and disagreement shown as pale gray. Species that were part of the training set are on the top and separated from those observed for the first time in the blinded trial. Abbreviations: *Candida albicans*, CA; *Escherichia coil*, EC; *Klebsiella pneumoniae*, KP; *Pseudomonas aeruginosa*, PA; *Staphylococcus aureus*, SA; *Enterococcus faecium*, EF; SP, *Streptococcus pneumoniae*; CANLUS, *Candida lustiniae*; CANGLA, *Candida glabratta*; BACIL, *Bacillus* species; ODOSPL, *Odoribacter splanchnicus*; ACIN, *Acinetobacter* species; PROMIR, *Proteus mirabilis*; SALPARa, *Salmonella* Paratypi A; KLEOXY, *Klebsiella oxytoca*; ENTCLOc, *Enterobacter cloacae* complex; MICRC, *Micrococcus* species; PROP, *Propionibacterium* species; BACFRA, *Bacteroides fragilis*; CORbac, *Coryneform bacilli*; STRBOVg, *Streptococcus bovis* group; STRANGg, *Streptococcus anginosus* group; STR-VIRg, *Streptococcus viridans* group; LACTB, *Lactobacillus* species; CLOS, *Clostridium* species; GEMMOR, *Gemella morbillorum*; CNS, coagulase negative *Staphylococcus* including (STAHOM, *Staphylococcus hominis*; STAWAR, *Staphylococcus warneri*; STAEPI, *Staphylococcus epidermidis*; STACAPT, *Staphylococcus capitis*); GAS, group A *Streptococcus*; GGS, Group G *Streptococcus*; GBS, Group B *Streptococcus*.
Figure 18B:
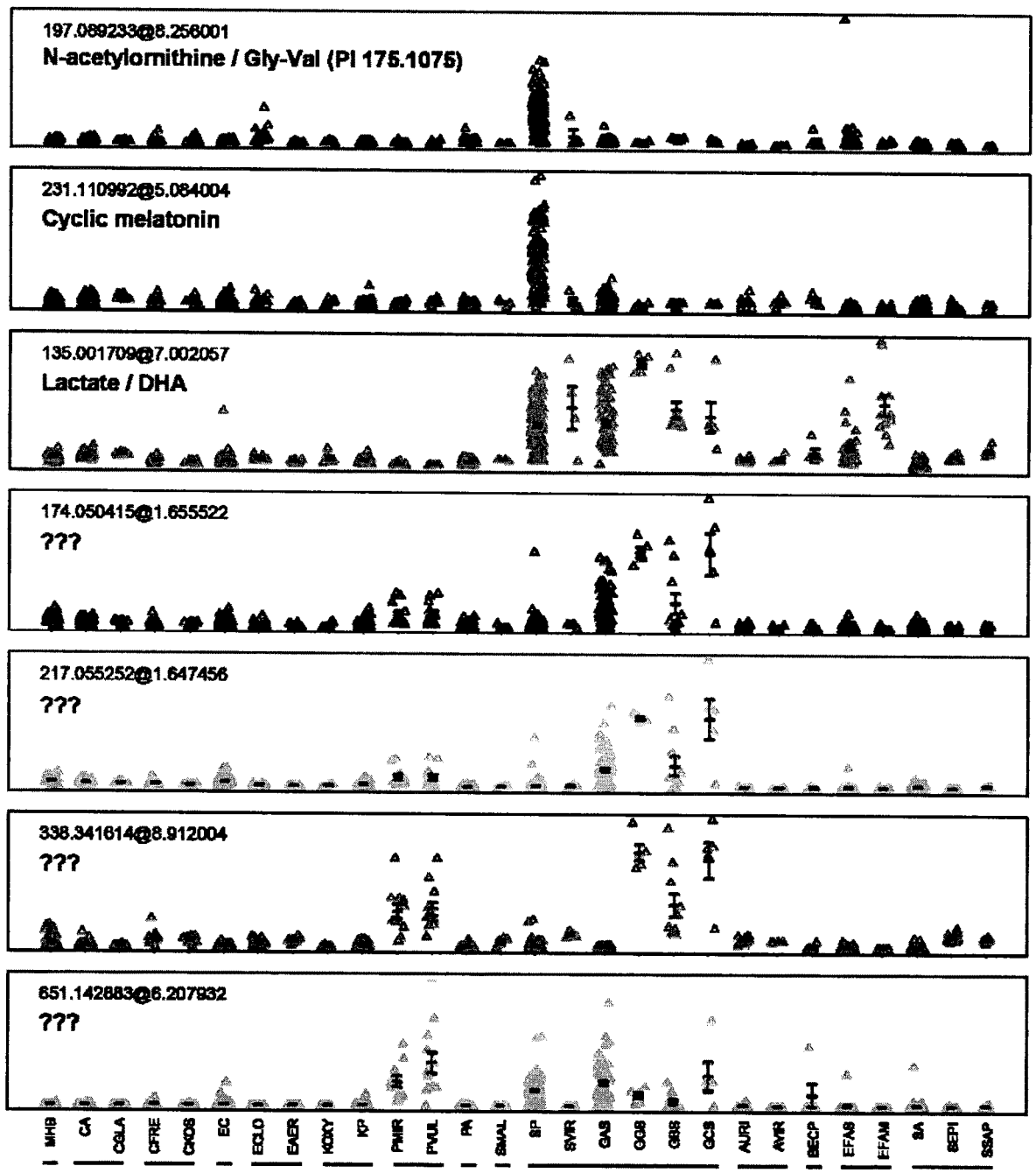
FIG. 18B (i) to (v). From Example IX, biomarker and pathogen data acquired from MS analysis in positive mode. Abbreviations: MHB, control; *Candida albicans*, CA; CGLA, *Candida glabratta*; CFRE, *Citrobacter freundii*; CKOS, *Citrobacter koseri; Escherichia coli*, EC; ECLO, *Enterobacter cloacae*; EAER, *Enterobacter aerogenes*; KOXY, *Klebsiella oxytoca; Klebsiella pneumoniae*, KP; PMIR, *Proteus mirabilis*; PVUL, *Proteus vulgaris; Pseudomonas aeruginosa*, PA; SMAL, *Stenotrophomonas*
Figure 18B:
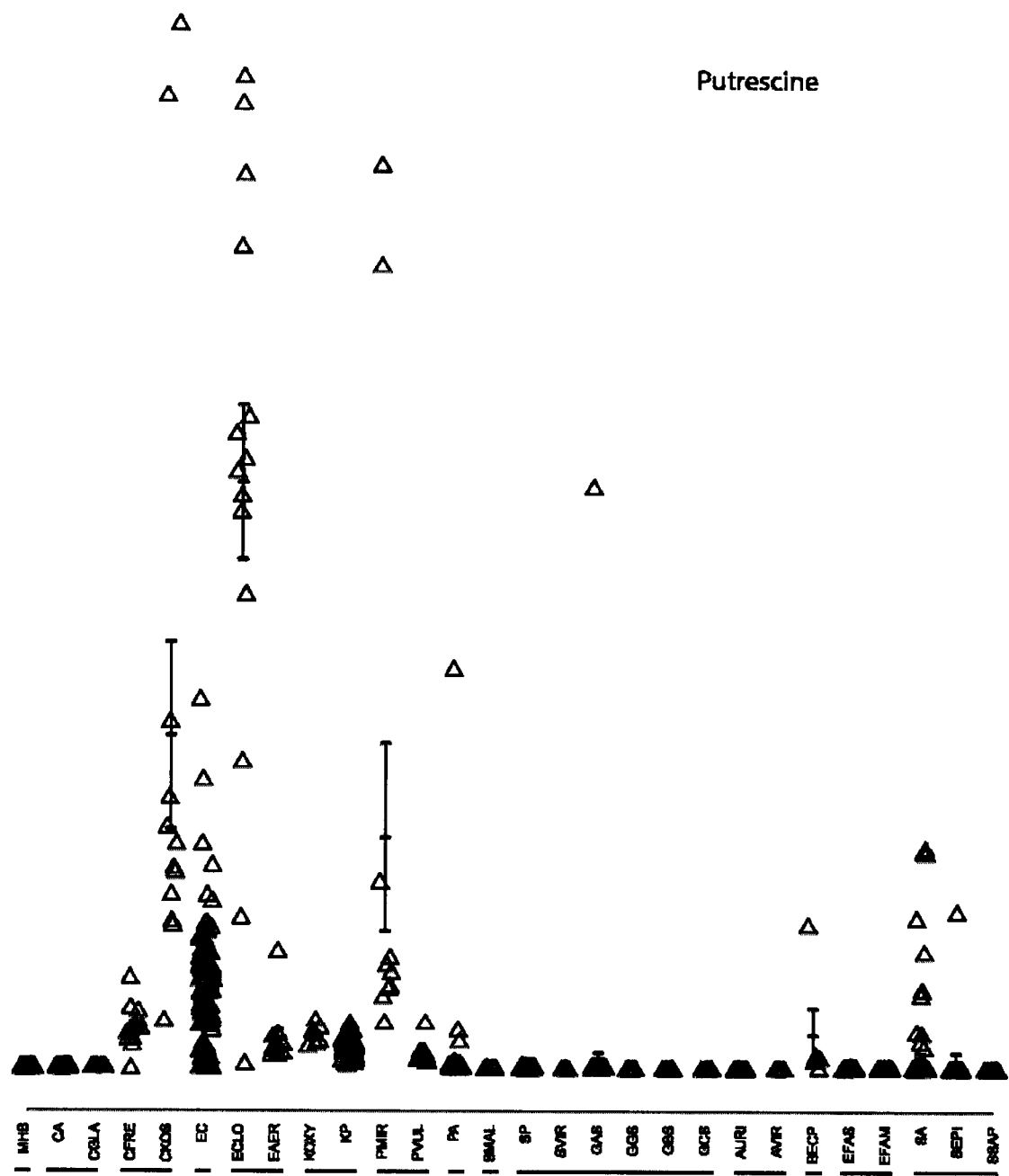

Because of some discrepancies noted in negative mode such as with respect to $N^1,N^{12}$-diacetylspermine, some data was acquired in positive mode. Tests were repeated as above but data was acquired in positive mode. This identified further biomarkers of interest as shown in FIG. 18B(i) to (v).

Clinical Microbiology and Testing Methods

All isolates used in this study were acquired from patient blood samples. Blood cultures were aseptically collected by trained phlebotomists. Two sets of blood cultures were drawn from adults, each set from a separate venipuncture for a total blood volume of 40 mL (e.g., each bottle set included an aerobic (FA) and anaerobic (FN) blood culture resin media). Children had a single pediatric bottle (PF) drawn. All blood specimens were processed identically using the BacT/Alert® automated blood culture microbial detection system (bioMerieux Inc., Saint-Laurent, Que. Canada). Specimens were continuously monitored for growth and immediately Gram-stained and pelleted when the blood culture bottle became positive. The blood culture pellet was sub-cultured onto appropriate solid agar media, and subsequently identified by a combination of matrix-assisted laser desorption ionization-time-of-flight (MALDI-TOF-MS) procedures (bioMerieux Inc., Saint-Laurent, Que. Canada), VITEK 2 automated system (bioMerieux Inc., Durham, N.C., USA), and rapid phenotypic tests as required. Isolates that could not be identified using conventional phenotypic and/or MALDI-TOF MS were subsequently identified by DNA sequencing of the 16S rRNA gene, and the Integrated Database Network System (IDNS®) (https://www.Smart-Gene.com, Lausanne, Switzerland) database to analyze variability across the V1-V3 region (Clinical Laboratory Standards Institute (CLSI). Interpretive criteria for identification of bacteria and yeast using DNA sequencing. M18-$2^{nd}$ Edition, c2018, pp. 1-296, CLSI, Wayne, Pa. USA). Antimicrobial profiles were simultaneously obtained using a VITEK 2 automated system. Antibiotic resistance was confirmed for each isolate according to previously cited guidelines. Patient isolates obtained through this process were archived as cryo stocks.

Blinded ID Trial on Patient Samples

To assess specificity and selectivity of MPA to identify pathogens in blood samples using the biomarkers that could differentiate our 7 target organisms, a blinded study was performed on patient samples collected over a 10 day period (n=809). Blood drawn from patients suspected to have a blood stream infection (BSI) was incubated in BacT bottles until they flagged positive or for five days at which point samples were deemed negative. Positive samples proceeded through the clinical workflow for pathogen identification. Aliquots (10%) of both positive and negative samples were also incubated in MH medium for four hours and subsequently quenched with methanol according to the MPA protocol. Samples were then sent for MS analysis. Identifications were made using 20 markers depicted in the decision tree in FIG. 16. Minimum fold change thresholds in each marker (when compared to MHB control) were set to classify the marker change. MPA identification calls were done daily (~80 per day) and clinical identifications were subsequently provided prior to each new sample set, allowing for refinement of biomarker patterns for species that have never been assessed via the MPA approach before. This allowed for discovery of additional markers (MS4 in FIG. 16) and identification of new patterns to help differentiate select organisms that were not already assessed (FIG. 18A).

Real-Time ID and AST Race

Exponential phase E. coli and S. aureus were used to seed BacT/Alert® bottles supplemented with 10 mL human blood to a final CFU/mL of 25 (corresponding to 100 CFU/mL of patient blood). Bottles were incubated in the BacT/Alert® automated blood culture microbial detection system. Once bottles flagged, one aliquot was used for the clinical testing pipeline, and a second aliquot was used for MPA. Medium containing the most commonly prescribed antibiotics for each strain (CIP, OXA, SXT, CFZ, and AMP for S. aureus; CIP, SXT, AMP, and GEN for E. coli) at concentration ranges consistent with the VITEK 2 automated system were inoculated with 10% of the blood-bacterium-BacT/Alert medium mixture. Samples were processed following the 4 h incubation period and analyzed via UHPLC-MS using a 5 minute HILIC-MS method. Data was analyzed on the fly using the MAVEN software packages. The positive control (medium with no antibiotic) was analyzed first to enable species identification. Subsequently, samples containing the lowest concentrations of antibiotics were analyzed to assess sensitivity. Samples incubated in higher concentrations of antibiotics were only analyzed if strains showed resistance to lower concentrations of antibiotics to minimize the MS analysis time.

Statistical Analysis

Untargeted biomarkers in the preliminary dataset (7 species, 3 isolates, 9 replicates) were identified by peak picking the data in Maven with a 10 ppm m/z window and a minimum peak intensity set to 50,000. All subsequent tests were conducted using the R statistical software platform (R Core Team, R: A language and environment for statistical computing. R foundation for Statistical Computing, Vienna, Austria. http://www.R-project.org/) using in-house software tools. Untargeted analysis identified 4,372 signals in the mass spectra. This list was ranked according to p value (as computed by analysis of variance) and 1,758 signals were identified as significant in the 4 h time point after Bonferroni correction ($\alpha$=0.05). These signals were further thresholded (peak area-top >20,000) and fold change (pairwise mean difference between species >2 fold) resulting in 799 peaks. These signals were then clustered into 104 groups using a weighed probability function accounting for retention times, common adduct/fragment/isotopomer masses, and covariance of signal intensities among all replicates (equally weighted) using custom R software. The most likely parent ion was then selected from each cluster on the basis of signal intensity and evaluated by manual inspection of the original MS data. Parent ions for each biomarker were then assigned using a combination of informatics tools (Madison Metabolomics Consortium Database (Q. Cui et al., Metabolite identification via the Madison Metabolomics Consortium Database. Nat Biotechnol 26, 162-164 (2008)), and the Human Metabolome Database (D. S. Wishart et al., HMDB 4.0: the human metabolome database for 2018. Nucleic Acids Res 46, D608-D617 (2018))). Putative metabolite assignments were then validated by purchasing standards and conducting MS/MS fragmentation and standard addition experiments.

Results: Metabolomic Identification

As noted, the metabolic boundary fluxes were measured of seven common bloodstream pathogens [Candida albicans (CA), Klebsiella pneumoniae (KP), Escherichia coli (EC), Pseudomonas aeruginosa (PA), Staphylococcus aureus (SA), Enterococcus faecalis (EF), and Streptococcus pneumoniae (SP)]. For initial biomarker discovery, three clinical isolates (2 for PA) from each target species (n=7) were analyzed in replicate (n=9). Microbial cultures were seeded at a 0.5 McFarland ($OD_{600}$~0.07 or 1.5×$10^8$ CFU/mL) into Mueller Hinton broth containing 10% human blood (MHB). Metabolite levels present in the cultures were analyzed at 0 h and 4 h on a Thermo Q Exactive™ HF MS in negative mode. Untargeted analysis identified 799 peaks with significant fold changes between species (as computed by analysis of variance using a Bonferroni corrected $\alpha$=0.05). These signals were clustered into 104 groups on the basis of retention times, known adduct/fragment masses, and covariance of signal intensities across replicates using R software. The most likely parent ion for each biomarker was then identified from each of the 104 groups based on signal intensities. Putative metabolite assignments were made via the Madison Metabolomics Consortium Database (MMCD) and Human Metabolome Database, and select metabolites were confirmed via MS/MS fragmentation and by standard addition.

Figure 17A:
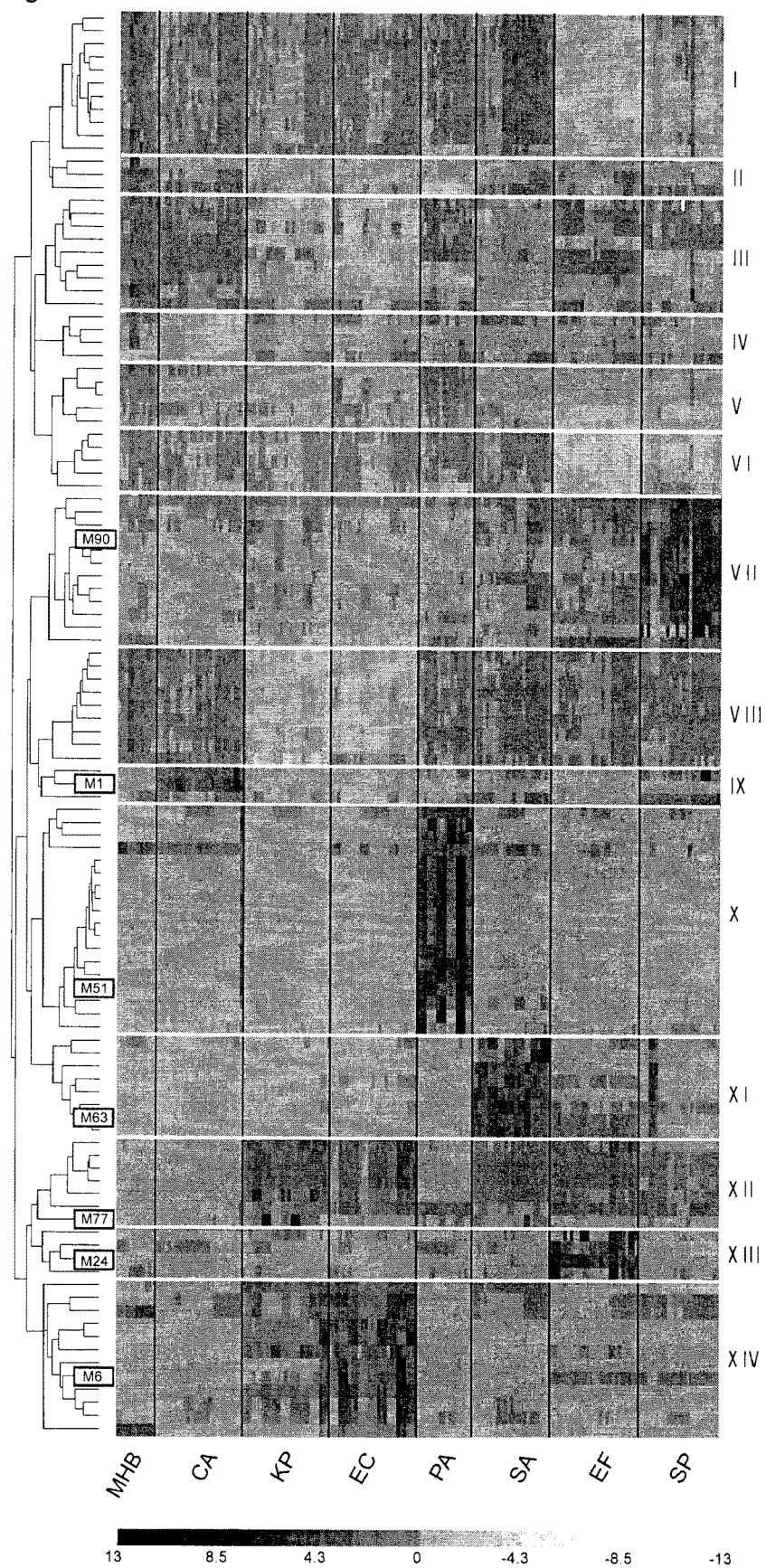
FIGS. 17A and 17B. From Example IX.
Figure 17B:
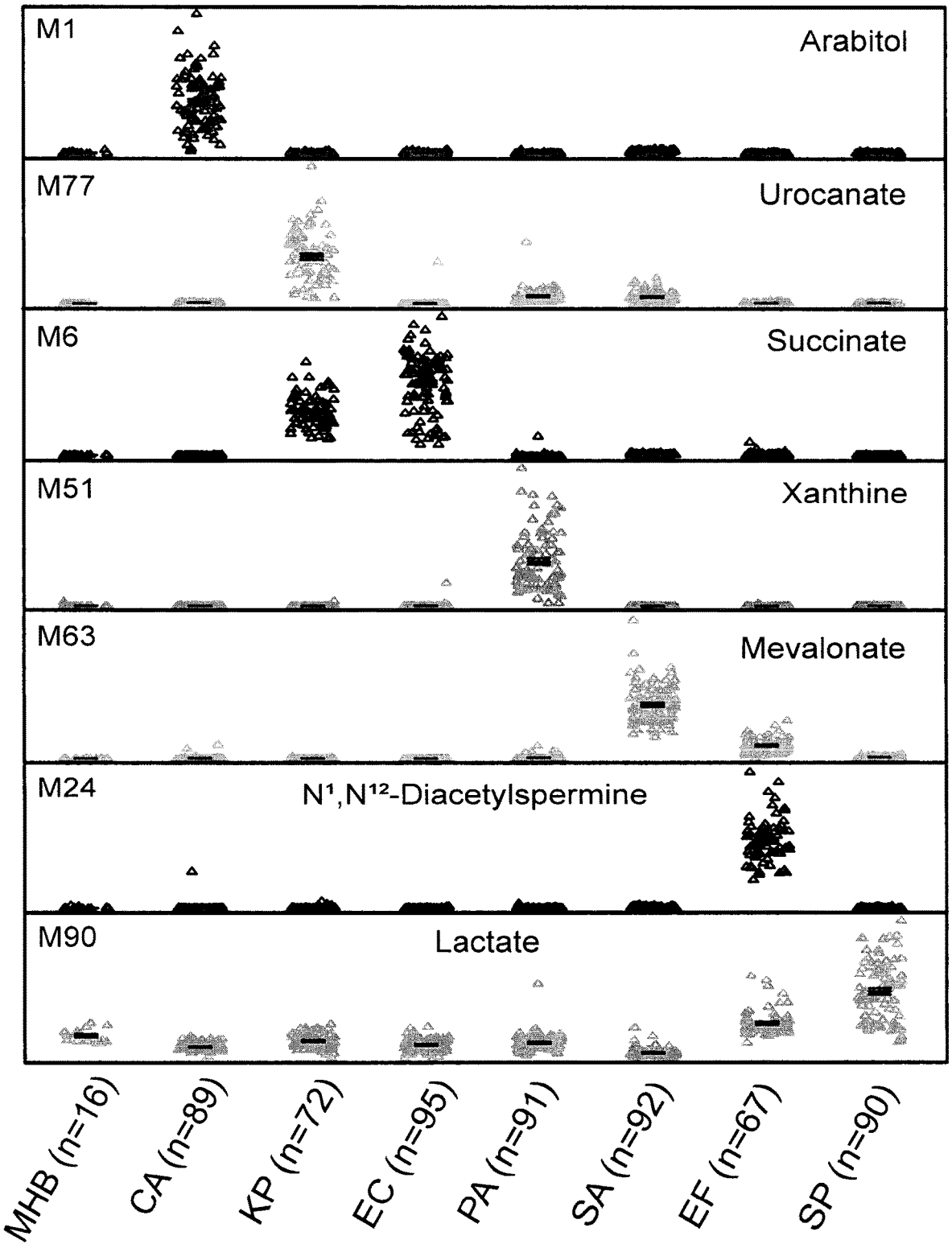

Species-dependent consumption or production of the 104 selected biomarkers robustly differentiates between the seven target species, as shown in FIGS. 17A and 17B. Although the overall pattern of markers was similar between closely related microbes (i.e. K. pneumoniae and E. coli), they could still be differentiated via select biomarkers.

To determine the stability of these markers in a larger cohort, we conducted a validation study of metabolic preference assay (MPA) using 596 clinical isolates. Changes in the top 104 biomarkers were consistent with those observed in the biomarker discovery dataset. Remarkably, just seven production biomarkers were sufficient to distinguish between the target pathogens and acted as binary predictors of each species (FIGS. 17A and 17B). Specifically, arabitol, xanthine, and $N^1,N^{12}$-diacetylspermine were exclusively produced by *C. albicans, P. aeruginosa,* and *E. faecalis*, respectively. Both *K. pneumoniae* and *E. coli* produced succinate, but the latter did not produce urocanate. Mevalonate was produced by *S. aureus*, and to a lesser extent *E. faecalis*, but unlike *E. faecalis, S. aureus* did not produce $N^1,N^{12}$-diacetylspermine. Lactate was produced by *S. pneumoniae*, and to a lesser extent, *E. faecalis*. Also of interest and as shown in FIGS. 22A and 22B, addition of 10% blood to the medium, irrespective of donor (n=20), had negligible effects on metabolite profiles when compared to seeded cultures on the right hand side, demonstrating that these biomarkers were pathogen-specific, and did not reflect blood metabolism or donor-specific metabolite carryover.

Results: Blinded Performance Testing of MPA in Clinical Cohorts

As noted above, data herein established a panel of MPA-based biomarkers that differentiate the most common BSI pathogens. To assess real-world clinical utility of MPA, we conducted a blinded performance trial of our new approach and scored it relative to results obtained by standard clinical testing practices. The trial was based on 809 blood cultures.

Interestingly, the MPA-based classification algorithm was only calibrated for seven organisms, yet this blinded trial encountered many species (N=131) that were not in the original training set. This highlights an advantage of the metabolomics-based MPA approach, in that it can capture both targeted and untargeted data. This enables new classification algorithms to be trained or refined on-the-fly. We were therefore able to use these untargeted metabolomics datasets, along with the results from the daily assignment batches, to build a preliminary predictive model for each new organism encountered. These tentative microbial predictions were submitted along with results from our established model for the seven target species (FIG. 18A(i) and (ii)). Supporting data and species-specific performance data are shown in Table 3 and were used to expand the decision tree.

TABLE 3

Blood Culture Isolate ID and Agreement of MPA vs MALDI-TOF.

| Organism (ID from MALDI) | Agreement to species level | Agreement to genus level | NO ID | Wrong ID |
|---|---|---|---|---|
| Candida albicans | 1/1 (100%) | 0 | 0 | 0 |
| Escherichia coli | 71/72 (99%) | 0 | 0 | 1/72 (1%) |
| Enterococcus faecalis | 2/2 (100%) | 0 | 0 | 0 |
| Klebsiella pneumoniae | 13/22 (59%) | 0 | 0 | 9/22 (41%) |
| Pseudomonas aeruginosa | 2/2 (100%) | 0 | 0 | 0 |
| Staphylococcus aureus | 55/66 (83%) | 6/66 (9%) | 0 | 5/66 (8%) |
| Staphylococcus aureus (MRSA) | 8/8 (100%) | 0 | 0 | 0 |
| Streptococcus pneumoniae | 4/4 (100%) | 0 | 0 | 0 |
| Total (Total Target Organisms) | 156/177 (88%) | 6/177 (3%) | 0 | 15/177 (8%) |
| Acinetobacter species | 0 | 0 | 2/2 (100%) | 0 |
| Anaerobic Gram-positive bacilli | 0 | 0 | 1/1 (100%) | 0 |
| Bacteroides fragilis | 0 | 0 | 0 | 1/1 (100%) |
| Bacteroides fragilis group | 0 | 0 | 0 | 3/3 (100%) |
| Bacillus species | 0 | 0 | 0 | 1/1 (100%) |
| Bacillus species (not Bacillus anthracis) | 0 | 0 | 1/2 (50%) | 1/2 (50%) |
| Candida glabratta | 0 | 0 | 4/4 (100%) | 0 |
| Candida lusitaniae | 0 | 1/1 (100%) | 0 | 0 |
| Citrobacter freundii complex | 0 | 0 | 0 | 0 |
| Clostridium paraputrificum | 0 | 0 | 0 | 0 |
| Clostridium species | 0 | 0 | 0 | 1/1 (100%) |
| Coryneform bacilli | 0 | 0 | 1/2 (50%) | 1/2 (50%) |
| Enterobacter cloacae complex | 0 | 0 | 2/4 (50%) | 2/4 (50%) |
| Enterococcus faecium | 0 | 0 | 0 | 0 |
| Enterococcus gallinarum | 0 | 0 | 0 | 0 |
| Group A Streptococcus | 8/9 (89%) | 1/9 (11%) | 0 | 0 |
| Group B Streptococcus | 2/12 (17%) | 6/12 (50%) | 0 | 4/12 (33%) |
| Gemella morbillorum | 0 | 0 | 0 | 1/1 (100%) |
| Group G Streptococcus | 1/2 (50%) | 1/2 (50%) | 0 | 0 |
| Granulicatella adiacens | 0 | 0 | 0 | 0 |
| Klebsiella oxytoca | 0 | 0 | 0 | 1/1 (100%) |
| Lactobacillus species | 0 | 0 | 1/3 (33%) | 2/3 (67%) |
| Micrococcus species | 0 | 0 | 2/3 (67%) | 1/3 (33%) |
| Moraxella species | 0 | 0 | 0 | 0 |
| Odoribacter splanchnicus | 0 | 0 | 0 | 1/1 (100%) |
| Neisseriaspecies not N meningitidis | 0 | 0 | 0 | 0 |
| Proteus mirabilis | 0 | 0 | 0 | 2/2 (100%) |
| Propionibacterium species | 0 | 0 | 1/1 (100%) | 0 |
| Pseudomonas putida | 0 | 0 | 0 | 0 |
| Staphylococcus capitis | 1/4 (25%) | 0 | 1/4 (25%) | 2/4 (50%) |
| Staphylococcus epidermidis | 21/29 (72%) | 1/29 (3%) | 1/29 (3%) | 6/29 (21%) |
| Staphylococcus haemolyticus | 0 | 0 | 1/1 (100%) | 0 |
| Staphylococcus hominis | 7/13 (54%) | 0 | 6/13 (46%) | 0 |
| Staphylococcus warneri | 0 | 0 | 0 | 1/1 (100%) |
| Total Coagulase Negative Staphylococcus | 29/48 (60%) | 1/48 (2%) | 9/48 (19%) | 9/48 (19%) |

TABLE 3-continued

Blood Culture Isolate ID and Agreement of MPA vs MALDI-TOF.

| Organism (ID from MALDI) | Agreement to species level | Agreement to genus level | NO ID | Wrong ID |
|---|---|---|---|---|
| Salmonella Paratypi A | 0 | 0 | 0 | 4/4 (100%) |
| Streptococcus anginosus group | 0 | 1/3 (33%) | 0 | 2/3 (67%) |
| Streptococcus bowls group | 1/6 (17%) | 3/6 (50%) | 0 | 2/6 (33%) |
| Streptococcus viridans group | 1/3 (33%) | 2/3 (67%) | 0 | 0 |
| Total (Non-Target Organisms) | 42/121 (35%) | 16/121 (13%) | 24/121 (20%) | 39/121 (32%) |
| Total (All Organisms) | 198/298 (66%) | 22/298 (7%) | 24/298 (8%) | 54/298 (18%) |

The blinded trial indicated that the MPA-based approach is an effective clinical diagnostic strategy. When considering only those organisms present in the training set, MPA-based classifications correctly differentiated every infected (N=169) versus non-infected sample (N=477) with no missed calls. In addition, MPA-based analyses correctly classified each of the target organisms in 88% of samples (148 of 169 correct to the species level). Notably, most of the misclassifications (10 of 21) resulted from ambiguity between *Klebsiella* and *Escherichia*, which are closely related organisms with similar therapeutic needs. When all data are considered, including organisms not contained in the training set, the MPA-based approach correctly flagged infected samples in 96.1% of samples with a 99.8% specificity (N=809, including 332 positive). Moreover, despite the fact that the dataset contained a large fraction of species that were not in the training set, the MPA approach was still able to identify pathogens at the genus level in 94% of cases. This was made possible by our metabolomics approach, which enabled on-the-fly recalibration of our classification model to handle the newly observed organisms. Two examples of this real-time model building were Group A *Streptococcus* (GAS) and Coagulase Negative *Staphylococcus* (CNS), which were relatively abundant in the dataset (N=9 and N=48, respectively). Our on-the-fly model allowed us to predict these organisms correctly in 89% and 60% of samples despite never having seen them previously and having only a few replicates available to train the model. A small fraction of the samples (N=34) grew multiple species of microbes. These mixed cultures were flagged as metabolic anomalies and did not conform to classification schema. In summary, MPA was an effective tool for identifying pathogens and supported dynamic recalibration of the classification schema in response to unexpected new microbes.

Results: Rapid Antibiotic Susceptibility Testing by MPA

One attractive aspect of using metabolomics for microbial diagnostics is that metabolism is a sensitive reporter of cell physiology. Nutritional precursors are converted into waste products at rates that are many orders of magnitude faster than microbial growth. Moreover, these processes are dramatically altered, or halted completely, when cells are exposed to toxic substances. Consequently, metabolomics approaches offer a unique opportunity to empirically assess antibiotic sensitivity in fraction of the time that is required by the current growth-based antibiotic susceptibility testing (AST) approach. Herein, we evaluated the practicality of a MPA-based AST (MAST) workflow.

MAST testing was accomplished by monitoring changes in the metabolic composition of microbial cultures after a 4 h incubation period with and without antimicrobials. Microbes were seeded into MHB medium at 10% of a 0.5 McFarland (to a final $OD_{600}$ of ~0.007) and metabolomics analyses were conducted using the same method used for general MPA testing. The metabolic concept underpinning MAST is illustrated in the top left panel of FIG. 19: drug sensitive strains of KP show an incremental reduction in hypoxanthine production proportional to meropenem concentrations, whereas resistant strains remain unaffected within the clinically-relevant antibiotic concentrations. Similar antibiotic-induced metabolic perturbations were observed in all of the target pathogens when isolates were exposed to minimum inhibitory concentrations of commonly prescribed antimicrobials (FIG. 19).

To assess MAST as a potential clinical tool, three patient isolates for each target pathogen (2 each for *S. aureus* and *P. aeruginosa*) were analyzed. Antifungals (azoles, polyenes, and antimetabolites) were tested for *C. albicans*. Both bactericidal (penicillins, cephalosporins, carbapenems, glycopeptides, aminoglycosides and fluoroquinolones) and bacteriostatic (macrolides, tetracyclines, and trimethoprim-sulfamethoxazole) antibiotic classes were evaluated. Antimicrobial sensitivity profiles determined by MAST were consistent with 98% of the profiles observed in traditional microbial growth assays. The assays were consistent across all antimicrobial's mechanisms of action. For example, succinate production by ampicillin (AMP) and trimethoprim/sulfamethoxazole (SXT) resistant *E. coli* was comparable when the strain was incubated in the presence of AMP, SXT, or in the absence of antibiotics. However, succinate production was significantly lower (p<0.01 for all pairwise comparisons) when the strain was grown in the presence of antibiotics to which it was sensitive. In most cases, the biomarkers used to identify microbes were also useful for differentiating drug sensitive and resistant strains (e.g., arabitol for *C. albicans*, succinate for *K. pneumoniae* and *E. coli*, $N^1,N^{12}$-diacetylspermine for *E. faecalis*, xanthine for *P. aeruginosa*, and lactate for *S. pneumoniae*). One exception to this trend was mevalonate, which is an excellent marker for *S. aureus* but an unreliable marker for drug resistance. Instead, an alternative compound with an m/z of 204.069 was identified as a more stable metric for differentiating resistant versus susceptible strains of *S. aureus*. We subsequently evaluated MAST over a larger cohort (N=300) and found MAST to be an exceptional predictor of antibiotic susceptibility. These data demonstrate that MPA, in connection with MAST, can provide a robust mechanism for identifying and characterizing pathogens.

Results: Real Time Testing Results

One of the primary motivations for this project is the urgent need for rapid diagnostic testing technology. To evaluate the potential time savings available by using our MPA diagnostic workflow, we conducted a head-to-head race between our academic lab and a standard clinical testing pipeline. Aerobic BacT/Alert bottles were seeded with 10 mL of blood containing 100 CFU/mL of exponential phase bacteria (*S. aureus* and *E. coli*), and were incubated in a BacT/Alert 3D (bioMerieux) microbial detection system until the bottles flagged positive. One aliquot was taken for testing using the standard clinical testing pipeline (plating on selective medium for single colony isolation, Gram staining, MALDI-TOF-MS species identification, and sub-culturing for purity and inoculation onto VITEK 2 (bioMerieux)

antimicrobial susceptibility panels), and a second aliquot was used for diagnosis via MPA. Medium containing the most commonly prescribed antibiotics for each strain (CIP, OXA, AMP, CFZ, SXT, and CIP for *S. aureus*; AMP, GEN, SXT and CIP for *E. coli*) at concentration ranges consistent with MicroScan Panels were inoculated with 10% of the blood-bacterium-BacT/Alert medium mixture. Samples were processed following the 4 h incubation period and analyzed via LC-MS using a 5 min HILIC method. Data were analyzed in real-time using the MAVEN software package. The positive control (medium with no antibiotic) was analyzed first to enable species identification. Subsequently, samples containing the lowest concentrations of antibiotics were analyzed to assess sensitivity. In order to minimize MS analysis time, samples incubated in higher concentrations of antibiotics were only analyzed if they showed resistance to lower concentrations. Our MPA-based assignments and MAST testing results agreed with standard clinical testing results and reduced total testing time by an average of 40.6 h for *S. aureus* and 44.3 h for *E. coli*, corresponding to a 3.0 and 3.9-fold decrease in total testing time, respectively. The time required for strain identification (ii) and antibiotic susceptibility (iii) alone decreased by 8.2 and 9.0-fold for *S. aureus* and *E. coli*, respectively. Studies have shown that an hour delay in administering effective antimicrobial therapy to septic shock patients results a 7.6% increase in mortality (A. Kumar et al., Duration of hypotension before initiation of effective antimicrobial therapy is the critical determinant of survival in human septic shock. *Crit Care Med* 34, 1589-1596 (2006)), and that up to 30% of patients are prescribed ineffective antimicrobial treatments (E. H. Ibrahim, G. Sherman, S. Ward, V. J. Fraser, M. H. Kollef, The influence of inadequate antimicrobial treatment of bloodstream infections on patient outcomes in the ICU setting. *Chest* 118, 146-155 (2000); and A. Kumar et al., Initiation of inappropriate antimicrobial therapy results in a fivefold reduction of survival in human septic shock. *Chest* 136, 1237-1248 (2009)). In view of this, a >40 h reduction in BSI testing time translates to a >5% reduction in mortality rates in septic shock patients.

Example X: Studies for Precursor Identification

To identify if biomarkers are coming from glucose or some other nutrient, $^{13}$C-glucose labeling experiments were conducted.

Organisms were seeded in RPMI medium substituted with uniformly labeled $^{13}$C-glucose to determine if biomarkers are derived from glucose or other potential precursors present in RPMI. When biomarkers were detected in predominantly unlabeled form ($^{12}$C), they are derived from RPMI components other than glucose.

TABLE 5

$^{13}$C-glucose growth experiments of in RPMI medium

| Marker Name | M/Z | RT | Significant Marker for | Carbon Labelled (%) | Possible Source |
|---|---|---|---|---|---|
| ARABITOL | 151.0605 | 4.82 | CA | 50% 12C, 50% 13C-5 | |
| XANTHINE | 151.0255 | 4.27 | PA | 94% 12C, 6% 13C-1 | |
| SUCCINATE | 117.0189 | 1.39 | EC/KP | 45% 12C, 2% 13C-1, 2% 13C-2, 44% 13C-3, 7% 13C-4 | |
| UROCANATE | 137.035 | 4.41 | KP/GAS | 95% 12C, 5% 13-C-1 | 1-Histidine |
| MEVALONIC ACID | 147.0656 | 2.32 | EF/SA/CNS/ | 12% 12C, 6% 13C-2, 20% 13C-4, 7% 13C-5, 54% 13C-6 | |
| CITRULLINE | 174.0877 | 8.41 | EF/SP | 95% 12C, 5% 13-C-1 | 1-Arginine, 2-Glutamine |
| NICOTINATE | 122.0234 | 3.36 | EC/KP/EF/SA/PA/CNS | 95% 12C, 5% 13-C-1 | 1-Niacinamide 2-Pyridoxine |
| M106 (C6H12O3) | 131.0713 | 3.56 | GAS/EF | 100% 12C | |
| M113 (C4H9NO2) | 102.056 | 7.98 | SA | 100% 12C | |
| [S]-DIHYDROOROTATE | 157.0249 | 5.63 | KP | 75.4% 12C, 4.4% 13C-1, 20.2% 13C-3 | |
| 4-METHYL-2-OXO-PENTANOIC ACID | 129.0552 | 4.45 | EC/KP/PA/SA | 94% 12C, 6% 13-C-1 | 1-Leucine |
| ALPHA-HYDROXYISOBUTYRIC ACID | 103.0397 | 0.87 | PA | 83% 12C, 6% 13C-1, 8% 13C-2, 1% 13C-3, 2% 13C-4 | 1-Methionine, 2-Serine, 3-Threonine 4-Glycine |
| 6-HYDROXYNICOTINATE | 138.0191 | 3.91 | PA | 98% 12C, 2% 13C-1 | 1-Niacinamide 2-Pyridoxine |
| NALPHA-ACETYL-L-LYSINE | 187.108 | 7.95 | PA/EF/SP | 94% 12C, 6% 13C-1 | 1-Lysine, 2-Aspartic Acid |
| GLUTARATE | 131.0345 | 0.94 | PA | 93% 12C, 5% 13C-1, 2% 13C-5 | |
| ALPHA-KETOGLUTARIC ACID | 145.0137 | 8.77 | CNS/SA/SP | 94% 12C, 4% 13C-1, 1% 13C-2, 1% 13C-4 | 1-Glutamine, 2-Glutamic Acid |
| LL-2-6-DIAMINOHEPTANE DIOATE | 189.0874 | 8.27 | EF/SP | 100% 12C | 1-Lysine |
| CARNOSINE | 225.0985 | 8.64 | EF/SP | 93% 12C, 7% 13C-1 | 1-Histidine |
| FUMARATE | 115.0032 | 3.61 | EC/KP/SA/CNS | 55% 12C, 3% 13C-1, 1% 13C-2, 37% 13C-3, 5% 13C-4 | |
| TRANS-ACOTINATE | 173.0084 | 4.95 | EC/PA/SP/CNS/SA | 88% 12C, 12% 13-C-2 | |

Subsequent metabolic pathway analysis was used to identify putative precursors for identified biomarkers.

Example XI: Comparative Studies for Identification of Common Pathogens

Further tests were conducted with known organisms using either Mueller Hinton (MH) media, Roswell Park Memorial Institute (RPMI) media or M9 media. The methods are the same as Example I above with a culture time of four hours. RPMI medium is prepared as indicated in Table 6.

TABLE 6

Roswell Park Memorial Institute (RPMI) media composition.

| Compound | g/L | mM |
|---|---|---|
| Calcium Nitrate•4H2O | 0.1 | 4.23E−01 |
| Magnesium Sulfate (anhydrous) | 0.04884 | 4.06E−01 |
| Potassium Chloride | 0.4 | 5.37E+00 |
| Sodium Bicarbonate | 2 | 2.38E+01 |
| Sodium Chloride | 6 | 1.03E+02 |
| Sodium Phosphate Dibasic | 0.8 | 5.64E+00 |
| L-Arginine | 0.2 | 1.15E+00 |
| L-Asparagine (anhydrous) | 0.05 | 3.76E−01 |
| L-Aspartic Acid | 0.02 | 1.50E−01 |
| L-Cystine•2HCl | 0.0652 | 2.08E−01 |
| L-Glutamic Acid | 0.02 | 1.36E−01 |
| L-Glutamine | 0.3 | 2.05E+00 |
| Glycine | 0.01 | 1.33E−01 |
| L-Histidine | 0.015 | 9.67E−02 |
| Hydroxy-L-Proline | 0.02 | 1.53E−01 |
| L-Isoleucine | 0.05 | 3.81E−01 |
| L-Leucine | 0.05 | 3.81E−01 |
| L-Lysine•HCl | 0.04 | 2.19E−01 |
| L-Methionine | 0.015 | 1.01E−01 |
| L-Phenylalanine | 0.015 | 9.08E−02 |
| L-Proline | 0.02 | 1.74E−01 |
| L-Serine | 0.03 | 2.85E−01 |
| L-Threonine | 0.02 | 1.68E−01 |
| L-Tryptophan | 0.005 | 2.45E−02 |
| L-Tyrosine•2Na•2H2O | 0.02883 | 1.10E−01 |
| L-Valine | 0.02 | 1.71E−01 |
| D-Biotin | 0.0002 | 8.19E−04 |
| Choline Chloride | 0.003 | 2.15E−02 |
| Folic Acid | 0.001 | 2.27E−03 |
| myo-Inositol | 0.035 | 1.94E−01 |
| Niacinamide | 0.001 | 8.19E−03 |
| p-Aminobenzoic Acid | 0.001 | 7.29E−03 |
| D-Pantothenic Acid (hemicalcium) | 0.00025 | 1.04E−03 |
| Pyridoxine•HCl | 0.001 | 4.86E−03 |
| Riboflavin | 0.0002 | 5.31E−04 |
| Thiamine•HCl | 0.001 | 2.96E−03 |
| Vitamin B12 | 0.000005 | 3.69E−06 |
| D-Glucose | 2 | 1.11E+01 |
| Glutathione (reduced) | 0.001 | 3.25E−03 |
| Phenol Red•Na | 0.0053 | 1.40E−02 |
| HEPES | 5.958 | 25 |
| Hypoxanthine | 0.013611 | 0.1 |
| NaOH (from hypoxanthine) | | 1 |

Comparison of top biomarker production of arabitol, xanthine, succinate, urocanate, nicotinate and citrulline in Mueller Hinton and RPMI medium demonstrates that microorganisms CA, PA, EC, KP, SA, CNS, SP AND EF have similar production patterns in both media. The data showed that some diagnostic target marker metabolites occur in MH but do not occur in RPMI such as a) $N^1,N^{12}$-diacetylspermine and b) mevalonate. They are not present because the precursor necessary to synthesize these molecules in excess is not present or because a molecule in RPMI is at sufficient quantity to suppress the biosynthesis of the target marker.

The growth medium enabled metabolite uptake by the microorganisms. Identification of the nutrients involved in metabolism was in some cases confirmed by drop out tests, where custom media based on RPMI was created that omitted the suspected nutrient precursor. In particular, to determine if the stated biomarker was, in fact, produced from the substrates listed, each substrate was omitted, one by one, from RPMI medium. It was concluded that when a biomarker was not produced in a medium where one of the components was omitted, the biomarker was generated from that omitted substrate (FIGS. 20A and 20B). Individual components (x axis) were omitted from the medium to determine if omission of a particular substrate eliminates biomarker production. For example, elimination of histidine in the medium results in absence of urocanate production in KP and GAS. Conversely, single elimination of any component has no effect on arabitol production in CA, suggesting that arabitol is derived from glucose.

The following was concluded:

When a sample is grown in Mueller Hinton (MH) or Roswell Park Memorial Institute (RPMI) media, each of which contains niacinamide (nicotinamide) and pyridoxine, the production of nicotinate identifies the presence *Escherichia*, *Klebsiella*, *Pseudomonas*, *Enterococcus*, *Staphylococcus* and *Streptococcus* species in the sample. In other words, if, after culturing a sample of unknown micororganisms in MH or RPMI, there is a higher concentration of nicotinate compared to the original media, then it can be concluded that the sample contained at least one of *Escherichia*, *Klebsiella*, *Pseudomonas*, *Enterococcus*, *Staphylococcus* or *Streptococcus* species.

When a sample is grown in MH or RPMI media, which each contain arginine, metabolism that results in the production of citrulline identifies the presence of Gram+ species *Enterococcus* or *Streptococcus* in the sample.

When a sample is grown in MH or RPMI media, each of which contain glucose: a) culturing that results in the production of arabitol identifies the presence of *Candida* species, such as *Candida albicans*, in the sample; and b) culturing that results in the production of succinate identifies the presence of *Escherichia* or *Klebsiella* species in the sample.

When a sample is grown in RPMI media, which contains all of hypoxanthine, niacinamide and pyridoxine, the production of xanthine and 6-hydroxynicotinate identifies the presence of *Pseudomonas* species in the sample. It is believed that xanthine is produced from hypoxanthine and 6-hydroxynicotinate is produced as a metabolite of niacinamide and pyridoxine.

When a sample is grown in MH or RPMI media containing histidine, metabolism that results in the production of urocanate identifies the presence of *Klebsiella* species and/or Group A *Streptococcus* in the sample.

When a sample is grown in MH media, containing glucose and threonine, metabolism that results in the production of mevalonate and N-acetylthreonine identifies the presence of Staphylococcus or Enterococcus in the sample.

When a sample is grown in MH, metabolism that results in the production of $N^1,N^{12}$-diacetylspermine identifies the presence of Enterococcus in the sample. It is believed that spermine in MH is the precursor.

In MH, an increase in the concentration of methylbutylamine is indicative of the Proteus species in the cultured sample.

In a culture medium, an increase in the presence of $N^1,N^8$-diacetylspermidine is indicative of Enterococcus faecalis, Staphylococcus saprophyticus, and Staphylococcus epidermis in the sample being cultured. This marker may be useful to differentiate between E. faecalis, which produces $N^1,N^8$-diacetylspermidine and E. facium, which does not.

Tyramine is indicative of Enterococcus species.

Fumarate is produced by E. coli and Klebsiella species.

N-acetyl ornithine is produced by SP.

Methylbutylamine is produced by Proteus species.

Aminopropanol is produced by Proteus species

Pyrrolidine is produced by Citrobacter species, EC, Enterobacter cloacae, Proteus mirabilis.

There are many species of yeast and while arabitol has been identified as indicative of yeast and specifically C. albicans, other biomarkers have been identified for identification of other species. For example, N-acetylleucine/N-acetylisoleucine is indicative of Candida freundii and that biomarker can be used to differentiate it from C. albicans. Also, a biomarker with mass of 286.2366 at a retention time of 4.3 minutes on the 15 minute HILIC method is indicative of Candida albicans, which can differentiate it from C. freunidii.

Agmatine in a cultured sample is indicative of the presence of Enterobacteriaceae species. In a culture medium, such as M9 medium, where there is a single source of carbon, such as where the medium contains only glucose as the source of carbon, the metabolite agmatine indicates the presence of Enterobacteriaceae species. Alternately, in a culture medium such as MH or RPMI with arginine, a cultured sample which contains the metabolite agmatine indicates the presence of Enterobacteriaceae species. (FIG. 21)

After culturing, the presence of cadaverine is an indicator for E. coli, Enterobacter aerogenes, Klebsiella species, and Stenotrophomonas maltophilia. This can help differentiate these pathogens within the family Enterobactericiae, since all Enterobactericiae tested were found to produce agmatine.

After culturing, the presence of putrescine identifies Citrobacter species, E. coli, Enterobacter species, Klebsiella species, and Proteus mirabilis and can help differentiate the Enterobactericiae that are all identified with agmatine.

In RPMI, Enterococcus does not produce $N^1,N^{12}$-diacetylspermine, but in MH, the production of $N^1,N^{12}$-diacetylspermine identifies the presence of Enterococcus in the sample. It is believed that the medium must contain spermine.

When a sample is grown in a RPMI media, which contains hypoxanthine, niacinamide and pyridoxine, the production of xanthine and 6-hydroxynicotinate is detected, this identifies the presence of Pseudomonas species in the sample. It is believed that xanthine is produced from hypoxanthine and 6-hydroxynicotinate is produced as a metabolite of niacinamide and pyridoxine.

Also, in MH aminobutyric acid is useful to differentiate Staphylococcus aureus from coagulase negative Staphylococcus since S. aureus makes it and coagulase negative Staphylococcus does not.

When a sample culture of MH media, results in the production of marker 106 (131.0713@2.28 using 5 minute method) the sample contains Enterococcus species and/or Streptococcus pneumonia.

Antimicrobial susceptibility testing used MH medium that was confirmed to contain glucose, niacinamide and pyridoxine, and found that:
  glucose consumption is indicative of Escherichia, Klebsiella, Enterococcus, Staphylococcus and Streptococcus with antimicrobial resistance;
  succinate production is clearly indicative of the presence of either Escherichia or Klebsiella species with antimicrobial resistance; and
  nicotinate production is clearly indicative that the culture contained Streptococcus species with antimicrobial resistance.

Figure 16:
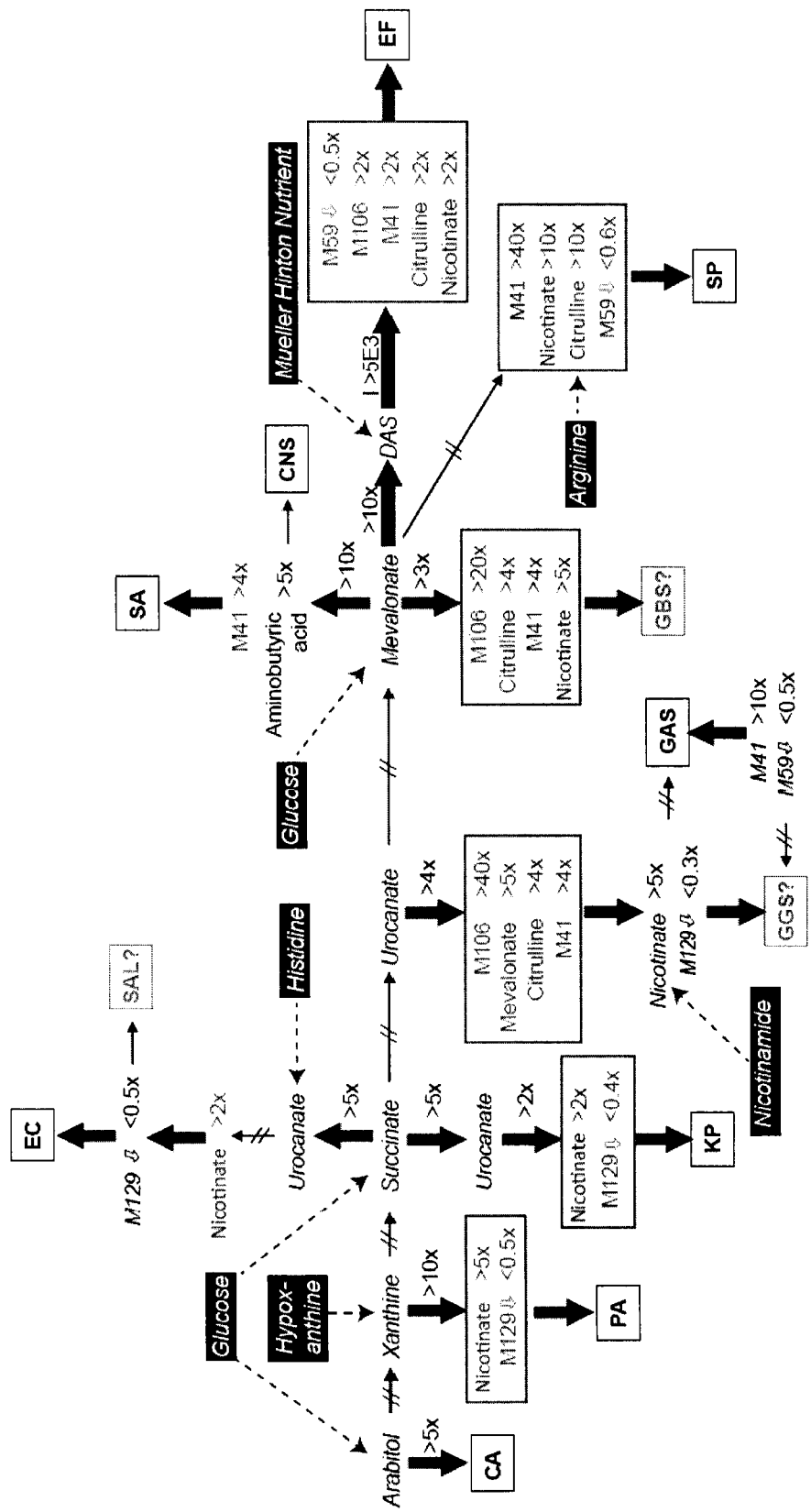
FIG. 16. Decision tree developed in Example IX and further refined in later Examples, used for identification of blinded patient blood samples incubated in Mueller Hinton medium. Minimum fold changes in italicized metabolite concentrations represent major decision branchpoints. Metabolites in grey are additional metabolites that are used to confirm a species. Metabolites indicated by white print in black boxes are precursors for metabolites shown. Metabolite patterns for species in grey are not yet confirmed. All metabolites used are produced with respect to a Mueller Hinton plus blood control unless otherwise specified by downward arrow. Solid arrows indicate that the specified biomarker meets specified thresholds changes whereas thin struck through arrows indicate that changes in the specified biomarker do not meet the minimum threshold listed in the figure. All thresholds are fold changes except for N1, N12 diacetylspermine (DAS) given that the background noise is zero.

These results were used to further refine the decision tree of FIG. 16.

Example XII: Susceptibility Testing

To better assess the stability of the invention in clinical settings, we subsequently evaluated this workflow over a larger isolate cohort (n=273) which included E. coli (n=50), S. aureus (n=64), K. pneumonia (n=35), S. pneumonia (n=48), GAS (n=29), E. faecalis (n=23), and E. faecium (n=24). To maximize sample throughput, metabolic profiles were analyzed using a rapid 5 minute HILIC chromatography method. Microbial IDs and ASTs were then predicted using this revised classification scheme. With respect to microbial ID, all Enterococcus isolates were correctly identified to the genus levels (n=47) and almost all other isolates were accurately identified to the species level (n=225/226) with the exception of one E. coli which was classified as a K. pneumonia due to low urocanate and succinate production. These data support our previous observations of robust microbial ID via MPA and indicate that these assignments can be made using our higher throughput analytical method.

We also used this larger cohort to refine the metabolic markers used for susceptibility. From these data, we identified glucose consumption as the most reliable indicator of antibiotic susceptibility for S. aureus, GAS, and Enterococcus species; succinate production as the most reliable indicator for E. coli, and K. pneumoniae susceptibility; and nicotinate production as the most reliable indicator for S. pneumoniae susceptibility. These susceptibilities were then expressed as a metabolic inhibition index [(C−T)/C]×100, where T is the biomarker signal intensity in antibiotic treated samples and C is the signal intensity observed in no-antibiotic controls. Classification breakpoints were then defined using metabolite-specific inhibition indices for glucose consumption (>−50), succinate production (<50), and nicotinate production (<55), which were empirically determined to differentiate sensitive from resistant isolates. Using these thresholds, MIA correctly predicted susceptibility calls in 93.8% of cases (Table 7). These data demonstrate that the analysis herein provides a robust mechanism for identifying and characterizing pathogens.

TABLE 7

| | | | Susceptibility Testing with Cutoffs | | | | |
|---|---|---|---|---|---|---|---|
| Marker (cutoff) | Species (n) | Antibiotic (ug/ml) | Sensitive Called as Sensitive | Resistant Called as Resistant | Sensitive Called as Resistant | Resistant Called as Sensitive | Correct Calls per Species |
| Glucose (>−50) | SA (64) | OXA (2, 4) | 54 | 61 | 0 | 13 | 481/512 |
| | | CM (0.5, 4) | 92 | 33 | 2 | 1 | (93.9%) |
| | | VAN (2, 8) | 128 | 0 | 0 | 0 | |
| | | SXT (2/38, 4/76) | 105 | 8 | 3 | 12 | |
| | | TOTAL | 379 (74.0%) | 102 (19.9%) | 5 (1.0%) | 26 (5.1%) | |
| | GAS (29) | PEN (0.06, 0.12, 2) | 79 | 0 | 5 | 3 | 209/219 |
| | | CRO (0.5, 2) | 57 | 0 | 1 | 0 | (95.4) |
| | | VAN (1.0, 0.25) | 16 | 0 | 0 | 0 | |
| | | CM (0.25, 1.0) | 57 | 0 | 0 | 1 | |
| | | TOTAL | 209 (95.4%) | 0 (0.0%) | 6 (2.7%) | 4 (1.8%) | |
| | ENT (47) | AMP (8, 16) | 56 | 33 | 6 | 1 | 206/240 |
| | | VAN (4, 12, 32) | 95 | 22 | 1 | 26 | (85.8%) |
| | | TOTAL | 151 (62.9%) | 55 (22.9%) | 7 (2.9%) | 27 (11.3%) | |
| Succinate (<50) | EC (50) | CRO (1, 4) | 31 | 63 | 4 | 2 | 387/400 |
| | | CIP (1, 4) | 39 | 60 | 1 | 0 | (96.6%) |
| | | GEN (4, 16) | 52 | 43 | 0 | 5 | |
| | | MER (1, 4) | 96 | 3 | 0 | 1 | |
| | | TOTAL | 218 (54.5%) | 169 (42.3%) | 5 (1.3%) | 8 (2.0%) | |
| | KP (35) | CRO (1, 4) | 26 | 35 | 5 | 4 | 256/280 |
| | | CIP (1, 4) | 34 | 34 | 1 | 1 | (91.4%) |
| | | GEN (4, 16) | 48 | 15 | 0 | 7 | |
| | | MER (1, 4) | 50 | 14 | 6 | 0 | |
| | | TOTAL | 158 (56.4%) | 98 (35.0%) | 12 (4.3) | 12 (4.3%) | |
| Nicotinate (<55) | SP (48) | PEN (0.06, 0.12, 2) | 120 | 22 | 3 | 2 | 352/365 |
| | | CRO (0.5, 2) | 94 | 1 | 0 | 3 | (96.4%) |
| | | VAN (1.0, 0.25) | 22 | 0 | 0 | 0 | |
| | | CM (0.25, 1.0) | 91 | 2 | 0 | 5 | |
| | | TOTAL | 327 (89.6%) | 25 (6.8%) | 3 (0.8%) | 10 (2.7%) | |
| TOTAL | 273 | | 1442 | 449 | 38 | 87 | 1891/2016 (93.8%) |

Example XIII: Custom Medium

Based on precursor identification and on analysis of media dependent biomarker production, formulations for custom media were prepared. A medium was produced according to the actual composition listed in Table 1A. Using methods as described above, seven pathogens were cultured separately therein and metabolomic analysis is shown in FIGS. 23A to 23C. Notably only 50% of isolates grew, although metabolite production was still observed for most isolates after 4 h of incubation. Specifically, SA and SP failed to grow well. Interestingly, here, $N^1,N^{12}$-diacetylspermine identifies the presence of Enterococcus, Klebsiella and E. coli in the sample.

A medium was produced according to the actual composition listed in Table 1C with and without spermine. Using methods as described above, pathogens were cultured separately therein and metabolomic analysis conducted. The heat map in FIG. 24A shows top biomarkers on Mueller Hinton and RPMI and in FIG. 24B shows the custom MPA/MIA medium of Table 1C with and without spermine. Whited out areas indicate that the specified biomarker is not suitable for differentiation on a given medium.

Custom medium, even very limited compositions such as that of Table 1A, can contain the nutrients to support cell metabolism for long enough to permit consistent biomarker production of at least selected pathogens. The use of custom media permits reliable, repeatable metabolomic analysis.

The previous description and examples are to enable the person of skill to better understand the invention. The invention is not be limited by the description and examples but instead given a broad interpretation based on the claims to follow.

We claim:

1. A method for identifying a cell type of a cell in a sample, comprising:
   culturing the sample in a growth medium comprising niacinamide, carbohydrate and histidine to obtain a cultured growth medium;
   analysing the cultured growth medium by chemical analysis to determine a concentration of nicotinate in the cultured growth medium;
   identifying the cell type as at least one of Escherichia, Klebsiella, Pseudomonas, Enterococcus, Staphylococcus or Streptococcus species when the cultured growth media contains a higher concentration of nicotinate compared to the growth medium; and
   further identifying the cell type as Klebsiella species when the cultured growth medium contains a higher concentration of succinate and urocanate compared to the growth medium.

2. A method for identifying a cell type of a cell in a sample, comprising:
   culturing the sample in a growth medium comprising niacinamide, carbohydrate and arginine to obtain a cultured growth medium;

analysing the cultured growth medium by chemical analysis to determine a concentration of nicotinate in the cultured growth medium;
identifying the cell type as at least one of *Escherichia, Klebsiella, Pseudomonas, Enterococcus, Staphylococcus* or *Streptococcus* species when the cultured growth media contains a higher concentration of nicotinate compared to the growth medium; and
further identifying the cell type as Group A *Streptococcus* when the cultured growth medium contains a higher concentration of urocanate and an unchanged concentration of succinate when compared to the growth medium.

3. A method for identifying a cell type of a cell in a sample, comprising:
culturing the sample in a growth medium comprising niacinamide and hypoxanthine to obtain a cultured growth medium;
analysing the cultured growth medium by chemical analysis to determine a concentration of nicotinate in the cultured growth medium;
identifying the cell type as at least one of *Escherichia, Klebsiella, Pseudomonas, Enterococcus, Staphylococcus* or *Streptococcus* species when the cultured growth media contains a higher concentration of nicotinate compared to the growth medium; and
further identifying the cell type as *Pseudomonas* species when the cultured growth medium contains a higher concentration of xanthine compared to the growth medium.

4. A method for identifying a cell type of a cell in a sample, comprising:
culturing the sample in a growth medium comprising niacinamide and arginine to obtain a cultured growth medium;
analysing the cultured growth medium by chemical analysis to determine a concentration of nicotinate in the cultured growth medium;
identifying the cell type as at least one of *Escherichia, Klebsiella, Pseudomonas, Enterococcus, Staphylococcus* or *Streptococcus* species when the cultured growth media contains a higher concentration of nicotinate compared to the growth medium; and
further identifying the cell type as Group A *Streptococcus* or *Streptococcus* pneumoniae when the cultured growth medium contains a higher concentration of citrulline when compared to the growth medium and identifying the cell type as Group A *Streptococcus* over *Streptococcus pneumoniae* when the cultured growth medium contains a higher concentration of urocanate.

5. A method for identifying a cell type of a cell in a sample, comprising:
culturing the sample in a growth medium to obtain a cultured growth medium;
analysing the cultured growth medium by chemical analysis to determine a concentration of N1, N8-diacetylspermidine in the cultured growth medium; and
identifying the cell type as at least one of *Enterococcus faecalis, Staphylococcus saprophyticus*, or *Staphylococcus epidermis* when the cultured growth media contains a higher concentration of N1, N8-diacetylspermidine compared to the growth medium.

6. A method for identifying a cell type of a cell in a sample, comprising:
culturing the sample in a Mueller Hinton growth medium to obtain a cultured growth medium;
analysing the cultured growth medium by chemical analysis to determine a concentration of N1, N12-diacetylspermine in the cultured growth medium; and
identifying the cell type as *Enterococcus* species when the cultured growth media contains a higher concentration of N1, N12-diacetylspermine compared to the growth medium.

7. A method for identifying a cell type of a cell in a sample, comprising:
culturing the sample in a growth medium to obtain a cultured growth medium;
analysing by mass spectrometry to determine if the cultured growth medium contains N-acetylleucine, N-acetylisoleucine or a biomarker with mass of 286.2 at a retention time of 4.3 minutes on the 15 minute HILIC method; and
(a) if N-acetylleucine or N-acetylisoleucine are in the cultured growth medium, identifying the cell type as *Candida freundii*; and
(b) if the biomarker is in the cultured growth medium, identifying the cell type as *Candida albicans*.

8. A method for identifying a toxin sensitivity of a pathogen in a sample, comprising:
culturing the sample in a growth medium to obtain a cultured growth medium;
analysing the cultured growth medium by chemical analysis and if the cultured growth medium contains mevalonate, identifying the pathogen as *Staphylococcus aureus;*
culturing the pathogen with a toxin-containing growth medium known to have effect against *Staphylococcus aureus*; and
analysing the cultured toxin-containing growth medium by chemical analysis for glucose consumption, to determine if the *Staphylococcus* aureus is resistant to the toxin.

* * * * *